US012437353B2

(12) United States Patent
Ramot et al.

(10) Patent No.: US 12,437,353 B2
(45) Date of Patent: Oct. 7, 2025

(54) SYSTEMS AND METHODS FOR MANAGING RIDESHARING VEHICLES

(71) Applicant: Via Transportation, Inc., New York, NY (US)

(72) Inventors: Daniel Ramot, New York, NY (US); Oren Shoval, Jerusalem (IL); Shmulik Marcovitch, Kfar Saba (IL); Yaron Rakah, Givatayim (IL); Udi Eylat, Tel Aviv (IL)

(73) Assignee: VIA TRANSPORTATION, INC., New York, NY (US)

( * ) Notice: Subject to any disclaimer, the term of this patent is extended or adjusted under 35 U.S.C. 154(b) by 107 days.

(21) Appl. No.: 16/688,052

(22) Filed: Nov. 19, 2019

(65) Prior Publication Data

US 2020/0104965 A1    Apr. 2, 2020

Related U.S. Application Data

(63) Continuation of application No. PCT/US2018/033681, filed on May 21, 2018.
(Continued)

(51) Int. Cl.
*G05D 1/02*    (2020.01)
*G06Q 10/047*    (2023.01)
(Continued)

(52) U.S. Cl.
CPC .......... *G06Q 50/40* (2024.01); *G06Q 10/047* (2013.01); *G06Q 30/0621* (2013.01); *G06Q 30/0641* (2013.01); *G08G 1/202* (2013.01)

(58) Field of Classification Search
CPC .. G06Q 50/30; G06Q 10/047; G06Q 30/0621; G06Q 30/0641; G08G 1/202
See application file for complete search history.

(56) References Cited

U.S. PATENT DOCUMENTS

| 4,212,069 A | 7/1980 | Baumann |
| 4,502,123 A | 2/1985 | Minami et al. |

(Continued)

FOREIGN PATENT DOCUMENTS

| CA | 2874200 | 11/2013 |
| CN | 103198647 | 7/2013 |

(Continued)

OTHER PUBLICATIONS

International Search Report and Written Opinion for International Application No. PCT/US2018/033681, Nov. 29, 2018 (9 pages).
(Continued)

*Primary Examiner* — Talia F Crawley
(74) *Attorney, Agent, or Firm* — PEARL COHEN ZEDEK LATZER BARATZ LLP

(57) ABSTRACT

A system for enabling varied ridesharing services is provided. The system may include: a communications interface; a memory for storing accounts of the users including a restriction associated with a user, the restriction including limiting a distance from a starting point to a pick-up location and limiting a distance from a drop-off location to a destination; and a processor configured to: receive a request for a shared-ride from the user, the request including an indication of a starting point and a destination; access the database to retrieve the restriction; receive vehicle location data for a fleet of vehicles; identify candidate vehicles to pick up the user based on location information and an ability of candidate vehicles to comply with the restriction; provide to the user offers associated with candidate vehicles; receive a selection of an offer; and direct a vehicle associated with the offer to pick up the user.

24 Claims, 28 Drawing Sheets

Related U.S. Application Data

(60) Provisional application No. 62/614,558, filed on Jan. 8, 2018, provisional application No. 62/594,325, filed on Dec. 4, 2017, provisional application No. 62/537,155, filed on Jul. 26, 2017, provisional application No. 62/509,376, filed on May 22, 2017.

(51) Int. Cl.
| | |
|---|---|
| *G06Q 30/0601* | (2023.01) |
| *G06Q 50/30* | (2012.01) |
| *G06Q 50/40* | (2024.01) |
| *G08G 1/00* | (2006.01) |
| *G08G 1/0968* | (2006.01) |
| *H04W 4/029* | (2018.01) |

(56) References Cited

U.S. PATENT DOCUMENTS

| | | |
|---|---|---|
| 4,528,679 A | 7/1985 | Shahbaz |
| 5,604,676 A | 2/1997 | Penzias |
| 5,897,629 A | 4/1999 | Shinagawa |
| 6,459,986 B1 | 10/2002 | Boyce |
| 7,136,747 B2 | 11/2006 | Raney |
| 7,146,270 B2 | 12/2006 | Nozaki |
| 8,082,095 B2 | 12/2011 | Sumcad et al. |
| 8,220,710 B2 | 7/2012 | Hoffman |
| 8,412,400 B2 | 4/2013 | D'Andrea |
| 8,520,695 B1 | 8/2013 | Rubin |
| 8,538,694 B2 | 9/2013 | Conway |
| 8,688,532 B2 | 4/2014 | Khunger et al. |
| 8,868,529 B2 | 10/2014 | Lerenc |
| 8,930,133 B2 | 1/2015 | Wurman |
| 9,068,851 B2 | 6/2015 | Lerenc |
| 9,074,904 B1 | 7/2015 | Huang et al. |
| 9,094,824 B2 | 7/2015 | Jayanthi |
| 9,293,048 B2 | 3/2016 | Fowler |
| 9,304,009 B2 | 4/2016 | Beaurepaire et al. |
| 9,322,661 B2 | 4/2016 | Wechsler |
| 9,441,981 B2 | 9/2016 | Abhyanker |
| 9,448,560 B2 | 9/2016 | D'Andrea |
| 9,494,439 B1 | 11/2016 | Ross et al. |
| 9,562,785 B1 | 2/2017 | Racah et al. |
| 9,599,481 B2 | 3/2017 | Lord et al. |
| 9,679,489 B2 | 6/2017 | Lambert |
| 9,689,694 B2 | 6/2017 | Lord |
| 9,706,367 B2 | 7/2017 | Tao |
| 9,720,415 B2 | 8/2017 | Levinson |
| 9,903,721 B2 | 2/2018 | Choi |
| 9,939,279 B2 | 4/2018 | Pan |
| 9,965,960 B1 | 5/2018 | Mcdavitt-Van Fleet |
| 10,082,793 B1 | 9/2018 | Glaser |
| 10,152,053 B1 | 12/2018 | Smith |
| 10,156,848 B1 | 12/2018 | Konrardy et al. |
| 10,168,168 B2 | 1/2019 | Rakah |
| 10,235,888 B2 | 3/2019 | Lambert |
| 10,248,913 B1 | 4/2019 | Gururajan |
| 10,467,554 B2 | 11/2019 | Yoo |
| 10,572,964 B2 | 2/2020 | Kim |
| 10,648,822 B2 | 5/2020 | Newlin |
| 10,677,602 B2 | 6/2020 | Rakah |
| 10,762,447 B2 | 9/2020 | Kislovskiy |
| 11,062,416 B1 | 7/2021 | Jang |
| 11,361,594 B1 | 6/2022 | Copeland |
| 11,466,998 B1 | 10/2022 | Williams |
| 11,574,263 B2 | 2/2023 | Shoval |
| 11,620,592 B2 | 4/2023 | Ramot |
| 11,663,532 B2 | 5/2023 | Shimodaira |
| 11,674,811 B2 | 6/2023 | Shoval |
| 11,922,816 B1 | 3/2024 | Hansen |
| 12,033,194 B2 | 7/2024 | Fujimoto |
| 2001/0037174 A1 | 11/2001 | Dickerson |
| 2002/0011940 A1 | 1/2002 | Cappel |
| 2003/0177020 A1 | 9/2003 | Okamura |
| 2004/0076280 A1 | 4/2004 | Ando |
| 2004/0088392 A1 | 5/2004 | Barrett |
| 2004/0093280 A1 | 5/2004 | Yamaguchi |
| 2004/0158483 A1* | 8/2004 | Lecouturier ........... G06Q 10/08 705/6 |
| 2004/0215382 A1 | 10/2004 | Breed |
| 2004/0254721 A1 | 12/2004 | Saiki |
| 2005/0021227 A1 | 1/2005 | Matsumoto |
| 2005/0280555 A1 | 12/2005 | Warner, IV |
| 2006/0059023 A1 | 3/2006 | Mashinsky |
| 2006/0106655 A1 | 5/2006 | Lettovsky et al. |
| 2006/0178949 A1 | 8/2006 | McGrath |
| 2006/0208169 A1 | 9/2006 | Breed |
| 2006/0276960 A1 | 12/2006 | Adamczyk |
| 2007/0164726 A1 | 7/2007 | de Marcken et al. |
| 2007/0168239 A1 | 7/2007 | Marcken et al. |
| 2007/0248220 A1 | 10/2007 | Crandell |
| 2008/0015923 A1 | 1/2008 | Masaba |
| 2008/0027772 A1 | 1/2008 | Gernega et al. |
| 2008/0152036 A1 | 6/2008 | Breed |
| 2008/0189207 A1 | 8/2008 | Wurster |
| 2008/0195428 A1 | 8/2008 | O'Sullivan |
| 2008/0270204 A1 | 10/2008 | Poykko |
| 2008/0277183 A1 | 11/2008 | Huang et al. |
| 2009/0005963 A1 | 1/2009 | Jarvinen |
| 2009/0049044 A1 | 2/2009 | Mitchell |
| 2009/0083111 A1 | 3/2009 | Carr |
| 2009/0140887 A1 | 6/2009 | Breed |
| 2009/0177502 A1 | 7/2009 | Doinoff |
| 2009/0192851 A1 | 7/2009 | Bishop |
| 2009/0210276 A1 | 8/2009 | Krumm et al. |
| 2009/0216600 A1 | 8/2009 | Hill |
| 2009/0248587 A1 | 10/2009 | Van Buskirk |
| 2009/0271227 A1 | 10/2009 | Hayat |
| 2009/0327011 A1 | 12/2009 | Petroff |
| 2010/0030594 A1 | 2/2010 | Swart |
| 2010/0052945 A1 | 3/2010 | Breed |
| 2010/0280884 A1 | 11/2010 | Levine |
| 2010/0299177 A1 | 11/2010 | Buczkowski et al. |
| 2010/0323657 A1 | 12/2010 | Barnard |
| 2011/0099040 A1 | 4/2011 | Felt |
| 2011/0125395 A1 | 5/2011 | Mathews |
| 2011/0130916 A1 | 6/2011 | Mayer |
| 2011/0130954 A1 | 6/2011 | D'Andrea |
| 2011/0153629 A1 | 6/2011 | Lehmann |
| 2011/0191017 A1 | 8/2011 | Certain |
| 2011/0195699 A1 | 8/2011 | Tadayon |
| 2011/0213629 A1 | 9/2011 | Clark |
| 2011/0238457 A1 | 9/2011 | Mason |
| 2011/0288765 A1 | 11/2011 | Conway |
| 2011/0301985 A1 | 12/2011 | Camp et al. |
| 2012/0010912 A1 | 1/2012 | Lele |
| 2012/0041675 A1 | 2/2012 | Juliver |
| 2012/0078672 A1 | 3/2012 | Mohebbi et al. |
| 2012/0109721 A1 | 5/2012 | Cebon |
| 2012/0232943 A1 | 9/2012 | Myr |
| 2012/0239452 A1 | 9/2012 | Trivedi |
| 2012/0290652 A1 | 11/2012 | Boskovic |
| 2013/0006464 A1 | 1/2013 | Speiser |
| 2013/0046586 A1 | 2/2013 | Lerner et al. |
| 2013/0046795 A1 | 2/2013 | Borgerson |
| 2013/0054281 A1 | 2/2013 | Thakkar et al. |
| 2013/0060468 A1 | 3/2013 | Delling |
| 2013/0060586 A1 | 3/2013 | Chen |
| 2013/0073327 A1 | 3/2013 | Edelberg |
| 2013/0096827 A1 | 4/2013 | McCall et al. |
| 2013/0102333 A1 | 4/2013 | Dam |
| 2013/0110385 A1 | 5/2013 | Heed et al. |
| 2013/0132140 A1 | 5/2013 | Amin et al. |
| 2013/0132369 A1 | 5/2013 | Delling et al. |
| 2013/0159028 A1 | 6/2013 | Lerenc et al. |
| 2013/0179205 A1 | 7/2013 | Slinin |
| 2013/0218455 A1 | 8/2013 | Clark |
| 2013/0231965 A1 | 9/2013 | Tokatly |
| 2013/0238167 A1 | 9/2013 | Stanfield et al. |
| 2014/0011522 A1 | 1/2014 | Lin et al. |
| 2014/0052481 A1 | 2/2014 | Monteil |
| 2014/0074757 A1 | 3/2014 | De Gennaro et al. |
| 2014/0082069 A1 | 3/2014 | Varoglu |
| 2014/0129302 A1 | 5/2014 | Amin |

(56) References Cited

U.S. PATENT DOCUMENTS

| | | |
|---|---|---|
| 2014/0129951 A1 | 5/2014 | Amin |
| 2014/0172727 A1 | 6/2014 | Abhyanker |
| 2014/0173511 A1 | 6/2014 | Lehmann et al. |
| 2014/0180773 A1 | 6/2014 | Zafiroglu et al. |
| 2014/0188775 A1 | 7/2014 | Lehmann |
| 2014/0214322 A1 | 7/2014 | Tsimhoni |
| 2014/0229255 A1 | 8/2014 | Scofield |
| 2014/0236413 A1 | 8/2014 | D'Andrea |
| 2014/0278616 A1* | 9/2014 | Stone ............... G06Q 30/0283 705/6 |
| 2014/0323167 A1 | 10/2014 | Spearritt |
| 2014/0324505 A1 | 10/2014 | Lerenc et al. |
| 2014/0365250 A1 | 12/2014 | Ikeda |
| 2015/0006072 A1 | 1/2015 | Goldberg |
| 2015/0095122 A1 | 4/2015 | Eramian |
| 2015/0100238 A1 | 4/2015 | Cai et al. |
| 2015/0112585 A1 | 4/2015 | Knepper |
| 2015/0161554 A1 | 6/2015 | Sweeney et al. |
| 2015/0161564 A1 | 6/2015 | Sweeney |
| 2015/0204684 A1 | 7/2015 | Rostamian et al. |
| 2015/0206437 A1 | 7/2015 | Fowler |
| 2015/0219464 A1 | 8/2015 | Beaurepaire et al. |
| 2015/0242944 A1 | 8/2015 | Willard |
| 2015/0248689 A1 | 9/2015 | Paul |
| 2015/0294430 A1 | 10/2015 | Huang |
| 2015/0310378 A1 | 10/2015 | van der Berg |
| 2015/0310379 A1* | 10/2015 | Farrelly ............... G08G 1/14 705/7.15 |
| 2015/0324717 A1 | 11/2015 | Lord |
| 2015/0324718 A1 | 11/2015 | Lord |
| 2015/0324945 A1 | 11/2015 | Lord et al. |
| 2015/0345951 A1 | 12/2015 | Dutta et al. |
| 2016/0021154 A1 | 1/2016 | Schoeffler |
| 2016/0027306 A1 | 1/2016 | Lambert |
| 2016/0027307 A1 | 1/2016 | Abhyanker |
| 2016/0034845 A1 | 2/2016 | Hiyama |
| 2016/0069694 A1 | 3/2016 | Tao |
| 2016/0123756 A1 | 5/2016 | Becker |
| 2016/0171574 A1 | 6/2016 | Paulucci |
| 2016/0209220 A1 | 7/2016 | Laetz |
| 2016/0210675 A1 | 7/2016 | Smart |
| 2016/0231128 A1 | 8/2016 | Marks |
| 2016/0253599 A1 | 9/2016 | Lang |
| 2016/0320194 A1 | 11/2016 | Liu et al. |
| 2016/0320195 A1 | 11/2016 | Liu |
| 2016/0321771 A1 | 11/2016 | Liu et al. |
| 2016/0335576 A1 | 11/2016 | Peng |
| 2016/0349067 A1 | 12/2016 | Fowe |
| 2016/0356615 A1 | 12/2016 | Arata |
| 2016/0358471 A1* | 12/2016 | Hajj ............... G06F 3/0488 |
| 2016/0361970 A1 | 12/2016 | Pebbles |
| 2016/0364678 A1 | 12/2016 | Cao |
| 2016/0364679 A1 | 12/2016 | Cao |
| 2016/0364812 A1 | 12/2016 | Cao |
| 2016/0364823 A1 | 12/2016 | Cao |
| 2017/0039488 A1 | 2/2017 | Lin |
| 2017/0059334 A1 | 3/2017 | Mukherjee |
| 2017/0098377 A1 | 4/2017 | Marco |
| 2017/0116696 A1 | 4/2017 | Moore |
| 2017/0132540 A1 | 5/2017 | Hapamas |
| 2017/0138749 A1 | 5/2017 | Pan |
| 2017/0146350 A1 | 5/2017 | Beauepaire |
| 2017/0153714 A1 | 6/2017 | Gao et al. |
| 2017/0167882 A1 | 6/2017 | Ulloa Paredes et al. |
| 2017/0169366 A1 | 6/2017 | Klein |
| 2017/0176993 A1 | 6/2017 | Kato |
| 2017/0185948 A1 | 6/2017 | Magazinik |
| 2017/0192437 A1 | 7/2017 | Bier |
| 2017/0227371 A1 | 8/2017 | O'Mahony |
| 2017/0243492 A1 | 8/2017 | Lambert et al. |
| 2017/0248963 A1 | 8/2017 | Levinson et al. |
| 2017/0284819 A1 | 10/2017 | Donnelley |
| 2017/0286884 A1 | 10/2017 | Shoval |
| 2017/0293635 A1 | 10/2017 | Peterson |
| 2017/0300049 A1 | 10/2017 | Seally |
| 2017/0300053 A1 | 10/2017 | Wengreen et al. |
| 2017/0301054 A1 | 10/2017 | Sangoi et al. |
| 2017/0313208 A1 | 11/2017 | Lindsay |
| 2017/0365030 A1 | 12/2017 | Shoham et al. |
| 2018/0032928 A1 | 2/2018 | Li |
| 2018/0046944 A1 | 2/2018 | Barbera |
| 2018/0073882 A1 | 3/2018 | North |
| 2018/0080263 A1 | 3/2018 | Rose |
| 2018/0087915 A1 | 3/2018 | Marco |
| 2018/0091604 A1 | 3/2018 | Yamashita |
| 2018/0096606 A1 | 4/2018 | Moreira-Matias |
| 2018/0121847 A1 | 5/2018 | Zhao |
| 2018/0135993 A1* | 5/2018 | Thangaraj ............... H04L 67/52 |
| 2018/0181128 A1 | 6/2018 | Urano |
| 2018/0189682 A1 | 7/2018 | Seacat |
| 2018/0191863 A1 | 7/2018 | Matthieson et al. |
| 2018/0197418 A1 | 7/2018 | Chu |
| 2018/0209803 A1 | 7/2018 | Rakah |
| 2018/0209805 A1 | 7/2018 | Rakah |
| 2018/0211124 A1 | 7/2018 | Alonso-Mora |
| 2018/0211186 A1 | 7/2018 | Rakah |
| 2018/0211218 A1 | 7/2018 | Berdinis |
| 2018/0211228 A1 | 7/2018 | Narayan |
| 2018/0224866 A1 | 8/2018 | Alonso-mora |
| 2018/0231984 A1 | 8/2018 | Alonso-mora |
| 2018/0251122 A1 | 9/2018 | Golston |
| 2018/0259976 A1 | 9/2018 | Williams |
| 2018/0260787 A1* | 9/2018 | Xi ............... G06Q 10/1095 |
| 2018/0290610 A1 | 10/2018 | Zych |
| 2018/0338225 A1 | 11/2018 | Shimizu |
| 2018/0340790 A1 | 11/2018 | Kislovskiy et al. |
| 2018/0342035 A1 | 11/2018 | Sweeney |
| 2018/0342165 A1 | 11/2018 | Sweeney |
| 2018/0348772 A1 | 12/2018 | Stefan |
| 2018/0356239 A1 | 12/2018 | Marco |
| 2018/0376305 A1 | 12/2018 | Ramalho De Oliveira |
| 2019/0017839 A1 | 1/2019 | Eyler |
| 2019/0086221 A1* | 3/2019 | Thiyagarajan ..... G01C 21/3484 |
| 2019/0114595 A1 | 4/2019 | Raghunathan |
| 2019/0114638 A1* | 4/2019 | Flores ............... G08G 1/202 |
| 2019/0120640 A1 | 4/2019 | Ho |
| 2019/0122561 A1 | 4/2019 | Shimizu |
| 2019/0156254 A1 | 5/2019 | Hansen |
| 2019/0156451 A1 | 5/2019 | Kitagishi |
| 2019/0156646 A1 | 5/2019 | Richey |
| 2019/0171943 A1 | 6/2019 | Pao et al. |
| 2019/0188608 A1 | 6/2019 | Gururajan |
| 2019/0195639 A1* | 6/2019 | Malewicz ............ G01C 21/3423 |
| 2019/0204096 A1 | 7/2019 | Cai |
| 2019/0205842 A1 | 7/2019 | Starns |
| 2019/0206258 A1 | 7/2019 | Chang et al. |
| 2019/0212149 A1 | 7/2019 | Ho |
| 2019/0259182 A1 | 8/2019 | Sarukkai et al. |
| 2019/0265059 A1 | 8/2019 | Warnick |
| 2019/0271552 A1 | 9/2019 | Choi et al. |
| 2019/0311307 A1 | 10/2019 | Ramot |
| 2020/0010090 A1 | 1/2020 | Matsuda |
| 2020/0019894 A1 | 1/2020 | Jin |
| 2020/0042019 A1 | 2/2020 | Marczuk |
| 2020/0082314 A1 | 3/2020 | Crapis |
| 2020/0104965 A1 | 4/2020 | Ramot |
| 2020/0151291 A1 | 5/2020 | Bhattacharya |
| 2020/0151631 A1 | 5/2020 | Lamers |
| 2020/0151885 A1 | 5/2020 | Yang |
| 2020/0160476 A1 | 5/2020 | Ramot |
| 2020/0160477 A1 | 5/2020 | Ramot |
| 2020/0160478 A1 | 5/2020 | Ramot |
| 2020/0160705 A1 | 5/2020 | Chase |
| 2020/0160709 A1 | 5/2020 | Ramot |
| 2020/0160718 A1 | 5/2020 | Saleh |
| 2020/0174487 A1 | 6/2020 | Viswanathan |
| 2020/0191584 A1 | 6/2020 | Kamata |
| 2020/0193834 A1 | 6/2020 | Qin |
| 2020/0273328 A1 | 8/2020 | Muberek |
| 2020/0279195 A1 | 9/2020 | Kobori |
| 2020/0333146 A1 | 10/2020 | Shoval |
| 2020/0334987 A1 | 10/2020 | Shoval |
| 2020/0349666 A1 | 11/2020 | Hodge |
| 2020/0361406 A1 | 11/2020 | Zych |

(56) References Cited

U.S. PATENT DOCUMENTS

| | | | |
|---|---|---|---|
| 2020/0393256 | A1 | 12/2020 | Sahin |
| 2021/0020047 | A1 | 1/2021 | Kuhn |
| 2021/0073825 | A1* | 3/2021 | Walling ............... G06Q 10/10 |
| 2021/0248520 | A1* | 8/2021 | Krishnamurthy ...... G06Q 10/02 |
| 2021/0295706 | A1 | 9/2021 | Shoval |
| 2022/0003561 | A1 | 1/2022 | Shoval |
| 2022/0027818 | A1 | 1/2022 | Jin |
| 2022/0120572 | A9 | 4/2022 | Shoval |
| 2022/0164364 | A1 | 5/2022 | Funk |
| 2023/0119116 | A1 | 4/2023 | Xu |
| 2024/0232273 | A1 | 7/2024 | Pana |

FOREIGN PATENT DOCUMENTS

| | | |
|---|---|---|
| CN | 103279669 | 9/2013 |
| CN | 103327440 | 9/2013 |
| CN | 104751625 | 7/2015 |
| EP | 2605149 | 6/2013 |
| EP | 2665050 | 11/2013 |
| EP | 2792538 A2 | 10/2014 |
| EP | 3023740 | 5/2016 |
| EP | 3472563 | 4/2019 |
| EP | 3574459 | 12/2019 |
| EP | 3631707 | 4/2020 |
| EP | 3640596 | 4/2020 |
| EP | 3659078 | 6/2020 |
| EP | 3738085 | 11/2020 |
| EP | 3776395 | 2/2021 |
| ES | 2 525 738 | 12/2014 |
| GB | 2 397 683 | 7/2004 |
| JP | 2003006294 | 1/2003 |
| JP | A 2003006294 | 1/2003 |
| JP | 2003233656 | 8/2003 |
| JP | A 2003233656 | 8/2003 |
| JP | 2003271706 | 9/2003 |
| JP | A 2003271706 | 9/2003 |
| JP | 2003281422 | 10/2003 |
| JP | A 2003281422 | 10/2003 |
| JP | 2004062490 | 2/2004 |
| JP | A 2004062490 | 2/2004 |
| JP | 2004192366 | 7/2004 |
| JP | 2004362271 | 12/2004 |
| JP | 2009-069117 | 4/2009 |
| JP | 2010 231258 A | 10/2010 |
| JP | 2011214930 | 10/2011 |
| JP | 2019525299 | 9/2019 |
| JP | 2020522789 | 7/2020 |
| KR | 20090044693 | 5/2009 |
| KR | 20100053717 | 5/2010 |
| KR | 101752159 | 6/2017 |
| KR | 102064376 | 2/2020 |
| KR | 20210155209 | 12/2021 |
| SG | 2012065264 | 4/2014 |
| WO | WO2006128946 | 12/2006 |
| WO | WO-2011066468 | 6/2011 |
| WO | WO2012143300 | 10/2012 |
| WO | WO2014106617 | 7/2014 |
| WO | WO2016209595 | 12/2016 |
| WO | WO2017223031 | 12/2017 |
| WO | WO2018140505 | 8/2018 |
| WO | WO2018217640 | 11/2018 |
| WO | WO2019023324 | 1/2019 |
| WO | WO2019136341 | 7/2019 |
| WO | WO2019199766 | 10/2019 |

OTHER PUBLICATIONS

Tim Paul Bauer, Janick Edinger, and Christian Becker, A Qualitative and Quantitative Analysis of Real Time Traffic Information Providers, Proceedings of the 4th IEEE International Workshop on Pervasive Context, 2019.

Schreieck et al. A Matching Algorithm for Dynamic Ridesharing, Transportation Research Procedia, 19, 2016, 272-285.

Paz Linares M. et al. A simulation framework for real-time assessment of dynamic ride sharing demand responsive transportation models, Dec. 11, 2016; Dec. 11, 2016-Dec. 14, 2016, Dec. 11, 2016, pp. 2216-2227, XP058310070, DOI:10.1109/WSC.2016.7822263 ISBN: 987-1-5090-4484-9.

Notice of Allowance for U.S. Appl. No. 16/751,321 dated May 1, 2023.

Notice of Allowance for U.S. Appl. No. 16/379,243 dated Nov. 29, 2022.

Notice of Allowance for U.S. Appl. No. 15/629,919 dated Dec. 7, 2022.

Notice of Allowance for U.S. Appl. No. 16/711,399 dated May 4, 2023.

Notice of Allowance for U.S. Appl. No. 17/856,393 dated Jan. 24, 2023.

Horn, Mark et al. Procedures for planning multi-leg journeys with fixed-route and demand-responsive passenger transport services, Transportation Research Part C: Emerging Technologies 12.1 (2004):33-55 (Year: 2004).

Gruebele, P. "Interactive system for real time dynamic multi-hop carpooling." Global Transport Knowledge Partnership (2008): 1-17.

Ridesharing in North America: Past, Present, and Future, Nelson D. Chan and Susan Shaheen, published in Transport Reviews, vol. 32, No. 1, 93-112, Jan. 2012.

Los Angeles Smart Traveler Field Operational Test Evaluation, Genevieve Giuliano, Randolph W. Hall, and Jacqueline M. Golob, University of Southern California, California PATH Research Report UCB-ITS-PRR-95-41, Dec. 1995.

Seattle Smart Traveler, Daniel J. Dailey, Donald Loseff, David Meyers, Final Research Report, Washington State Transportation Center (TRAC), Oct. 1997, 1-32.

Dynamic Taxi-sharing Service Using Intelligent Transportation System Technologies, Chi-Chung Tao, IEEE, 3209-3212, 2007.

A Survey of Mobile Phone Sensing, Nicholas D. Lane, Emiliano Miluzzo, Hong Lu, Daniel Peebles, Tanzeem Choudhury, and Andrew T. Campbell, IEEE Communications Magazine, 140-150, Sep. 2010.

The Research and Implementation of GPS Intelligent Transmission Strategy Based on on-board Android Smartphones, Zhiqiang Wei, Yaqing Song, Hao Liu, Yanxiu Sheng, and Xi Wang, IEEE, 1230-1233, 2013.

Smarter transportation case study #10: Dynamic Ridesharing in Cork., Transportation for America, https://web.archive.org/web/20111007214904/http://t4america.org/blog/2...ter-transportation-case-study-10-dynamic-ridesharing in-cork-ireland/, Crawled 2011, Retrieved Nov. 15, 2021.

Avego Real-Time Ridesharing, Avego Ltd., https://web.archive.org/web/20111021225957/http://www.avego.com:80/st/realtime.php , Crawled 2011, Retrieved Nov. 15, 2021.

Avego Introduction, Avego Ltd., https://web.archive.org/web/20111102165609/http://www.avego.com:80/st/index.php, Crawled 2011, Retrieved Nov. 15, 2021.

Understanding the NAVSTAR GPS, GIS, and IVHS 2nd Edition, Tom Logsdon, Van Nostrand Reinhold, 1995.

Behind the Success of the CVCC Engine, Honda Worldwide, https://web.archive.org/web/20070219081359/http://world.honda.com/history/challenge/1981navigationsystem/text/01.html, Crawled 2007, Retrieved Dec. 13, 2021.

The Final Test: From Suzuka to Tokyo, Honda Worldwide, https://web.archive.org/web/20070221131328/http://world.honda.com/history/challenge/1981navigationsystem/text/06.html, Crawled 2007, Retrieved Dec. 13, 2021.

Creating a Progressive Strategy, Honda Worldwide, https://web.archive.org/web/20070221131445/http://world.honda.com/history/challenge/1981navigationsystem/text/02.html, Crawled 2007, Retrieved Dec. 13, 2021.

Map Navigation Software of the Electro-Multivision of the '91 Toyota Soarer, Kunihiro Ishikawa, Michima Ogawa, Shiegtoshi Azuma, and Tooru Ito, IEEE Vehicle Navigation and Information Systems Conference, 463-473, 1991.

Automobile Navigation: Where is it Going?, Robert L. French, IEEE Aerospace and Electronic Systems Magazine, vol. 2, Issue: 5, 6-12, May 1987.

(56) References Cited

OTHER PUBLICATIONS

TravTek Global Evaluation and Executive Summary, V.W. Imnan and J.I. Peters, U.S. Department of Transportation Federal Highway Administration, Pub. No. FHWA-RD-96-031, Mar. 1996.

TravTek System Architecture Evaluation, C. Blumentritt, K. Balke, E. Symour, and R. Sanchez, U.S. Department of Transportation Federal Highway Administration, Pub. No. FHWARD-94-141, Jul. 1995.

Historical overview of automobile navigation technology, Robert L. French, 36th IEEE Vehicular Technology Conference, 1986.

The Dynamic Traffic Information Collection and Processing Methods of ITS Common Information Platform Based on Floating Car Technology, Haowei Su and Wei Zhang, IEEE 2008 International Seminar on Future BioMedical Information Engineering, 156-159, 2008.

Furuhata, et al., Ridesharing: The state-of-the-art and future directions, Transportation Research Part B 57 (2013) 28-46U.

Celes Clayson ClaysonCeles@DCC UFMG BR et al: "Mobility Trace Analysis for Intelligent Vehicular Networks", ACM Computing Surveys, ACM, New York, NY, US, US, vol. 54, No. 3, Apr. 17, 2021 (Apr. 17, 2021) pp. 1-38, XP058679020, ISSN: 0360-0300, DOI: 10.1145/3446679.

Rahul Das et al: "Automated Urban Travel Interpretation: A Bottom-up Approach for Trajectory Segmentation", Sensors, vol. 16, No. 11, Nov. 23, 2016 (Nov. 23, 2016), p. 1962, XP055709160.

Goel, Preeti, Lars Kulik and Kotagiri Ramamohanarao, Optimal pick up point selection for effective ride sharing, IEEEE Transactions on Big Data 3.2 (2016): 154-168 (Year:2016).

Ta, Na, et al. "An efficient ride-sharing framework for maximizing shared route." IEEE Transactions on Knowledge and Data Engineering 30.2 (2018): 219-233. (Year: 2018).

Tong, Wei, Jingyu Hua, and Sheng Zhong. "A jointly differentially private scheduling protocol for ridesharing services." IEEE Transactions on Information Forensics and Security 12.10 (2017): 2444-2456. (Year: 2017).

Ota, Masayo, et al. "Stars: Simulating taxi ride sharing at scale." IEEE Transactions on Big Data 3.3 (2016): 349-361. (Year: 2016).

Freiberg, German, et al. Demand Responsive Transit: Understanding Emerging Solutions, WR, Mexico, May 2021: 1-58.

Sottini, Francesco et al., Andiamo: A multiagent system to provide a mobile-based rideshare service, 2006.

Wang et al., Utilizing taxi empty cruise time to solve the short distance trip problem, ITS World Congress, year 2010.

Office Action for U.S. Appl. No. 17/856,393 dated Jan. 24, 2023.
Office Action for U.S. Appl. No. 17/856,393 dated Jan. 29, 2024.
Office Action for U.S. Appl. No. 17/856,393 dated Sep. 12, 2022.
Office Action for U.S. Appl. No. 17/856,393 dated Aug. 25, 2023.
Office Action for U.S. Appl. No. 16/711,399 dated Aug. 30, 2022.
Office Action for U.S. Appl. No. 17/220,688 dated Jan. 25, 2024.
Office Action for U.S. Appl. No. 16/688,052 dated Sep. 1, 2022.
Office Action for U.S. Appl. No. 16/920,100 dated Aug. 30, 2023.
Office Action for U.S. Appl. No. 16/921,382 dated Aug. 16, 2023.
Office Action for U.S. Appl. No. 16/921,411 dated Aug. 31, 2023.
Office Action for U.S. Appl. No. 16/379,243 dated Aug. 30, 2022.
Office Action for U.S. Appl. No. 17/737,520 dated Feb. 12, 2024.
Office Action for U.S. Appl. No. 17/737,520 dated Nov. 8, 2023.
Office Action for U.S. Appl. No. 17/890,789 dated May 23, 2024.
Office Action for U.S. Appl. No. 17/721,562 dated Feb. 20, 2024.
Office Action for U.S. Appl. No. 16/921,411 dated Mar. 13, 2024.
Office Action for U.S. Appl. No. 16/921,411 dated Jul. 18, 2024.
Baouche et al, Efficient Allocation of Electric Vehicle Charging Stations . . . Year 2014.

I. Portugal et al., A Framework for Spatial-Temporal Trajectory Cluster Analysis based on Dynamic Relationships, IEEE Access, vol. 8, pp. 169775-169793, 2020.

Office Action for U.S. Appl. No. 18/326,603 dated Dec. 23, 2024.
Office Action for U.S. Appl. No. 17/915,735 dated Dec. 3, 2024.
Office Action for U.S. Appl. No. 17/856,393 dated Nov. 1, 2024.
Notice of Allowance for U.S. Appl. No. 16/921,411 dated Mar. 3, 2025.

Office Action for U.S. Appl. No. 18/425,279 dated Jan. 10, 2025.
Ma, Shuo et al. T-Share: A large scale dynamic taxi ridesharing service, 2013, IEEE, Proceedings of the 29th International Conference on Data Engineering (ICDCO, 2016, pp. 410-421 (year 2013).

Wen He; Kai Hwang; Deyi Li, Intelligent carpool routing for urban ridesharing by mining GPS trajectories, IEEE Transactions on intelligent transportation systems; year 2014, vol. 15, issue 5, pp. 2286-2296; DOI 10.1109/TITS.2014.2315521.

Dejan Dimitrijevic, Nernanja Nedjc, Vladimir Dimitrieski, Real-time carpooling and ride-sharing: Position paper design concepts, distribution and cloud computing strategies; Computer Science and Information Systems (FedCSIS) 2013 Federated Conference on year 2013, pp. 781-786; Referenced in IEEE Conference Publications.

Harini Sirisena, Ride Buddies-Multi agent system for ride sharing/carpooling; Advances in ICT for Emerging Regions (ICTer) 2014 International Conference year 2014; pp. 252-252, DOI:10.1109/ICTER.2014.7083910: Referenced IEEE Conference Publications.

Chung-Min Chen, David Shallcross, Yunng-Chien Shih. Yen-Ching Wu, Sheng-Po Kou, Yuan-Ying Hsi, Yuhsiang Holderby, William Chou, Smart ride share with flexible route matching: Chung-Min Chen, David Shallcross, Advanced Communication Technology (ICACT) 2011, 13th International Conference, pp. 1506-1510.

Nianbo Liu; Ming Liu; Jiannong Cao; Guihai Chen; Wei Lou, When transportation meets communication: V2P over VANETs; Distributed Computing Systems (ICDCS) 2010 IEEE 30th International Conference year 2010, pp. 567-576, DOI:10.1109/ICDCS.2010.83.

Li et al., A dynamic pricing method for carpooling service based on coalition at game analysis; 2016 IEEE 18th Intern Conf on High Performance Computing and Comm; IEEE 14th Intern Conf on Smart City IEEE 2nd Intern Conf on Data Science and Systems (hpcc/SmartCity/dss 9HPCC/Smartcity/DSS) year 2016 pp. 78-85; DOI:10.1109/HPCC-SmartCity-DSS) year 2016, pp. 78-85, DOI:10.1109/HPCC-SmartCity-DSS.2016.0022.

Lasse Korsholm Poulsen, Daan Dekkers, Nicolaas Wagenaar; Wesley Snijders; Ben Lewinsky; Raghava Rao Mukkamala; Ravi Valrapu; Green cabs vs. Uber in New York City, 2016 IEEE international Congress on Big Data (BigDataCongress) Year 2016:pp. 222-229, DOI: 10.1109/BigDataCongress.2016.35.

Hawkins, Andrew, Uberhop is Uber's Latest idea for killing mass transit, Dec. 8, 2015, The Verge, p. 1-4.

Alonso-Mora, Javier et al. "On-Demand High-Capacity Ride-Sharing via Dynamic Trip-Vehicle Assignment." Proceedings of the National Academy of Sciences 114, 3 (Jan. 2017): 462-467 © 2017 National Academy of Sciences.

Mora, Supplemental Material—On Demand high-capacity ridesharing via dynamic trip-vehicle assignment, Jul. 20, 2016, p. 1-36.

Whitney, Alyse, I took Via to work every day for a month. Here's what I learned, May 10, 2016, p. 1-3.

Y. Hou, W. Zhong, L. Su, K. Hulme, A. W. Sadek and Qiao, "TASeT: Improving the Efficiency of Electric Taxis With Transfer-Allows Rideshare", in IEEE Transactions on Vehicular Technology, vol. 56., No. 12, pp. 9518-9528, Dec. 2016, doi:10.1109//TVT.2016.2592983. (Year 2016).

Agatz, Niels, et al. "Optimization for dynamic ride-sharing: A review." European Journal of Operational Research 223.2 (2012): 295-303 (year:2012).

Office Action for European Appl. No. 18731617.9 dated Jan. 25, 2022.
Office Action for U.S. Appl. No. 16/752,381 dated Apr. 14, 2022.
Office Action for European Appl. No. 19702319.5 dated Jan. 25, 2022.
Office Action for European Appl. No. 18758779.5 dated Nov. 8, 2021.
Office Action for European Appl. No. 19702319.5 dated Oct. 26, 2021.
Office Action for European Appl. No. 18703675.1 dated Oct. 8, 2021.
Office Action for Japanese Appl. No. 2019-564501 dated Jan. 27, 2021.
Office Action for U.S. Appl. No. 16/752,281 dated Apr. 14, 2022.
Office Action for U.S. Appl. No. 16/921,257 dated Mar. 31, 2022.

(56) References Cited

OTHER PUBLICATIONS

Notice of Allowance for U.S. Appl. No. 16/750,679 dated May 3, 2021.

Office Action for U.S. Appl. No. 15/916,373 dated Dec. 16, 2020.

Yang, Funing, et al. "Future-Aware Balanced Preference Matching for Real-Time On-Demand Taxi Dispatch." IEEE Internet of Things Journal (Year: 2024).

E. Bakiris et al. "Clustered-NSGA-II+: A Multi-Objective Evolutionary Genetic Algorithm for Solving the Ride-Sharing Problem with the Same Destination," 2024 15th Inter Conf on Information, Intelligence, Syst & Applications (USA), Chania Crete, Greece, 2024 pp. 1-8, doi: 10.1109 (Year: 2024).

Cheng, Yurong, et al. "Cross Online Ride-Sharing for Multiple-Platform Cooperations in Spatial Crowdsourcing." 2024 IEEE 40th International Conference on Data Engineering (Icde). IEEE, (Year: 2024).

Amilbek, Nurbolat, et al. "Development of a Deep Learning Model for Forecasting and Optimizing Ride-Sharing Routes." Journal of Problems in Computer Science and Information Technologies 3.1 : 56-71 (Year: 2025).

Notice of Allowance for U.S. Appl. No. 16/921,411 dated Jun. 17, 2025.

Final Office Action for U.S. Appl. No. 17/915,735 dated Apr. 23, 2015.

Final Office Action for U.S. Appl. No. 18/326,603 dated Jun. 18, 2025.

Final Office Action for U.S. Appl. No. 17/721,562 dated Jun. 13, 2025.

Minett, Paul, Albany Village and John Pearce, Flexible carpooling: challenging the ride match paradigm, saving energy by making it easier to share rides, Energy Policy Journal 21.3 (2008): 134-159.

Notice of Allowance from U.S. Appl. No. 17/856,393 dated Jul. 22, 2025.

\* cited by examiner

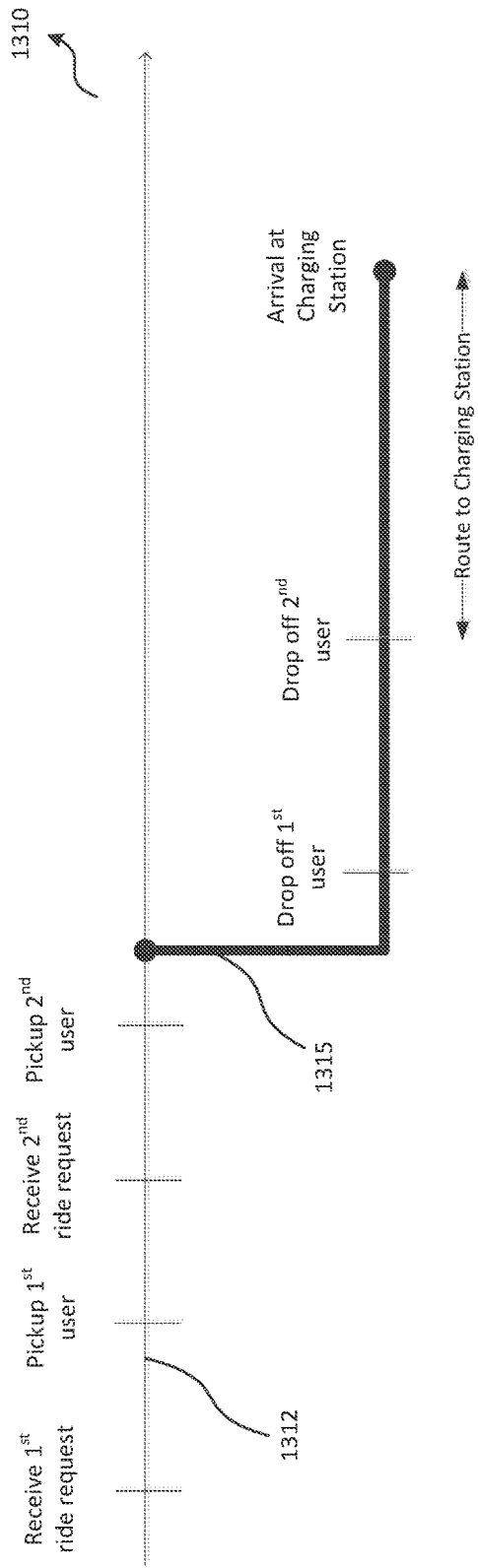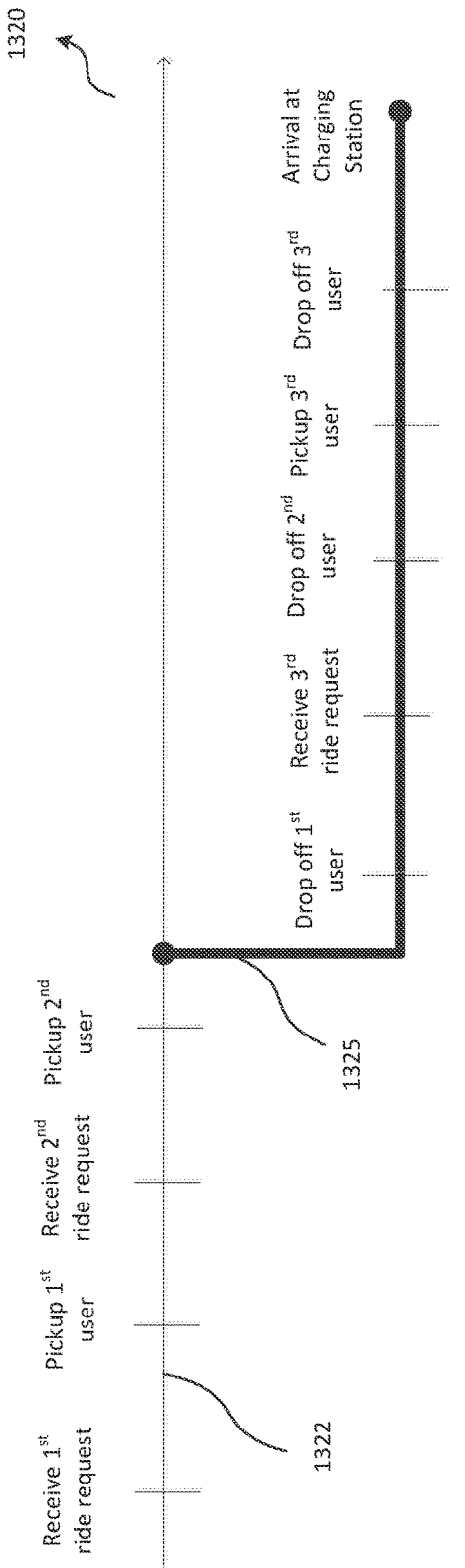

```
                                                                              2000

┌──────────────────────────────────────────────────────────┐
│  Receive a shared-ride request from a user, the shared-ride │
│  request including an indication of a starting point and a │ ── 2010
│                    desired destination                     │
└──────────────────────────────────────────────────────────┘
                              │
                              ▼
┌──────────────────────────────────────────────────────────┐
│  Visually display to the user at least one option for     │
│  customizing the shared-ride request with at least one    │ ── 2020
│                        restriction                        │
└──────────────────────────────────────────────────────────┘
                              │
                              ▼
┌──────────────────────────────────────────────────────────┐
│  Receive from the user at least one restriction on the shared- │ ── 2030
│                        ride request                       │
└──────────────────────────────────────────────────────────┘
                              │
                              ▼
┌──────────────────────────────────────────────────────────┐
│     Provide to the user based on the received shared-ride │
│  request, at least one offer that accounts for the at least one │ ── 2040
│                        restriction                        │
└──────────────────────────────────────────────────────────┘
```

*FIG. 20A*

SYSTEMS AND METHODS FOR MANAGING RIDESHARING VEHICLES

CROSS REFERENCES TO RELATED APPLICATIONS

This application is a continuation of PCT Application No. PCT/US2018/033681, filed May 21, 2018, which claims the benefit of priority of U.S. Provisional Patent Application No. 62/509,376, filed May 22, 2017; U.S. Provisional Patent Application No. 62/537,155, filed Jul. 26, 2017; U.S. Provisional Patent Application No. 62/594,325, filed Dec. 4, 2017; and U.S. Provisional Patent Application No. 62/614,558, filed Jan. 8, 2018. All of the foregoing applications are incorporated herein by reference in their entirety.

BACKGROUND

I. Technical Field

The present disclosure generally relates to the field of vehicle ridesharing and systems and methods for ridesharing management.

II. Background Information

Recent years have witnessed increasing interest and development in the field of vehicle sharing, where one or more riders may share the same vehicle for a portion of their rides. Ridesharing may save ride costs, increase vehicle utilization, and reduce air pollution. A rider may use a ridesharing service through a ridesharing service application accessed by the rider's mobile device.

SUMMARY

Embodiments consistent with the present disclosure provide systems and methods for vehicle ridesharing and for managing a fleet of ridesharing vehicles. For example, consistent with the disclosed embodiments, the fleet of ridesharing vehicles may include more than 10 ridesharing vehicles, more than 100 ridesharing vehicles, or more than 1000 ridesharing vehicles that pick up multiple users and drop them off at locations proximate but other than their desired destinations.

In one embodiment, a system may manage a fleet of ridesharing vehicles including electrically-powered ridesharing vehicles. The system may include memory configured to store locations of a plurality of charging stations located within a geographic area and a number of charging points in each charging station, a communication interface configured to communicate with the plurality of charging stations and with a plurality of electrically-powered ridesharing vehicles traveling within the geographic area, and at least one processor. The at least one processor may be configured to receive current vehicle location data for the plurality of electrically-powered ridesharing vehicles, wherein the current vehicle location data includes global positioning system (GPS) data generated by at least one GPS component associated with each electrically-powered ridesharing vehicle; receive current battery-charge data for the plurality of electrically-powered ridesharing vehicles, wherein the current battery-charge data is indicative of a driving distance in which each electrically-powered ridesharing vehicle can operate before charging; receive current occupancy data for the plurality of charging stations, wherein the current occupancy data includes a current capacity utilization for each charging point and current battery-charge data for each electrically-powered ridesharing vehicle located at a charging station; select a charging station for a specific electrically-powered ridesharing vehicle, wherein the selected charging station is other than a charging station closest to a current location of the specific electrically-powered ridesharing vehicle; and direct the specific electrically-powered ridesharing vehicle to the selected charging station.

In one embodiment, a non-transitory computer-readable storage medium may store instructions that, when executed by at least one processor, cause the at least one processor to perform a method for managing a fleet of ridesharing vehicles including electrically-powered ridesharing vehicles. The method may include accessing stored locations of a plurality of charging stations located within a geographic area and a number of charging points in each charging station; receiving current vehicle location data for a plurality of electrically-powered ridesharing vehicles traveling within the geographic area, wherein the current vehicle location data includes global positioning system (GPS) data generated by at least one GPS component associated with each electrically-powered ridesharing vehicle; receiving current battery-charge data for the plurality of electrically-powered ridesharing vehicles, wherein the current battery-charge data is indicative of a driving distance in which each electrically-powered ridesharing vehicle can operate before charging; receiving current occupancy data for a plurality of charging stations located in the geographic area, wherein the current occupancy data includes a current capacity utilization for each charging point and current battery-charge data for each electrically-powered ridesharing vehicle located at a charging station; selecting a charging station for a specific electrically-powered ridesharing vehicle, wherein the selected charging station is other than a charging station closest to a current location of the specific electrically-powered ridesharing vehicle; and directing the specific electrically-powered ridesharing vehicle to the selected charging station.

In one embodiment, a system may manage a fleet of ridesharing vehicles including electrically-powered ridesharing vehicles. The system may include memory configured to store locations of a plurality of charging stations located within a geographic area; a communication interface configured to communicate with a plurality of electrically-powered ridesharing vehicles traveling within the geographic area; and at least one processor. The at least one processor may be configured to receive ride requests from a plurality of users, wherein each ride request includes a starting point and a desired destination within the geographic area; assign an electrically-powered ridesharing vehicle to pick-up the plurality of users such that at least some of the users share their ride with at least one other passenger; receive current vehicle location data for the electrically-powered ridesharing vehicle, wherein the current vehicle location data includes global positioning system (GPS) data generated by at least one GPS component associated with the electrically-powered ridesharing vehicle; receive current battery-charge data for the electrically-powered ridesharing vehicle, wherein the current battery-charge data is indicative of a driving distance in which the electrically-powered ridesharing vehicle can operate before recharging; and based on the current vehicle location data, the current battery-charge data, the desired destinations of passengers currently riding the electrically-powered ridesharing vehicle, and the stored locations of the charging stations, determine a route for the electrically-powered ridesharing vehicle that ends at a charging station.

In one embodiment, a non-transitory computer-readable storage medium may store instructions that, when executed by at least one processor, cause the at least one processor to perform a method for managing a fleet of ridesharing vehicles including electrically-powered ridesharing vehicles. The method may include accessing stored locations of a plurality of charging stations located within a geographic area; receiving ride requests from a plurality of users, wherein each ride request includes a starting point and a desired destination within the geographic area; assigning an electrically-powered ridesharing vehicle to pick-up the plurality of users such that at least some of the users share their ride with at least one other passenger; receiving current vehicle location data for the electrically-powered ridesharing vehicle, wherein the current vehicle location data includes global positioning system (GPS) data generated by at least one GPS component associated with the electrically-powered ridesharing vehicle; receiving current battery-charge data for the electrically-powered ridesharing vehicle, wherein the current battery-charge data is indicative of a driving distance in which the electrically-powered ridesharing vehicle can operate before recharging; and based on the current vehicle location data, the current battery-charge data, the desired destinations of passengers currently riding the electrically-powered ridesharing vehicle, and the stored locations of the charging stations, determining a route for the electrically-powered ridesharing vehicle that ends at a charging station.

In one embodiment, a ridesharing vehicle may account for battery charging stops. The ridesharing vehicle may include a vehicle body, a battery located within the vehicle body and configured to provide a driving voltage to operate the ridesharing vehicle, a power sensor in the vehicle for determining a current charge level of the battery, and a communications interface located within the vehicle body and configured to exchange data with a remote server over a wireless channel. The ridesharing vehicle may also include a processor configured to receive from the communications interface a first driving route for transporting a plurality of passengers assigned to the ridesharing vehicle, wherein the first driving route is determined such that at least some of the assigned plurality of passengers share their ride with at least one other passenger, receive from the power sensor the current charge level of the battery, transmit to the remote server via the communications interface an indicator of the current charge level of the battery, and receive, in response to transmission of the indicator, via the communications interface, at least one second driving route that avoids pick up of additional ridesharing passengers until the ridesharing vehicle is empty of passengers, and thereafter direct the ridesharing vehicle to a charging station where the ridesharing vehicle is to be taken out of service for battery recharging.

In one embodiment, a method may account for battery charging stops. The method may include determining a current charge level of a battery configured to provide a driving voltage to operate a ridesharing vehicle, receiving from a remote server a first driving route for transporting a plurality of passengers assigned to the ridesharing vehicle, wherein the first driving route is determined such that at least some of the assigned plurality of passengers share their ride with at least one other passenger, transmitting to the remote server, via a communications interface, an indicator of a current charge level of the battery, and in response to transmission of the indicator, receiving at least one second driving route that avoids pick up of additional ride-sharing passengers until the ridesharing vehicle is empty of passengers, and thereafter directs the vehicle to a charging station where the ridesharing vehicle is to be taken out of service for battery recharging.

In one embodiment, a system may manage a fleet of ridesharing vehicles. The system may include at least one communications interface configured to receive ride requests from a plurality of users and to communicate with a plurality of electrically-powered ridesharing vehicles. The system may also include a processor configured to receive current vehicle location data for the plurality of electrically-powered ridesharing vehicles, wherein the current vehicle location data includes global positioning system (GPS) data generated by at least one GPS component associated with each electrically-powered ridesharing vehicle, receive a plurality of ride requests from the plurality of users, wherein each ride request includes pick-up and drop-off location information, assign a plurality of passengers to a specific electrically-powered ridesharing vehicle, transmit to the specific electrically-powered ridesharing vehicle a first driving route for transporting the plurality of passengers, wherein the driving route is determined such that at least some of the assigned plurality of passengers share their ride with at least one other passenger, receive from the specific electrically-powered ridesharing vehicle an indicator of a current charge level of the battery, access a database of battery charging station information, including a plurality of battery charging station locations, and cause to be transmitted over a wireless network to the specific electrically powered vehicle, at least one second driving route that avoids pick up of additional ride-sharing passengers until the vehicle is empty of passengers, and thereafter directs the specific electrically-powered ridesharing vehicle to a charging station where the specific electrically-powered ridesharing vehicle is to be taken out of service for battery recharging.

In one embodiment, a system for managing a fleet of vehicles for hire including electrically-powered vehicles may include a communications interface configured to receive a plurality of ride requests from a plurality of users and to communicate with a plurality of electrically-powered vehicles-for-hire. The system may include a processor configured to receive current vehicle location data for the plurality of electrically-powered vehicles-for-hire, wherein the current vehicle location data includes global positioning system (GPS) data generated by at least one GPS component associated with each electrically-powered vehicle-for-hire, receive, from a power sensor in each of the plurality of electrically-powered vehicles-for-hire, battery-charge data indicative of a need for battery recharging, receive the plurality of ride requests from the plurality of users, wherein each ride request includes information about a pick-up location and a desired destination, identify, from the battery-charge data, a specific electrically-powered vehicle-for-hire in need of a charge, access a database of charging information, including locations of a plurality of charging stations, for ride requests with pick-up locations in the vicinity of the specific electrically-powered vehicle-for-hire in need of the charge, compare associated desired destinations in the plurality of ride requests with the locations of the plurality of charging stations accessed in the database, in order to identify a specific ride request with a desired destination in a vicinity of a specific charging station, cause to be transmitted, over a wireless network to the specific electrically-powered vehicle-for-hire in need of the charge, a dispatch to the pick-up location associated with the specific ride request, route the specific electrically-powered vehicle-for-hire to a drop-off location associated with the specific ride request, and following arrival at the drop-off location associated with the specific ride request, route the specific electrically-powered vehicle-for-hire to the specific charging station.

In one embodiment, a non-transitory computer readable storage medium may store instructions that when executed by at least one processor, cause the at least one processor to perform a method for managing a fleet of vehicles for hire including electrically powered vehicles. The method may include receiving current vehicle location data for a plurality of electrically-powered vehicles-for-hire, wherein the current vehicle location data includes global positioning system (GPS) data generated by at least one GPS component associated with each electrically-powered vehicle-for-hire, receiving, from a power sensor in each of the plurality of electrically-powered vehicles-for-hire, battery-charge data indicative of a need for battery recharging, receiving a plurality of ride requests from a plurality of users, wherein each ride request includes information about a pick-up location and a desired destination, identifying, from the battery-charge data, a specific electrically-powered vehicle-for-hire in need of a charge, accessing a database of charging information, including locations of a plurality of charging stations, for ride requests with pick-up locations in the vicinity of the specific electrically-powered vehicle-for-hire in need of a charge, comparing associated desired destinations in the plurality of ride requests with the charging station locations accessed in the database, in order to identify a specific ride request with a desired destination in a vicinity of a specific charging station, transmitting over a wireless network to the specific electrically-powered vehicle-for-hire in need of the charge, a dispatch to the pick-up location associated with the specific ride request, routing the specific electrically-powered vehicle-for-hire to a drop-off location associated with the specific ride request, and following arrival at the drop-off location associated with the specific ride request, routing the specific electrically-powered vehicle-for-hire to the specific charging station.

In one embodiment, a computer program product for enabling varied ridesharing services may be embodied in a non-transitory computer-readable medium and may be executable by at least one processor. The computer program product may include at least one processor for executing a method. The method may include receiving a shared-ride request from a user, the shared-ride request including an indication of a starting point and a desired destination, visually displaying to the user at least one option for customizing the shared-ride request with at least one restriction, the at least one restriction including limiting a walking distance to a pick-up location, limiting a walking distance from a drop-off location to the desired destination, limiting a number of riders in a ridesharing vehicle with the user, limiting an estimated delay to a ride of the user, limiting a number of pick-ups while the user is in the ridesharing vehicle, limiting a number of drop-offs while the user is in the ridesharing vehicle, and toll road avoidance, receiving from the user at least one restriction on the shared-ride request, and providing to the user based on the received shared-ride request, at least one offer that accounts for the at least one restriction.

In one embodiment, a system for enabling varied ridesharing services may include a communications interface for receiving shared-ride requests from prospective passengers and for transmitting information to the prospective passengers. The system may also include a processor configured to receive, via the communications interface, a request for a shared-ride from a user, the shared-ride request including an indication of a starting point and a desired destination, receive, via the communications interface, at least one restriction associated with the user, wherein the at least one restriction includes limiting a walking distance to a pick-up location, limiting a walking distance from a drop-off location to the desired destination, limiting a number of riders in a ridesharing vehicle with the user, limiting an estimated delay to a ride of the user, limiting a number of pick-ups while the user is in the ridesharing vehicle, limiting a number of drop-offs while the user is in the ridesharing vehicle, and toll road avoidance, receive current vehicle location data for a fleet of ridesharing vehicles, wherein the current vehicle location data includes global positioning system (GPS) data generated by at least one GPS component associated with each ridesharing vehicle, identify at least one candidate ridesharing vehicle to pick up the user, provide to the user, via the communications interface, multiple offers associated with the at least one candidate ridesharing vehicle, receive, via the communications interface, a selection of an offer, and direct a ridesharing vehicle associated with the selected offer to pick up the user.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, illustrate various example embodiments. In the drawings:

FIG. 13A is a schematic illustration of a first and second route in response to an indicator of the current charge level of a battery, according to a first embodiment and consistent with the present disclosure.

FIG. 13B is a schematic illustration of a first and second route in response to an indicator of the current charge level of a battery, according to a second embodiment and consistent with the present disclosure.

FIG. 20A is a flowchart showing an exemplary process for providing different levels of service for ridesharing, according to a first embodiment and consistent with the present disclosure.

DETAILED DESCRIPTION

Figure 1:
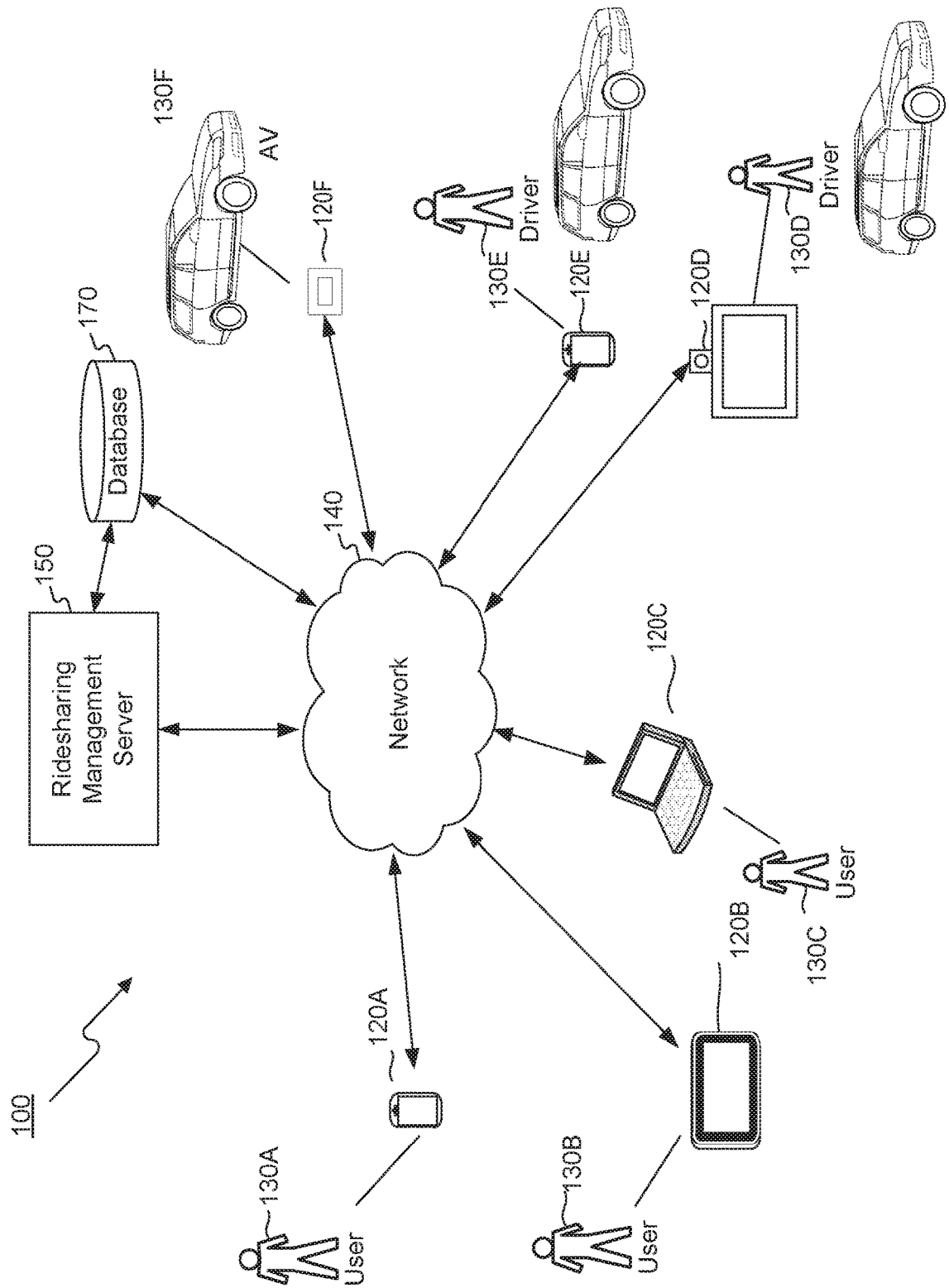
FIG. 1 is a diagram illustrating an example ridesharing management system, in accordance with some embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Disclosed embodiments of the present disclosure provide methods and systems for vehicle ridesharing and vehicle ridesharing management. The term "vehicle" or "ridesharing vehicle" as used herein refers to any kind of vehicle (e.g., car, van, SUV, truck, bus, etc.) suitable for human transportation, such as providing ride services. In some embodiments, a vehicle may be a taxi. In some embodiments, a vehicle may include an autonomous vehicle, wherein a control device integrated with the vehicle or a management system separate from the vehicle may send operational instructions and guide the vehicle to designated pick-up locations and drop-off locations. For the ease and conciseness of description, some embodiments disclosed herein may simply refer to a vehicle or a taxi as an example, which does not limit the scope of the disclosed embodiments.

Consistent with some embodiments of the present disclosure, a ridesharing management system may receive a first ride request from a first user. The first ride request may include a starting point and a desired destination. The ridesharing management system may calculate a first estimated pick-up time based on a current location of a vehicle that is in the surrounding areas. After sending a confirmation with the estimated pick-up time, the ridesharing management system may then guide the vehicle to a pick-up location for picking up the first rider. The pick-up location may be a different location from the starting point included in the first ride request. The system may also guide the first user to the pick-up location.

In some embodiments, the system may subsequently receive a second ride request from a second user, for example, while the first user is still in the vehicle. The second ride request may include a second starting point and a second desired destination. The system may calculate a second estimated pick-up time, provide a second confirmation to the second rider, and guide the second rider to a second pick-up location. In some embodiments, the second pick-up location may be a different location from the second starting point included in the second ride request.

In some embodiments, the system may calculate the fares for each user, based on the solo ride portion for a corresponding user, and the shared portion of the ride. For example, the system may offer a discount for the shared portion of the ride. In some embodiments, the system may also calculate the fare amount for a particular user based on various service-related parameters such as user input regarding whether to use toll roads, the walking distance between the starting point and the pick-up location, and the walking distance between the desired destination and the drop-off location.

The embodiments herein further include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a "non-transitory computer-readable storage medium" refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be used in implementing a computer-implemented method. The term "computer-readable storage medium" should be understood to include tangible items and exclude carrier waves and transient signals.

FIG. 1 is a diagram illustrating an example ridesharing management system, in which various implementations as described herein may be practiced, according to some embodiments of the present disclosure. As shown in FIG. 1, ridesharing management system 100 includes one or more mobile communications devices 120A-120F (collectively referred to as mobile communications devices 120), a network 140, a ridesharing management server 150, and a database 170. The plurality of mobile communications devices 120A-120F may further include a plurality of user devices 120A-120C associated with users 130A-130C respectively, a plurality of driver devices 120D and 120E associated with drivers 130D and 130E, and a driving-control device 120F associated with an autonomous vehicle 130F. Consistent with some embodiments of the present disclosure, ridesharing management server 150 may communicate with driving-control device 120F to direct autonomous vehicle 130F to pick up and drop off users 130A-130C. In one example, autonomous vehicles capable of detecting objects on the road and navigate to designated locations may be utilized for providing ridesharing services.

The components and arrangements shown in FIG. 1 are not intended to limit the disclosed embodiments, as the system components used to implement the disclosed processes and features can vary. For example, ridesharing management system 100 may include multiple ridesharing management servers 150, and each ridesharing management server 150 may handle a certain category of ridesharing services, ridesharing services associated with a certain category of service vehicles, or ridesharing services in a specific geographical region, such that a plurality of ridesharing management servers 150 may collectively provide a dynamic and integrated ridesharing service system.

Network 140 may facilitate communications between user devices 120 and ridesharing management server 150, for example, receiving ride requests and other ride server related input from or sending confirmations to user devices, and sending ride service assignments to driver devices and driving-control devices. Network 140 may be any type of networks that provides communications, exchanges information, and/or facilitates the exchange of information between ridesharing management server 150 and user devices 120. For example, network 140 may be the Internet, a Local Area Network, a cellular network, a public switched telephone network ("PSTN"), or other suitable connection(s) that enables ridesharing management system 100 to send and receive information between the components of ridesharing management system 100. Network 140 may support a variety of messaging formats, and may further support a variety of services and applications for user devices 120. For example, network 140 may support navigation services for mobile communications devices 120, such as directing the users and service vehicles to pick-up or drop-off locations.

Ridesharing management server 150 may be a system associated with a communication service provider which provides a variety of data or services, such as voice, messaging, real-time audio/video, to users, such as users 130A-130E. Ridesharing management server 150 may be a computer-based system including computer system components, desktop computers, workstations, tablets, handheld mobile communications devices, memory devices, and/or internal network(s) connecting the components. Ridesharing management server 150 may be configured to receive information from mobile communications devices 120 over network 140, process the information, store the information, and/or transmit information to mobile communications devices 120 over network 140.

For example, in some embodiments, ridesharing management server 150 may be configured to: receive ride requests from user devices 120A-120C, send ride confirmation and ride fare information to user devices 120A-120C, and send ride service assignments (for example, including pick-up and drop-off location information) to driver devices 120D and 120E, and driving-control device 120F. Further, ridesharing management server 150 may further be configured to receive user input from user devices 120A-120C as to various ride service parameters, such as walking distance to a pick-up location, maximum delay of arrival/detour, and maximum number of subsequent pick-ups, etc. In some embodiments, ridesharing management server 150 may be further configured to: calculate ride fares based on a solo portion of a user's ride and a shared portion of the ride. Further, the ride fare calculation may further be based on various ride service parameters set by the user, such as the walking distance involved in the ride, and user selection regarding toll road usage, etc.

Database 170 may include one or more physical or virtual storages coupled with ridesharing management server 150. Database 170 may be configured to store user account information (including registered user accounts and driver accounts), corresponding user profiles such as contact information, profile photos, and associated mobile communications device information. With respect to users, user account information may further include ride history, service feedbacks, complaints, or comments. With respect to drivers, user account information may further include number of ride service assignments completed, ratings, and ride service history information. Database 170 may further be configured to store various ride requests received from user devices 120A-120C and corresponding starting point and desired destination information, user input regarding various service parameters, pick-up and drop-off locations, time of pick-up and drop-off, ride fares, and user feedbacks, etc.

Database 170 may further include traffic data, maps, and toll road information, which may be used for ridesharing service management. Traffic data may include historical traffic data and real-time traffic data regarding a certain geographical region, and may be used to, for example, calculate estimate pick-up and drop-off times, and determine an optimal route for a particular ride. Real-time traffic data may be received from a real-time traffic monitoring system, which may be integrated in or independent from ridesharing management system 100. Maps may include map information used for navigation purposes, for example, for calculating potential routes and guiding the users to a pick-off or drop-off location. Toll road information may include toll charges regarding certain roads, and any change or updates thereof. Toll road information may be used to calculate ride fares, for example, in cases where the user permits use of toll roads.

The data stored in database 170 may be transmitted to ridesharing management server 150 for accommodating ride requests. In some embodiments, database 170 may be stored in a cloud-based server (not shown) that is accessible by ridesharing management server 150 and/or mobile communications devices 120 through network 140. While database 170 is illustrated as an external device connected to ridesharing management server 150, database 170 may also reside within ridesharing management server 150 as an internal component of ridesharing management server 150.

As shown in FIG. 1, users 130A-130E may include a plurality of users 130A-130C, and a plurality of drivers 130D and 130E, who may communicate with one another, and with ridesharing management server 150 using various types of mobile communications devices 120. As an example, a mobile communications device 120 may include a display such as a television, tablet, computer monitor, video conferencing console, or laptop computer screen. A mobile communications device 120 may further include video/audio input devices such as a microphone, video camera, keyboard, web camera, or the like. For example, a mobile communications device 120 may include mobile devices such as a tablet or a smartphone having display and video/audio capture capabilities. A mobile communications device 120 may also include one or more software applications that facilitate the mobile communications devices to engage in communications, such as IM, VoIP, video conferences. For example, user devices 130A-130C may send requests to ridesharing management server 150, and receive confirmations therefrom. Drivers 130D and 130E may use their respective devices to receive ride service assignments and navigation information from ridesharing management server 150, and may contact the users with their respective devices 120D and 120E.

In some embodiments, a user may directly hail a vehicle by hand gesture or verbal communication, such as traditional street vehicle hailing. In such embodiments, once a driver accepts the request, the driver may then use his device to input the ride request information. Ridesharing management server 150 may receive such request information, and accordingly assign one or more additional ride service assignments to the same vehicle, for example, subsequent e-hail ride requests received from other mobile communications devices 120 through network 140.

In some embodiments, driver devices 120D and 120E, and driving-control device 120F may be embodied in a vehicle control panel, as a part of the vehicle control system associated with a particular vehicle. For example, a traditional taxi company may install a drive device in all taxi vehicles managed by the taxi company. In some embodiments, driver devices 120D and 120E, and driving-control device 120F, may be further coupled with a payment device, such as a card reader installed as a part of the vehicle control panel or as a separate device associated with the vehicle. A user may then use the payment device as an alternative payment mechanism. For example, a user who hails the taxi on the street may pay through the payment device, without using a user device providing ridesharing service.

Figure 2:
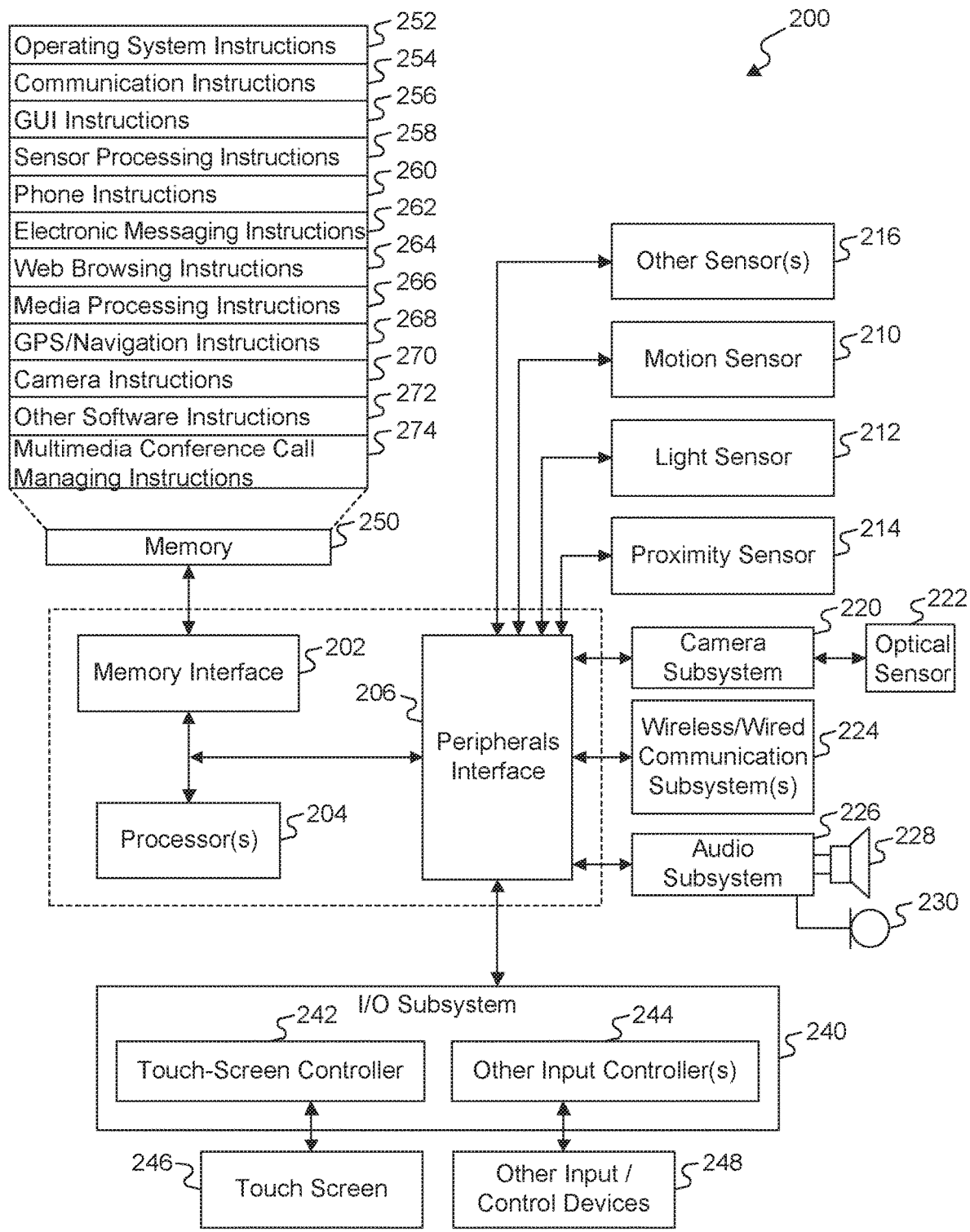
FIG. 2 is a diagram illustrating the components of an example mobile communications device associated with a ridesharing management system, in accordance with some embodiments of the present disclosure.

FIG. 2 is a diagram illustrating the components of an example mobile communications device 200 associated with a ridesharing management system, such as system 100 as shown in FIG. 1, in accordance with some embodiments of the present disclosure. Mobile communications device 200 may be used to implement computer programs, applications, methods, processes, or other software to perform embodiments described in the present disclosure, such as mobile communications devices 120A-120F. For example, user devices 120A-120C, driver devices 120D and 120E, and driving-control device 120F may respectively be installed with a user side ridesharing application, and a corresponding driver side ridesharing application.

Mobile communications device 200 includes a memory interface 202, one or more processors 204 such as data processors, image processors and/or central processing units, and a peripherals interface 206. Memory interface 202, one or more processors 204, and/or peripherals interface 206 can be separate components or can be integrated in one or more integrated circuits. The various components in mobile communications device 200 may be coupled by one or more communication buses or signal lines.

Sensors, devices, and subsystems can be coupled to peripherals interface 206 to facilitate multiple functionalities. For example, a motion sensor 210, a light sensor 212, and a proximity sensor 214 may be coupled to peripherals interface 206 to facilitate orientation, lighting, and proximity functions. Other sensors 216 may also be connected to peripherals interface 206, such as a positioning system (e.g., GPS receiver), a temperature sensor, a biometric sensor, or other sensing device, to facilitate related functionalities. A GPS receiver may be integrated with, or connected to, mobile communications device 200. For example, a GPS receiver may be included in mobile telephones, such as smartphone devices. GPS software may allow mobile telephones to use an internal or external GPS receiver (e.g., connecting via a serial port or Bluetooth). A camera subsystem 220 and an optical sensor 222, e.g., a charged coupled device ("CCD") or a complementary metal-oxide semiconductor ("CMOS") optical sensor, may be used to facilitate camera functions, such as recording photographs and video clips.

Communication functions may be facilitated through one or more wireless/wired communication subsystems 224, which includes a Ethernet port, radio frequency receivers and transmitters and/or optical (e.g., infrared) receivers and transmitters. The specific design and implementation of wireless/wired communication subsystem 224 may depend on the communication network(s) over which mobile communications device 200 is intended to operate. For example, in some embodiments, mobile communications device 200 may include wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

I/O subsystem 240 may include touch screen controller 242 and/or other input controller(s) 244. Touch screen controller 242 may be coupled to touch screen 246. Touch screen 246 and touch screen controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 246. While touch screen 246 is shown in FIG. 2, I/O subsystem 240 may include a display screen (e.g., CRT or LCD) in place of touch screen 246.

Other input controller(s) 244 may be coupled to other input/control devices 248, such as one or more buttons, rocker switches, thumb-wheel, infrared port, USB port, and/or a pointer device such as a stylus. Touch screen 246 may, for example, also be used to implement virtual or soft buttons and/or a keyboard.

Memory interface 202 may be coupled to memory 250. Memory 250 includes high-speed random access memory and/or non-volatile memory, such as one or more magnetic disk storage devices, one or more optical storage devices, and/or flash memory (e.g., NAND, NOR). Memory 250 may store an operating system 252, such as DRAWN, RTXC, LINUX, iOS, UNIX, OS X, WINDOWS, or an embedded operating system such as VXWorkS. Operating system 252 may include instructions for handling basic system services and for performing hardware dependent tasks. In some implementations, operating system 252 can be a kernel (e.g., UNIX kernel).

Memory 250 may also store communication instructions 254 to facilitate communicating with one or more additional devices, one or more computers and/or one or more servers. Memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions.

In some embodiments, communication instructions 254 may include software applications to facilitate connection with ridesharing management server 150 that handles vehicle ridesharing requests. Graphical user interface instructions 256 may include a software program that facilitates a user associated with the mobile communications device to receive messages from ridesharing management server 150, provide user input, and so on. For example, a user may send ride requests and ride service parameters to ridesharing management server 150 and receive ridesharing proposals and confirmation messages. A driver may receive ride service assignments from ridesharing management server 150, and provide ride service status updates.

Each of the above identified instructions and applications may correspond to a set of instructions for performing one or more functions described above. These instructions need not be implemented as separate software programs, procedures, or modules. Memory 250 may include additional instructions or fewer instructions. Furthermore, various functions of mobile communications device 200 may be implemented in hardware and/or in software, including in one or more signal processing and/or application specific integrated circuits.

Figure 3:
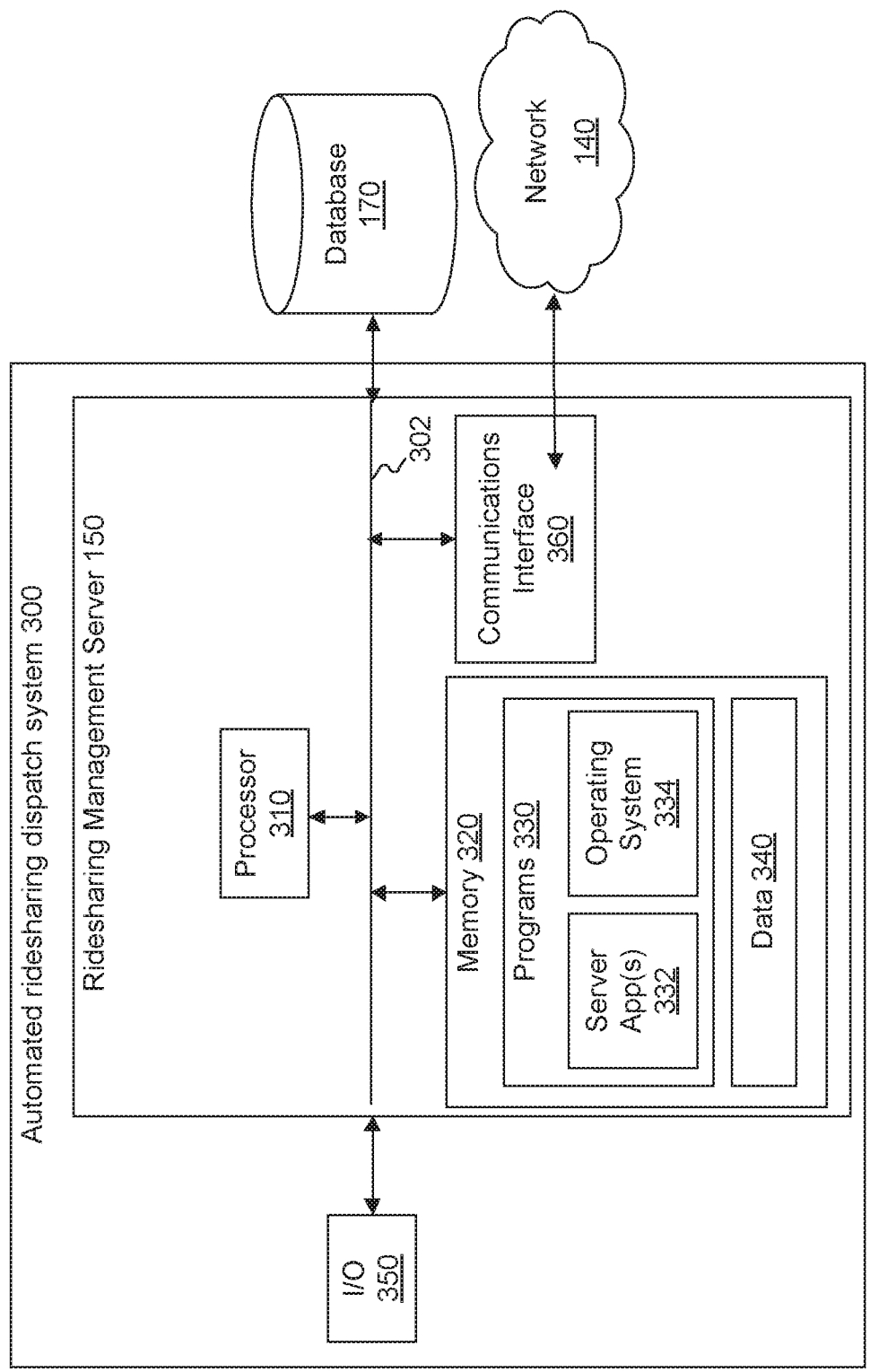
FIG. 3 is a diagram illustrating the components of an example ridesharing management server associated with a ridesharing management system, in accordance with some embodiments of the present disclosure.

FIG. 3 is a diagram illustrating the components of an example an automated ridesharing dispatch system 300 that includes ridesharing management server 150 associated with a ridesharing management system 100, in accordance with some embodiments of the present disclosure. Ridesharing management server 150 may include a bus 302 (or other communication mechanism), which interconnects subsystems and components for transferring information within ridesharing management server 150.

As shown in FIG. 3, automated ridesharing dispatch system 300 may include one or more processors 310, one or more memories 320 storing programs 330 including, for example, server app(s) 332, operating system 334, and data 340, and a communications interface 360 (e.g., a modem, Ethernet card, or any other interface configured to exchange data with a network, such as network 140 in FIG. 1). Automated ridesharing dispatch system 300 may communicate with an external database 170 (which, for some embodiments, may be included within ridesharing management server 150). Automated ridesharing dispatch system 300 may include a single server (e.g., ridesharing management server 150) or may be configured as a distributed computer system including multiple servers, server farms, clouds, or computers that interoperate to perform one or more of the processes and functionalities associated with the disclosed embodiments. The term "cloud server" refers to a computer platform that provides services via a network, such as the Internet. When ridesharing management server 150 is a cloud server it may use virtual machines that may not correspond to individual hardware. Specifically, computational and/or storage capabilities may be implemented by allocating appropriate portions of desirable computation/storage power from a scalable repository, such as a data center or a distributed computing environment.

Processor 310 may be one or more processing devices configured to perform functions of the disclosed methods, such as a microprocessor manufactured by Intel™ or manufactured by AMD™. Processor 310 may comprise a single core or multiple core processors executing parallel processes simultaneously. For example, processor 310 may be a single core processor configured with virtual processing technologies. In certain embodiments, processor 310 may use logical processors to simultaneously execute and control multiple processes. Processor 310 may implement virtual machine technologies, or other technologies to provide the ability to execute, control, run, manipulate, store, etc. multiple software processes, applications, programs, etc. In some embodiments, processor 310 may include a multiple-core processor arrangement (e.g., dual, quad core, etc.) configured to provide parallel processing functionalities to allow ridesharing management server 150 to execute multiple processes simultaneously. It is appreciated that other types of processor arrangements could be implemented that provide for the capabilities disclosed herein.

Memory 320 may be a volatile or non-volatile, magnetic, semiconductor, tape, optical, removable, non-removable, or other type of storage device or tangible or non-transitory computer-readable medium that stores one or more program(s) 330 such as server apps 332 and operating system 334, and data 340. Common forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Ridesharing management server 150 may include one or more storage devices configured to store information used by processor 310 (or other components) to perform certain functions related to the disclosed embodiments. For example, ridesharing management server 150 may include memory 320 that includes instructions to enable processor 310 to execute one or more applications, such as server apps 332, operating system 334, and any other type of application or software known to be available on computer systems. Alternatively or additionally, the instructions, application programs, etc., may be stored in an external database 170 (which can also be internal to ridesharing management server 150) or external storage communicatively coupled with ridesharing management server 150 (not shown), such as one or more database or memory accessible over network 140.

Database 170 or other external storage may be a volatile or non-volatile, magnetic, semiconductor, tape, optical, removable, non-removable, or other type of storage device or tangible or non-transitory computer-readable medium. Memory 320 and database 170 may include one or more memory devices that store data and instructions used to perform one or more features of the disclosed embodiments. Memory 320 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, ridesharing management server 150 may be communicatively connected to one or more remote memory devices (e.g., remote databases (not shown)) through network 140 or a different network. The remote memory devices can be configured to store information that ridesharing management server 150 can access and/or manage. By way of example, the remote memory devices may include document management systems, Microsoft SQL database, SharePoint databases, Oracle™ databases, Sybase™ databases, or other relational databases. Systems and methods consistent with disclosed embodiments, however, are not limited to separate databases or even to the use of a database.

Programs 330 may include one or more software modules causing processor 310 to perform one or more functions of the disclosed embodiments. Moreover, processor 310 may execute one or more programs located remotely from one or more components of the ridesharing management system 100. For example, ridesharing management server 150 may access one or more remote programs that, when executed, perform functions related to disclosed embodiments.

In the presently described embodiment, server app(s) 332 may cause processor 310 to perform one or more functions of the disclosed methods. For example, devices associated with users, drivers and autonomous vehicles may respectively be installed with user applications for vehicle ridesharing services, and driver applications for vehicle ridesharing services. Further, a mobile communications device may be installed with both the driver applications and the user applications, for uses in corresponding situations.

In some embodiments, other components of ridesharing management system 100 may be configured to perform one or more functions of the disclosed methods. For example, mobile communications devices 120 may be configured to calculate estimate pick-up and drop-off times based on a certain ride request, and may be configured to calculate estimate ride fares. As another example, mobile communications devices 120 may further be configured to provide navigation service, and location service, such as directing the user to a particular pick-up or drop-off location, and providing information about a current location of the respective user or vehicle to ridesharing management server 150.

In some embodiments, program(s) 330 may include operating system 334 performing operating system functions when executed by one or more processors such as processor 310. By way of example, operating system 334 may include Microsoft Windows™, Unix™, Linux™, Apple™ operating systems, Personal Digital Assistant (PDA) type operating systems, such as Apple iOS, Google Android, Blackberry OS, Microsoft CE™, or other types of operating systems. Accordingly, the disclosed embodiments may operate and function with computer systems running any type of operating system 334. Ridesharing management server 150 may also include software that, when executed by a processor, provides communications with network 140 through communications interface 360 and/or a direct connection to one or more mobile communications devices 120. Specifically, communications interface 360 may be configured to receive ride requests (e.g., from user devices 120A-120C) headed to differing destinations, and receive indications of the current locations of the ridesharing vehicles (e.g., from driver devices 120D and 120E or driving-control device 120F). In one example, communications interface 360 may be configured to continuously or periodically receive current vehicle location data for the plurality of ridesharing vehicles that are part of ridesharing management system 100. The current vehicle location data may include global positioning system (GPS) data generated by at least one GPS component of a mobile communications device 120 associated with each ridesharing vehicle.

In some embodiments, data 340 may include, for example, profiles of users, such as user profiles or driver profiles. Data 340 may further include ride requests from a plurality of users, user ride history and driver service record, and communications between a driver and a user regarding a particular ride request. In some embodiments, data 340 may further include traffic data, toll road information, and navigation information, which may be used for handling and accommodating ride requests.

Automated ridesharing dispatch system 300 may also include one or more I/O devices 350 having one or more interfaces for receiving signals or input from devices and providing signals or output to one or more devices that allow data to be received and/or transmitted by automated ridesharing dispatch system 300. For example, automated ridesharing dispatch system 300 may include interface components for interfacing with one or more input devices, such as one or more keyboards, mouse devices, and the like, that enable automated ridesharing dispatch system 300 to receive input from an operator or administrator (not shown).

Figure 4A:
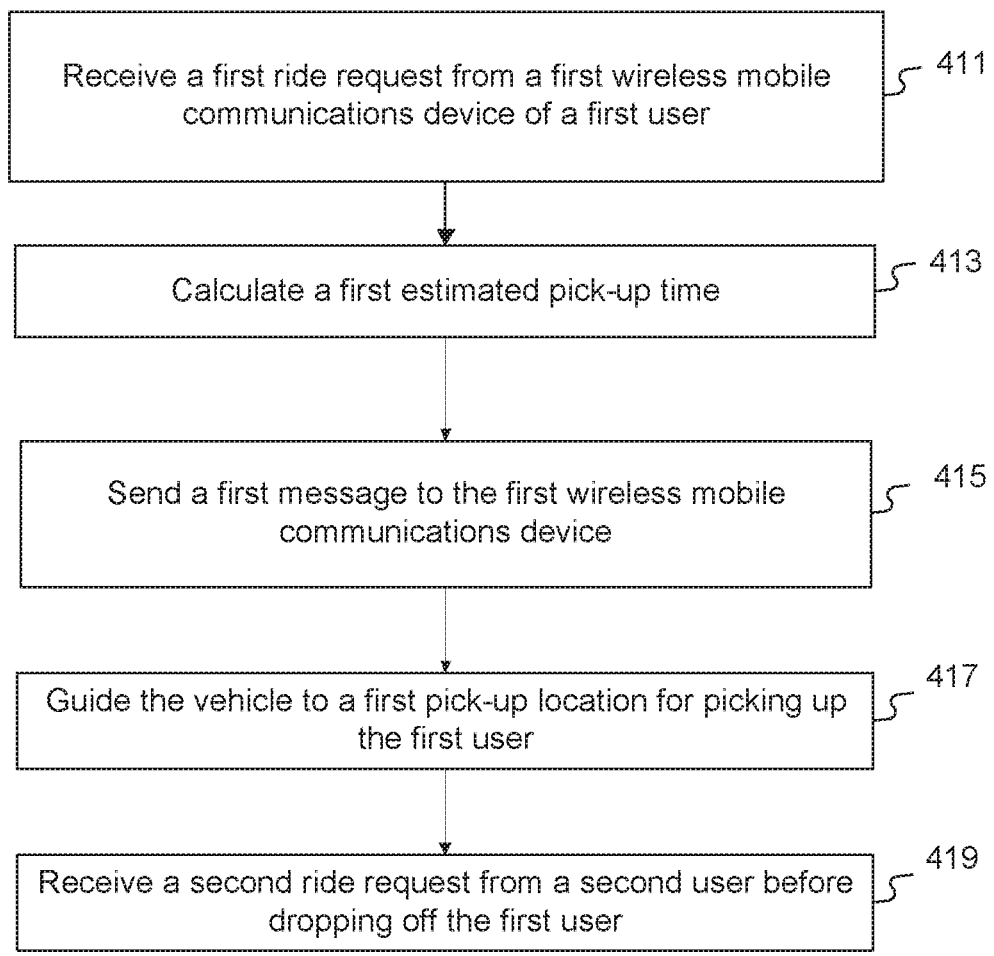
FIGS. 4A and 4B are flowcharts of example processes for vehicle ridesharing management, in accordance with some embodiments of the present disclosure.
Figure 4B:
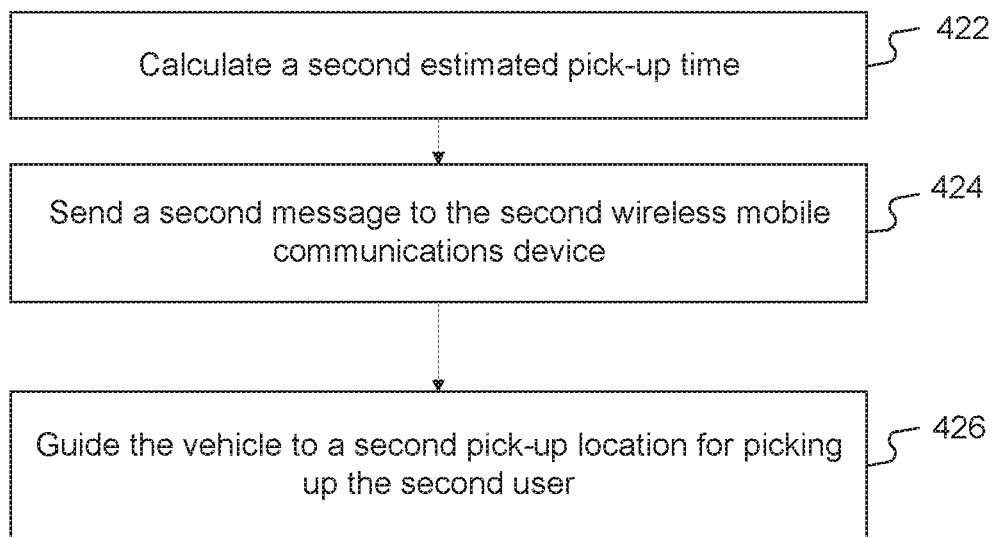

FIGS. 4A and 4B are flowcharts of example processes 410 and 420 for vehicle ridesharing management, in accordance with some embodiments of the present disclosure. In one embodiment, all of the steps of process 400 may be performed by a ridesharing management server, such as ridesharing management server 150 described above with reference to FIGS. 1 and 3. Alternatively, at least some of the steps of process 400 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be utilized to implement example methods disclosed herein.

At step 411, ridesharing management server 150 may receive a first ride request from a first wireless communication of a first user, for example, a request from user 130A sent through user device 120A. The first ride request may include a first starting point and a first desired destination. A ride request may refer to a request from a user needing transportation service from a certain location to another. A starting point may refer to a current location of the user, as input by the user through an input device of an associated user device, or as determined by a location service application installed on the user device. In some embodiments, the starting point may be a location different from the current location of the user, for example, a location where the user will subsequently arrive at (e.g., entrance of a building). A desired destination may refer to a location where the user requests to be taken to.

In some embodiments, the actual pick-up location and the actual drop-off location may be different from the starting point and the desired destination. For example, the pick-up location may be of a certain distance from the starting point, where the user may be directed to for pick-up. By encouraging the user to walk to a pick-up location nearby, consistent with some embodiments, the vehicle may more easily and quickly locate the user without excessive detour, or causing excessive delay for users who are in the vehicle. Similarly, by encouraging the user to walk from a drop-off location different from but within a certain distance from the desired destination, the vehicle may be able to accommodate subsequent pick-ups, or arrive at the subsequent pick-up locations more quickly. The vehicle ridesharing service management system may provide incentives or rewards for the user who are willing to walk a certain distance. For example, the ridesharing management system may offer certain discounts based on the number and distances of the walks involved in a particular ride. Alternatively, the ridesharing management system may offer ride credits corresponding to the number and distance of the walks undertaken by the user during his rides. The user may use the credits for subsequent ride payment, or redeem the credit for money, free rides, or other rewards. Further, advantages of such embodiments may include more efficient vehicle use and management, more user flexibility, and less air pollution associated with vehicle use.

In some embodiments, prior to or after the user sends a ride request to ridesharing management server 150, the user may further input ride service parameters through, for example, a settings component provided on a user interface. Ride service parameters refer to user preference parameters regarding a vehicle ridesharing service, for example, a maximum walking distance from the starting point to a pick-up location, a maximum walking distance from a drop-off location to a desired destination, a total maximum walking distance involved in a ride, a maximum number of subsequent pick-ups, maximum delay of arrival/detour incurred by subsequent pick-ups during a ride, and a selection whether to permit toll road usage during the ride, etc.

Ride service parameters may be transmitted to ridesharing management server 150 for processing the request and assignment of an available vehicle based on the ride service parameters. For example, a ride request may be associated with a maximum walking distance of 300 meters from a starting point to a pick-up location. When assigning an available vehicle to pick up the user, ridesharing management server 150 may include in the assignment an assigned pick-up location within 300 meters or less of the starting point. Similarly, a ride request may be associated with a maximum walking distance of 0.5 mile from a drop-off location to a desired destination. When assigning an available vehicle to pick up the user, ridesharing management server 150 may include in the assignment an assigned drop-off location within 0.5 mile or less from the desired destination.

For requests associated with a maximum total walking distance of one mile during the ride, when assigning an available vehicle to pick up the user, ridesharing management server 150 may include in the assignment an assigned pick-up location and an assigned drop-off location, a total of a distance from the starting point to the assigned pick-up location and a distance from the assigned drop-off location to a desired destination may be equal to or less than one mile.

In the above examples, the values regarding the walking distances are only exemplary. Other embodiments consistent with the present disclosure may use different options of the distances and may provide a list of options. The distances may further be measured in different units, for example, miles, meters, kilometers, blocks, and feet, etc., which are not limited by the disclosed embodiments herein. In some embodiments, the distance may further be represented by an average walking time from a certain location to another, based on average walking speed, for example, ten minutes, five minutes, etc.

With respect to parameters regarding subsequent pick-ups, such as a maximum number of subsequent pick-ups, and maximum delay of arrival incurred by subsequent pick-ups, ridesharing management server 150 may assign subsequent pick-ups accordingly, without exceeding the parameters set by the user. For example, a ride request may be associated with a maximum number of two subsequent pick-ups during the ride. Ridesharing management server 150 may monitor the service status of the vehicle assigned to pick up the user, and refrain from assigning a third subsequent pick-up before the vehicle arrives at the a drop-off location for dropping off the user. As another example, for a ride request associated with a maximum delay of arrival of ten minutes, when assigning subsequent ride requests, ridesharing management server 150 may calculate an estimated delay that may occur to the user if the same vehicle was to undertake the subsequent ride request. If the estimated delay that may occur to the user is more than ten minutes, ridesharing management server 150 may assign the subsequent ride request to other available vehicles.

In some embodiments, the user may also input selection of toll road usage through the associated user device, to allow or disallow use of toll roads. Ridesharing management server 150 may then take the user's selection into account when assigning an available vehicle for accommodating the ride request, determining travel route, and calculating ride fare for the user. For example, ridesharing management server 150 may adjust the ride fare amount for a corresponding user based on the toll roads selection input and toll charges involved. For another example, if a first user does not permit toll road usage, before any subsequent pick-ups during the ride, ridesharing management server 150 may send a route to an assigned vehicle that does not include toll roads. For another example, if a subsequent user sharing the ride permits usage of toll road, ridesharing management server 150 may not charge the first user for any overlap portion of the ride where toll roads are used, change the route to include toll roads after the first user is dropped off, or assign the second user to a ridesharing vehicle with users that permit toll road usage.

In some embodiments, the ride request information may also be input from the driver device, for example, driver device 120D, or from a device associated with the vehicle. In the case of street hailing, where the user hails a vehicle on the street without using a vehicle ridesharing service application on a mobile communications device, the driver, for example, driver 130D, may input information such as the starting point/pick-up information and destination information through driver device 120D, which may then be transmitted to ridesharing management server 150.

At step 413, ridesharing management server 150 may calculate an estimated pick-up time, for example, based on a current location of an assigned vehicle and the first starting point included in the first ride request. An estimated pick-up time may refer to a time period before an assigned vehicle arrives at a pick-up location for picking up the user.

The assigned vehicle may refer to the vehicle that is assigned to undertake the first ride request, for example, a taxi in a taxi fleet, one of a plurality of vehicles managed by a transportation service system, or a plurality of vehicles owned by a plurality of owners and used to provide ridesharing services. The pick-up location may be the same as the starting point, or an assigned pick-up location associated with the starting point.

The estimated pick-up time may be determined based on a distance between a current location of the assigned vehicle and the pick-up location, and an estimate speed of traveling along the route between the two locations. The current location of the assigned vehicle may be determined by a location service application installed on a driver device, a driving-control device, or by a location determination component in the ridesharing management system 100, which may be a part of or separate from ridesharing management server 150. In some embodiments, the estimated pick-up time may further be determined based on historical or real-time traffic data, and a route currently followed by the vehicle.

In some embodiments, process 410 may further include locating one or a plurality of potential available vehicles, and selecting an assigned vehicle therefrom. For example, potential available vehicles may include vacant vehicles in the surrounding areas of the first starting point, and vehicles heading to a location close to the first starting point for assigned pick-ups or drop-offs. Ridesharing management server 150 may filter potential available vehicles by ride service parameters set by the users who are inside the vehicle, for example, removing occupied vehicles where a user inside the vehicle does not permit subsequent pick-ups, or occupied vehicles where the user requires a minimal delay. In some embodiments, ridesharing management server 150 may filter potential assignment vehicles by choosing a vehicle that would involve minimal walking of the user, or walking without the need of crossing the street. In some embodiments, ridesharing management server 150 may further filter potential assignment vehicles by choosing a vehicle that would involve minimal detour for the vehicle to arrive at the pick-up location. In some embodiments, the assigned vehicle may be selected by applying multiple filter criteria, or by applying multiple filter criteria in a certain order.

In some embodiments, the pick-up location may be an assigned pick-up location different from the first starting point, for example, half a block or further away from the first starting point. Ridesharing management server 150 may assign a pick-up location based on ride service parameters set by the first user, as described above at step 411. Ridesharing management server 150 may further assign a pick-up location which is along a main street where an assigned vehicle can easily locate, or a location which would not require an assign vehicle to take a U-turn. In cases where there are one or more other users in the vehicle, ridesharing management server 150 may assign a pick-up location close to the vehicle's next assigned drop-off, or on the side of a street where the vehicle will soon go through. In some embodiments, ridesharing management server 150 may adjust selection of the pick-up location based on filtering results of potential assignment vehicles, or vice versa. The two selection processes may complement each other to reach one or more optimal combinations.

In some embodiments, where there are multiple potential assignment vehicles, each with a corresponding potential pick-up location, an estimated pick-up time may be respectively calculated corresponding to each of the potential assignment vehicles. Ridesharing management server 150 may then choose the vehicle with the shortest estimated pick-up time to be the assigned vehicle.

At step 415, ridesharing management server 150 may send a first message to a user device associated with the first user, which is, in this example, user device 120A. The first message may be configured to cause an indication of the calculated first estimated pick-up time to appear on a display of user device 120A. The message may appear in different formats, for example, a text message including the estimated pick-up time, an audio message, or an image, the specific implementation of which are not limited by the disclosed embodiments herein.

In one embodiment, the message includes a confirmation that the ridesharing request is accepted. If ridesharing management server 150 assigns a pick-up location different from the starting point, the message may further cause the display of an indication of the assigned pick-up location. Ridesharing management server 150 may further provide a navigation option which may be displayed on a user interface. A selection of the navigation option may then provide walking directions the user to the assigned pick-up location for pick-up. The message may further cause a display of an indication of an estimated walking distance from the starting point to the assigned pick-up location. In addition, the message may include an estimated walking distance from the assigned drop-off location to the desired destination. The assigned drop-off location may be a location close to the desired destination, within the maximum walking distance parameters set by the first user. For example, the drop-off location may be at a location half a block away or further from the desired destination, and may be along a main street where the vehicle may easily locate and access. For another example, the drop-off location may be determined based on a route towards the next pick-up location, such that the vehicle may easily drop off the first user on its way to the next pick-up location, thereby avoiding an extra detour.

In another embodiment, the message may include one or more proposals associated with different vehicles. Each proposal may include information about the proposed pick-up location. The information about the proposed pick-up location may include the distance from the user to the proposed pick-up location. Each proposal may include a price of the ride associated with the type of the ride, and an estimation of a pick-up time. The estimate may be presented as a range. In one example, each proposal may include different pick-up locations, different prices, and/or different estimations of a pick-up time. According to this embodiment, step 415 may also include receiving a proposal selection reflective of a selected pick-up vehicle and sending an addition message that includes information about the selected vehicle, and the driver associated with the vehicle. For example, the vehicle information may include the license plate number, brand, color, and/or model of the vehicle. The driver information may include a name, nickname, profile photo, ratings, number of previous rides, and/or contact information of the driver. The message may further include a contact option allowing the user to contact the driver, for example, a "contact the driver" button, which the user may select to initiate a communication session with the driver.

At step 417, ridesharing management server 150 may guide the assigned vehicle to the first pick-up location for picking up the first user. For example, ridesharing management server 150 may transmit direction information to the driver device associated with the assigned vehicle, for example, driver device 120D or driving-control device 120F. In some embodiments, a navigation component of the driver device, or the driving-control device may perform the step of guiding the vehicle to the first pick-up location. Correspondingly, ridesharing management server 150, or a navigation component of the user device 120A, may guide the user to the first pick-up location, in cases where the pick-up location is an assigned pick-location different from the first starting point. For example, for autonomous vehicles used for ridesharing services, such as autonomous vehicle 130F as shown in FIG. 1, the vehicle itself may be capable of using a variety of techniques to detect its surroundings, identify feasible paths, and navigate without direct human input.

In some embodiments, once the vehicle is assigned to pick up the user, ridesharing management server 150 may assign a communication channel for the driver associated with the assigned vehicle to communicate with the user, for example, a masked phone number. In some embodiments, a user interface of a driver device, such as driver device 120D, may include an option to send notification messages to the user, for example, a pre-defined message button of "I'm here." Once the vehicle arrives at the pick-up location, the driver may click the message button to send the message to the user. This way, the driver may not need to dial out or type a message in order to notify the user of the vehicle's arrival, reducing driver distraction and associated safety hazards.

At step 419, ridesharing management server 150 may receive a second ride request from a second user. In some embodiments, the second user request may be a street hailing request received directly by the vehicle while the first user is still inside, namely, before dropping off the first user. The vehicle may then undertake the second ride request, if the first user permits subsequent pick-ups. In some embodiments, the driver of the vehicle may input the second ride request information through a driver device, for example, driver device 120D associated with driver 130D. The input may inform ridesharing management server 150 that the vehicle has undertaken a second ride request, or may further include the pick-up location and destination information of the second user. Ridesharing management server 150 may then accordingly determine whether to assign additional pick-ups to the same vehicle, and may further send direction information guiding the vehicle to the second user's destination.

In some embodiments, the second ride request may be received by ridesharing management server 150 from a second wireless mobile communications device, for example, user device 120B associated with user 130B as shown in FIG. 1. The second ride request may further include a second starting point, and a second desired destination. Ridesharing management server 150 may then assign a corresponding ride service to an available vehicle, which may be the vehicle that has picked up the first user, before dropping off the first user. In processing the second ride request, the example process 420 as shown in FIG. 4B may be performed.

At step 422, ridesharing management server 150 may calculate a second estimated pick-up time, for example, based on a second current location of the vehicle and the second starting point. The second estimated pick-up time may refer to an estimated time period before the vehicle arrives at a second pick-up location for picking up the second user. The second pick-up location may be an assigned pick-up location different from, but associated with, the second starting point. Assignment of the second pick-up location may include similar steps as described above with reference to FIG. 4A, details of which are not repeated herein.

At step 424, ridesharing management server 150 may send a second message to the second wireless mobile communication device, which is user device 120B in this example. The second message may be configured to cause an indication of the calculated second estimated pick-up time to appear on a display of the second wireless mobile communication device. As described above with reference to FIG. 4A, the message may appear in different formats, and may further cause a display of multiple proposals with multiple options for the second pick-up location, walking distance, walking directions from the second starting point to the second pick-up location, etc., the details of which are not repeated herein.

In some embodiments, ridesharing management server 150 may set the second pick-up location at substantially the same location as the first pick-up location, for example, half a block away, or 100 meters away from the first pick-up location. This way, the vehicle may pick up both users at about the same time at substantially the same location, further improving service efficiency. In some embodiments, ridesharing management server 150 may set the second pick-up location at a substantially the same location as the first drop-off location, wherein the vehicle may drop off the first user, and pick up the second user at about the same time, without extra travelling. Further, in some embodiments, the second drop-off location may be set at substantially the same location as the first drop off location, such that the vehicle may drop off multiple users at the same time.

In some embodiments, ridesharing management server 150 may set the first pick-up location to substantially differ from the first starting point, and the second pick-up location to substantially differ from the second starting point, for example, to ensure both pick-up locations are along the same side of the same street where the vehicle may go through.

Ridesharing management server 150 may then send respective directions to the first user device and the second user device, to guide the users to the respective pick-up locations.

In some embodiments, ridesharing management server 150 may set the first pick-up location at substantially the same as the first starting point, and set the second pick-up location to substantially differ from the second starting point. For example, the selection of the pick-up locations may be made such that the first pick-up location and the second pick-up location are close to one another, both pick-up locations are along the same street, or the second pick-up location is close to the first drop-off location. Ridesharing management server 150 may then send respective directions to the first user device and the second user device, to guide the users to the respective pick-up locations.

At step 426, ridesharing management server 150 may guide the vehicle to a second pick-up location for picking up the second user. As described above with reference to FIG. 4A, this step may also be performed by a navigation component of the driver's device (e.g., driver device 120D or driving-control device 120F associated with autonomous vehicle 130F).

In some embodiments, ridesharing management server 150 may change the first drop-off location after receiving the second ride request, and the change may be made without pre-approval of the first user. The first drop-off location refers to a location for dropping off the first user. As described above with reference to FIG. 4A, the first drop-off location may be the same as the first desired destination, or at a location different from the first desired destination.

For example, the second pick-up location may be set at a location close to the first desired destination, included in the first ride request. When assigning the second ride request to the vehicle, ridesharing management server 150 may change the first drop-off location to a location closer to or at the first desired destination, thus reducing the walking distance for the first user to arrive at his desired destination. For another example, the first drop-off location may be changed to a location where the first user does not need to cross the street to arrive at his desired destination, without causing or increasing detour for the vehicle to arrive at the second pick-up location.

In some embodiments, ridesharing management system 100 may subsequently receive a plurality of subsequent ride requests. These additional ride requests may either be received by ridesharing management server 150 and assigned to the vehicles, or received by the vehicles in the form of street hailing. Steps described above with reference to FIGS. 4A and 4B may similarly be used to process the third ride request.

For example, ridesharing management server 150 may receive a third ride request from a third user device, for example, user device 120C associated with user 130C, as shown in FIG. 1. Ridesharing management server 150 may process the request and assign the request to the vehicle while at least one of a first user and a second user is still in the vehicle. The third ride request may further include a third starting point and a third desired destination. Ridesharing management server 150 may calculate a third estimated pick-up time, and send a confirmation to a user's device (e.g., user device 120C). Ridesharing management server 150 may transmit direction and route information to the driver's device associated with the vehicle (e.g., driver device 120D as shown in FIG. 1), to guide the vehicle to pick up and drop off user 130C.

As described above with reference to FIGS. 4A and 4B, processing of subsequent ride requests may take into account of the ride service parameters set by the users whose requests have previously been received and assigned. For example, if both the first user and the second user are still in the vehicle, and one of them has set a maximum delay of arrival, ridesharing management server 150 may not assign the third request to the same vehicle if such assignment would cause a delay longer than the set value. For example, if the first user has set a maximum delay of arrival of 10 minutes, ridesharing management server 150 may calculate an estimated time period it takes for the vehicle to pick up (and/or drop off) the third user before dropping off the first user. If the estimated time would cause a total delay of arrival for the first user to exceed 10 minutes, ridesharing management server 150 may therefore assign the third ride request to another vehicle. For another example, if the second user has set a maximum number of one co-rider and the second user will be dropped off earlier than the first user, ridesharing management server 150 may not assign to the same vehicle, as such assignment may cause violation of the parameter (maximum number of one co-rider) set by the second user.

Figure 5:
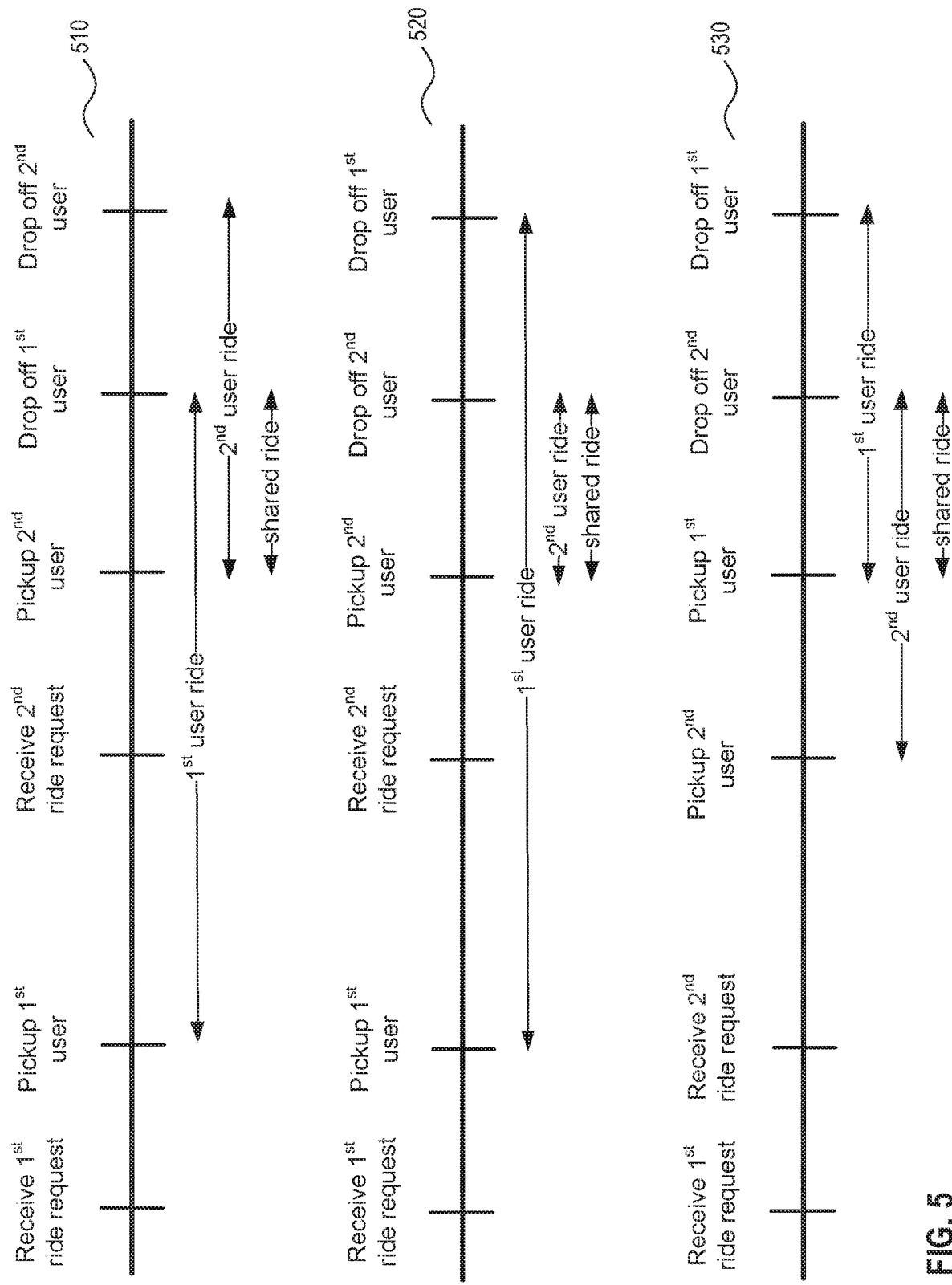
FIG. 5 is a diagram of example timelines showing ridesharing arrangements, in accordance with some embodiments of the present disclosure.

FIG. 5 is a diagram of three example timelines showing ridesharing arrangements, in accordance with some embodiments of the present disclosure. As shown in example timelines 510, 520, and 530, for a particular assigned vehicle undertaking a first ride request from a first user and a second ride request from a second user, the order of pick-ups and drop-offs for the second user may vary. For example, ridesharing management server 150 may receive a plurality of ride requests, design an optimal path and pick-up/drop-off order for a particular assigned vehicle undertaking multiple requests, and assign additional pick-ups as the vehicle completes a part of or all of the ride requests. For example, as shown in example timeline 510, a vehicle may receive a second ride request after picking up the first user, and drop off the first user before dropping off the second user. A corresponding shared ride portion may be the portion of ride between the pick-up of the second user and drop-off of the first user. As shown in example timeline 520, the vehicle may receive a second ride request after picking up the first user, and drop off the second user before dropping off the first user. A corresponding shared ride portion may be the portion of ride between the pick-up of the second user and drop-off the second user. As another example, as shown in example timeline 530, the vehicle may receive the first ride request and the second ride request before any pick-up. The vehicle may then pick up the second user before picking up the first user, and drop off the second user before dropping off the first user. A corresponding shared ride portion may be the portion of ride between pick-up of the first user and drop-off of the second user. Depending on the order of pick-ups and drop-offs, the ridesharing management server may then determine a corresponding shared ride portion, and calculate ride fare for each user based on, for example, the shared portion, solo portion of each user, and/or other factors such as the ride service parameters set by each user.

Managing Charging Schedules of Multiple Charging Stations

In some ridesharing fleets, at least some of the vehicles may be electric charging vehicles, whether fully electric or a hybrid with plug-in charging capabilities. Conventional systems often allow the drivers to manage when and where the vehicles are charged, which generates large inefficiencies in managing the fleet. Moreover, merely directing an electric vehicle to a closest charging station when a battery-charge of the vehicle is below a threshold, although intuitively efficient, may result in inefficiencies due to limited capacities of charging stations. Accordingly, embodiments of the present disclosure may account for both battery-charge and charging station occupancies when assigning a vehicle to a charging station. Although individual routes and charging schedules may be sub-optimized, the overall optimization of the fleet of vehicles may be increased. Accordingly, the technical solutions set forth in these embodiments optimize the fleet rather than individual vehicles and result in the use of more accurate and flexible optimization schema.

Figure 6:
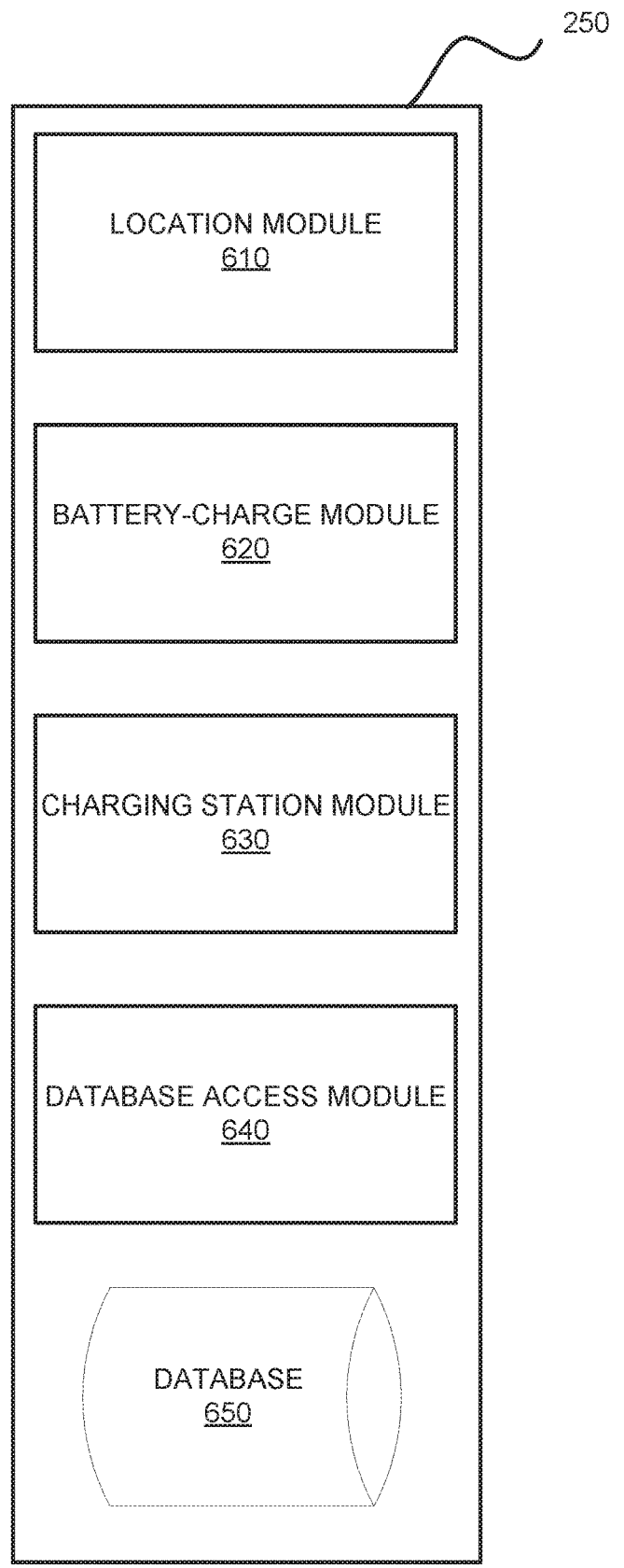
FIG. 6 is an exemplary embodiment of a memory containing software modules consistent with the present disclosure.

FIG. 6 depicts an embodiment of memory module 250 for managing a fleet of ridesharing vehicles including electrically-powered ridesharing vehicles consistent with the present disclosure. Memory 250 may store a plurality of modules, and may be executable by at least one processor to perform various methods and processes disclosed herein. Further, it should be noted that memory 250 may store more or fewer modules than those shown in FIG. 6, depending on implementation-specific considerations.

As illustrated in FIG. 6, memory 250 may store software instructions to execute a location module 610, a battery-charge module 620, a charging station module 630, a database access module 640, and may include a database 650. Location module 610 may include software instruction for receiving locations of ridesharing vehicles from one or more sources. Battery-charge module 620 may include software instruction for receiving battery-charge levels of ridesharing vehicles from one or more sources. Charging station module 630 may include software instruction to determine occupancies of charging stations in relation to a determined route or a drop-off location. Database access module 640 may include software instruction executable to interact with database 650, to store and/or receive information (e.g., geographical maps associated with a geographical area in which a vehicle is operating, current traffic information of a geographical area, historical data for efficient routes, etc.).

Location module 610 may include software instructions for receiving current vehicle location data for the plurality of electrically-powered ridesharing vehicles. In some embodiments, the current vehicle location data may include global positioning system (GPS) data generated by at least one GPS component associated with each electrically-powered ridesharing vehicle. Additionally or alternatively, location module 610 may receive other location information, such as cell tower triangulation data, Wi-Fi or other signal strength data, or any other combination of location information.

Battery-charge module 620 may include software instructions for receiving current battery-charge data for the plurality of electrically-powered ridesharing vehicles. The data may be related to the remaining charge of the battery powering the vehicle and/or an estimated time until depletion of the battery as captured by a power sensor in the vehicle for determining the current charge level of the battery. The power sensor may transmit the data to a remote server over a wireless channel or to vehicle routing module to select a charging station, based on the current battery charge level. The power sensor may be configured to continuously monitor and transmit data related to the current battery charge level. The power sensor may also monitor the current battery charge level and transmit data when the charge level is less than a predetermined threshold level.

In some embodiments, the current battery-charge data may be indicative of a driving duration and/or distance in which each electrically-powered ridesharing vehicle can operate before charging. For example, battery-charge module 620 may determine the driving duration and/or distance based on the current charge level of the battery and one or more known characteristics of the vehicle. In such an example, battery-charge module 620 may convert the charge level (e.g., measured in volts or amperes) to a duration and/or distance using a conversion factor associated with the year, make, and module of the vehicle and/or using a conversion factor determined from historical data associated with the vehicle. Alternatively, the vehicle may perform the conversion and send the driving duration and/or distance to battery-charge module 620.

Additionally or alternatively, battery-charge module 620 (or the vehicle) may estimate the driving duration and/or distance using real-time traffic data along a current route of the vehicle. Accordingly, the driving duration and/or distance may be dynamically re-determined whenever the current route is changed, as explained below with respect to charging station module 630. Additionally or alternatively, battery-charge module 620 (or the vehicle) may estimate the driving duration and/or distance using terrain data, such as elevation changes, along a current route of the vehicle. Accordingly, the driving duration and/or distance may be dynamically re-determined whenever the current route is changed, as explained below with respect to charging station module 630.

Additionally or alternatively, battery-charge module 620 (or the vehicle) may estimate the driving duration and/or distance using driver-performances data indicative of driver acceleration and deceleration rates. For example, the driving duration and/or distance may be increased for a driver that accelerates and decelerates within a first range and may be decreased for a driver that accelerates and decelerates within a second, higher range.

Charging station module 630 may include software instruction for determining battery charging stations within a geographic area. The geographic area may include a current location of at least one of the vehicles. Charging station module 630 may also determine a number of charging point in each charging station. The locations and charging points may be stored in database 650 and accessed by charging station module 630.

Charging station module 630 may further include software instructions for receiving current occupancy data for the plurality of charging stations. The current occupancy data may include a current capacity utilization for each charging point. Accordingly, based on the number of charging points in each charging station and the current capacity utilization for each charging point, charging station module 630 may determine whether a number of open charging points at each station, if any.

In some embodiments, the current occupancy data may include current battery-charge data for each electrically-powered ridesharing vehicle located at a charging station. Accordingly, in addition to or in lieu of the number of open charging points, charging module 630 may determine an estimated time at which occupied charging points will become available. For example, charging module 630 may determine the estimated time based on the current charge level of an electrically-powered ridesharing vehicle located at a charging station and one or more known characteristics of the charging point used by the vehicle and/or the vehicle. In such an example, charging module 630 may convert a remaining charge requirement (e.g., measured in volts or amperes) to an estimated time using a conversion factor associated with the year, make, and module of the vehicle and/or using a conversion factor determined from historical data associated with the vehicle. Additionally or alternatively, charging module 630 may convert a remaining charge requirement (e.g., measured in volts or amperes) to an estimated time using a conversion factor associated with a model of the charging point and/or using a conversion factor determined from historical data associated with the charging point. In any of the above embodiments, the charging station may perform the conversion and send the estimated time to charging module 630.

Based on this information and information received from battery-charge module 620, charging station module 630 may select a charging station for a specific electrically-powered ridesharing vehicle. In some embodiments, the selected charging station may be other than a charging station closest to a current location of the specific electrically-powered ridesharing. Accordingly, charging station module 630 may apply an optimization algorithm such that the driving duration and/or distance received or determined by battery-charge module 620 functions as a hard constraint but that the other variables are optimized within the constraint. For example, the algorithm may optimize the estimated time to plug-in based on distances between a current location of the specific vehicle and the charging stations as well as the current occupancy of those stations.

Additional variables may be used in the optimization algorithm. For example, historical data associated with demand for ridesharing vehicles in the geographic area may be considered. Accordingly, charging station module 630 may select a charging station having a greater predicted passenger-demand than one or more non-selected charging stations. Additionally or alternatively, the plurality of vehicles may be classified as short-distance type vehicles and long-distance type vehicles (e.g., by applying a threshold to the battery capacities of the vehicles and/or the estimated ranges of the vehicles) and the classification may be considered. Accordingly, charging station module 630 may select a charging station that is closer if the vehicle is a short-distance type but farther if the vehicle is a long-distance type.

In yet another example, map data including information about a terrain of the geographic area may be accessed and considered. For example, charging station module 630 may select a charging station that may be accessed along a route with fewer elevation changes than one or more non-selected charging stations.

In addition to selecting the charging station, charging station module 630 may adjust a charging schedule at the selected charging station based on an estimated time of arrival of the specific electrically-powered ridesharing vehicle. For example, charging station module 630 may halt charging of a vehicle already at the selected charging station to make room for the specific vehicle upon arrival. Additionally or alternatively, charging station module 630 may adjust the schedule that only partially charges the specific electrically-powered ridesharing vehicle in order to make room at the selected charging station for another electronically-powered ridesharing vehicle with an immediate need for charging. As yet another example, charging station module 630 may adjust a charging schedule at the selected charging station based on an estimated distance of the specific electrically-powered ridesharing vehicle from the selected charging station.

In some embodiments, charging station module 630 may also include software instruction for directing the specific electrically-powered ridesharing vehicle to the selected charging station. For example, in response to selecting the charging station, charging station module 630 may determine a route for the specific vehicle that terminates at the selected charging station.

In some embodiments, the particular vehicle may be carrying one or more ridesharing passengers. In such embodiments, charging station module 630 may adjust a route currently being used by the specific vehicle to pick up and/or drop off the ridesharing passengers such that the route ends at the selected charging station. For example, charging station module 630 may add the selected charging station as a destination and adjust one or more roads along the route in order to add the new destination and/or to greater optimize the estimated time along the new roads. Additionally or alternatively, an order in which the passengers are dropped off and/or picked up may be re-ordered such that the final drop off is closer to the selected charging station. Charging station module 630 may adjust one or more roads along the route in order to perform the re-ordering and/or to greater optimize time along the new roads.

In any of the embodiments discussed above, the determined route or adjusted route may be optimized using one or more additional constraints. For example, the determined route or adjusted route may be optimized for elevation changes (e.g., to minimize elevation changes) rather than to minimize travel time and/or travel distance.

The specific vehicle may continue to function as a ridesharing vehicle en route to the selected charging station. For example, the specific vehicle may be assigned to pick-up a plurality of passengers such that at least some of the passengers share their ride with at least one other passenger. Alternatively, the specific vehicle may have dropped off all ridesharing passengers when the charging station is selected. In either embodiment, additional passengers may be assigned on a threshold basis. For example, when a current charge of the specific electrically-powered ridesharing vehicle is above a threshold, the specific vehicle may be assigned at least one additional passenger to the specific electrically-powered ridesharing vehicle and directed along a first route for transporting the at least one additional passenger before reaching the selected charging station. On the other hand, when a current charge of the specific electrically-powered ridesharing vehicle is below the threshold, charging station module 630 may direct the specific electrically-powered ridesharing vehicle along a second route for guiding the specific electrically-powered ridesharing vehicle towards the selected charging station without assigning passengers for pick up along the second route. In either example, the driving duration and/or distance may be used in lieu of or in addition to the current charge.

As illustrated in FIG. 6, database 650 may be configured to store any type of information associated with modules 610-640, depending on implementation specific considerations. For example, in embodiments in which battery-charge module 620 and/or charging station module 630 is configured to access one or more prior-stored maps of geographical areas for determining a route, database 650 may store the geographical maps. In other embodiments where charging station module 630 is configured to access one or more listings of charging stations, database 650 may store locations, hours of operation, and/or charging capacity for each charging station. Still, in other embodiments, database 650 may include information related to a charging capacity of each of the plurality of charging stations to accept additional vehicles, and for ride requests with pick-up location in a vicinity of the specific electrically powered vehicle-for-hire in need of the charge, at least one processor may be configured to assign the specific electrically-powered vehicle-for-hire to pick up a user based on a proximity of a drop-off location to a charging station and a capacity of that charging station to accept the specific electrically-powered vehicle for-hire. Location module 610, battery-charge module 620, and charging station module 630 may access database for communication by way of data access module 640.

Modules 610-640 may be implemented in software, hardware, firmware, or any combination of software, hardware or firmware. For example, if the modules are implemented in software, they may be stored in memory 250. However, in some embodiments, any one or more of modules 610-640 and data associated with database 650 may, for example, be stored in processor 204 and/or executed on a device associated with ridesharing management system 100. Modules 610-640 may be configured to interact with each other and/or other modules of memory 250 to perform functions consistent with disclosed embodiments.

Figure 7:
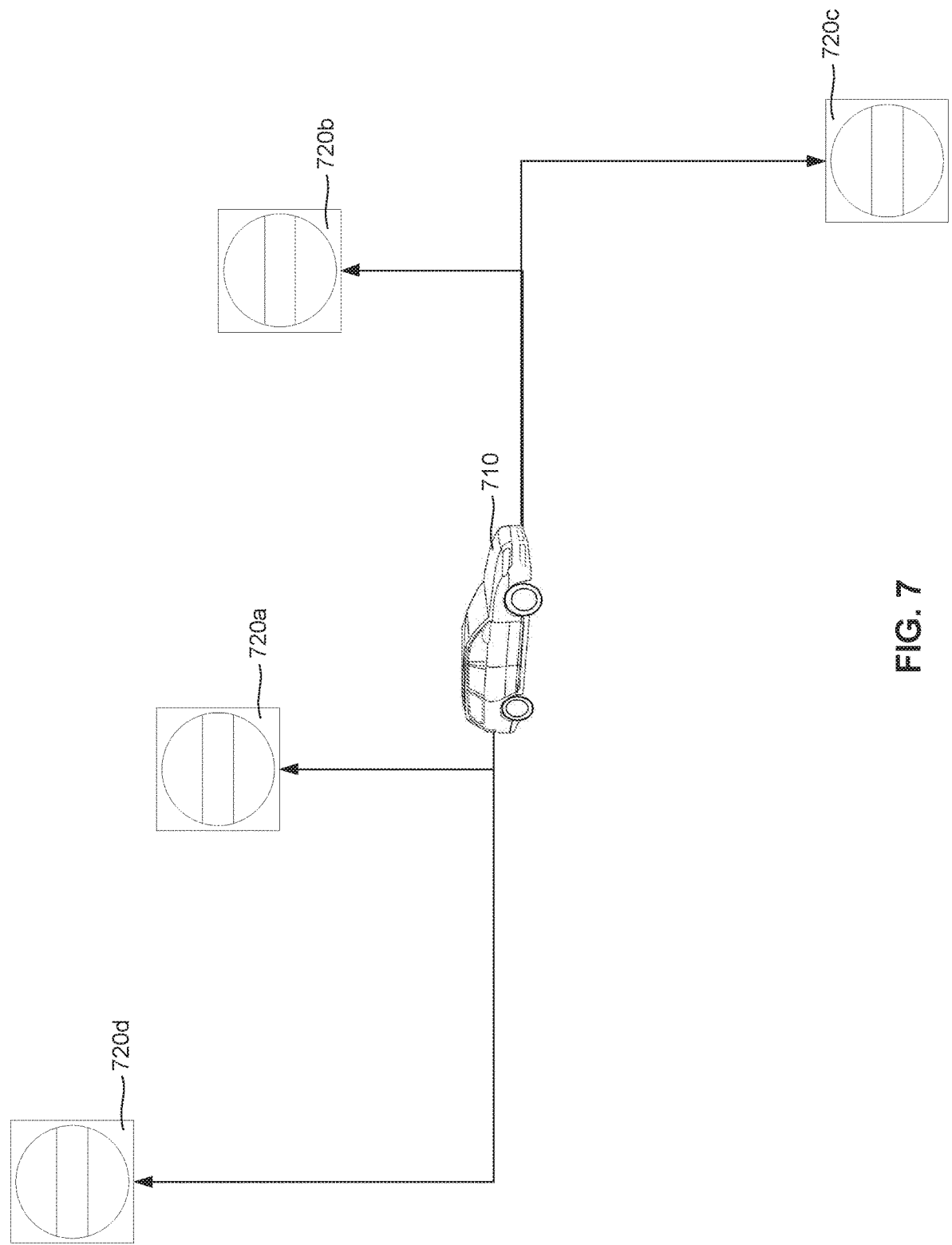
FIG. 7 is a schematic illustration of selection between a plurality of charging stations in response to an indicator of the current charge level of a battery and occupancy data for the charging stations, according to an embodiment consistent with the present disclosure.

FIG. 7 illustrates an example of selection between a plurality of charging stations in response to an indicator of the current charge level of a battery and occupancy data for the charging stations. As depicted in FIG. 7, an electrically-powered ridesharing vehicle 710 may be located in a geographic area associated with a plurality of charging stations. In the example of FIG. 7, four charging stations (720a, 720b, 720c, and 720d) are located in a geographic area (FIG. 7 is not to scale). Intuitively, a conventional system may assign vehicle 710 to the closest charging station 720a when a charge (or remaining range) of a battery of vehicle 710 is below a threshold or vehicle 710 otherwise signals that it needs to charge the battery. However, this may create inefficiencies if vehicle 710 is a member of a ridesharing fleet. Further inefficiencies may inhere if the capacity of the closest station 720a is higher than those of stations farther away, e.g., one or more of stations 720b, 720c, and 720d. Accordingly, based on the remaining charge and/or range of vehicle 710 in combination with capacities of the charging stations, embodiments of the present disclosure may select stations farther from vehicle 710, e.g., one or more of stations 720b, 720c, and 720d, rather than the closest station 720a. As explained above with respect to charging station module 630, additional variables may be considered in making the selection, such as historical data associated with demand for ridesharing vehicles in the geographic area, classification of the vehicle as a short-distance type vehicle or a long-distance type vehicle, map data including information about a terrain of the geographic area, or the like.

Figure 8A:
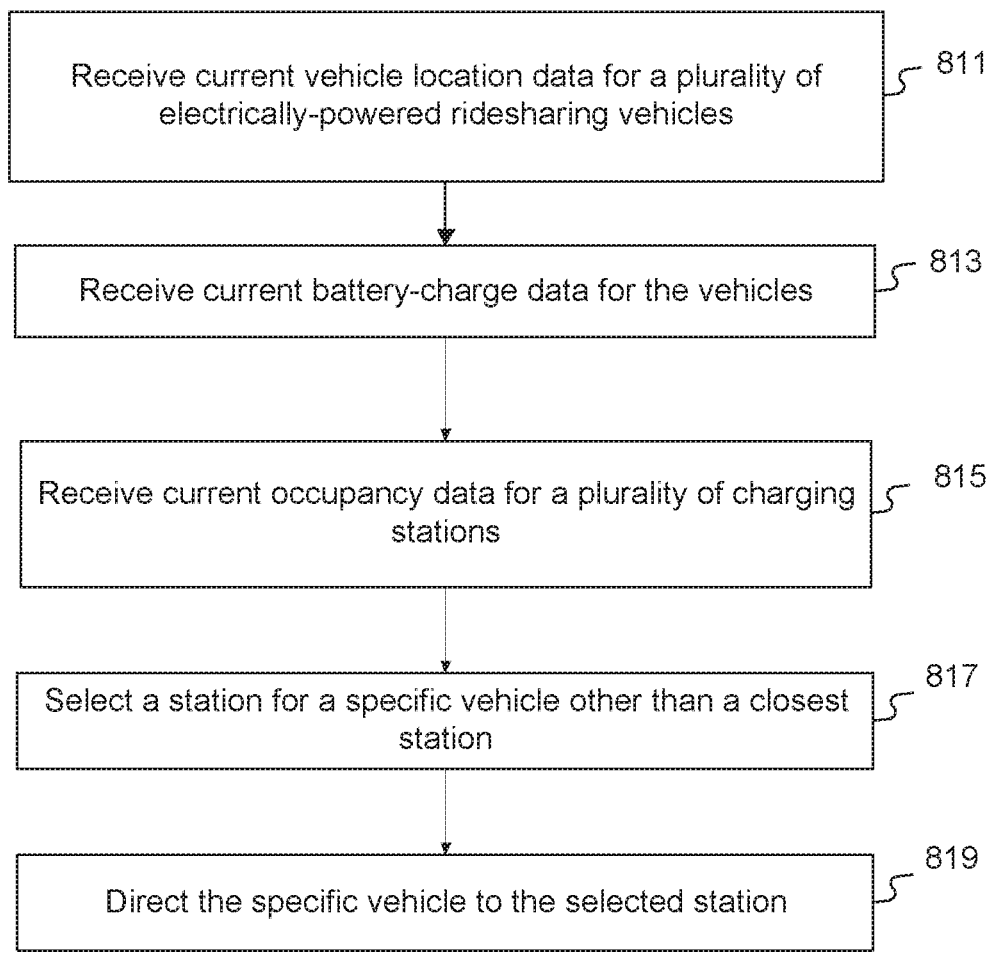
FIG. 8A is a flowchart showing an exemplary process for managing a fleet of ridesharing vehicles including electrically-powered ridesharing vehicles.

FIG. 8A illustrates a flowchart showing exemplary process 810 for managing a fleet of vehicles-for-hire including electrically-powered vehicles-for-hire associated with a vehicle management server, consistent with disclosed embodiments. In one embodiment, the steps of process 810 may be performed by a vehicle management server, such as ridesharing management server 150 described above with reference to FIGS. 1 and 3. Alternatively, at least some of the steps of process 810 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be utilized to implement example methods disclosed herein.

At step 811, location module 610 may receive current vehicle location data for the plurality of electrically-powered ridesharing vehicles. As explained above, the current vehicle location data may include global positioning system (GPS) data generated by at least one GPS component associated with each electrically-powered ridesharing vehicle.

At step 813, battery-charge module 620 may receive current battery-charge data for the plurality of electrically-powered ridesharing vehicles. As explained above, the current battery-charge data may be indicative of a driving duration and/or distance in which each electrically-powered ridesharing vehicle can operate before charging. In some embodiments, battery-charge module 620 may estimate the driving duration and/or distance. For example, battery-charge module 620 may receive real-time traffic data and estimate a driving duration and/or distance in which the specific electrically-powered ridesharing vehicle can operate before charging based on the current battery-charge data and the real-time traffic data. Additionally or alternatively, battery-charge module 620 may obtain driver-performances data indicative of driver acceleration and deceleration rates and determine a driving duration and/or distance in which the specific electrically-powered ridesharing vehicle can operate before charging based on the current battery-charge data and the driver-performances data. Additionally or alternatively, battery-charge module 620 may access map data including information about a terrain of the geographic area and determine a driving duration and/or distance in which the specific electrically-powered ridesharing vehicle can operate before recharging based on the current battery-charge data and elevation changes expected along a scheduled route of the specific electrically-powered ridesharing vehicle.

At step 815, charging station module 630 may receive current occupancy data for the plurality of charging stations. As explained above, the current occupancy data may include a current capacity utilization for each charging point and current battery-charge data for each electrically-powered ridesharing vehicle located at a charging station.

At step 817, charging station module 630 may select a charging station for a specific electrically-powered ridesharing vehicle, the selected charging station being other than a charging station closest to a current location of the specific electrically-powered ridesharing. In some embodiments, charging station module 630 may select the charging station based on the current vehicle location data of the specific electrically-powered ridesharing vehicle, the current battery-charge data of the specific electrically-powered ridesharing vehicle, the stored locations of the plurality of charging stations, and the current occupancy data for the plurality of charging stations. For example, as explained above, charging station module 630 may apply an optimization algorithm using an estimated range or driving duration and/or distance determined based on the current battery-charge data as a hard constraint and optimizing an estimated time to plug-in based on the current location data of the specific vehicle, the stored locations of the plurality of charging stations, and the current occupancy data for the plurality of charging stations.

Charging station module 630 may further determine, based on the current occupancy data for the plurality of charging stations, a predicted availability of each of the plurality of charging stations, and select the charging station for the specific electrically-powered ridesharing vehicle further based on the predicted availability of the plurality of charging stations. For example, charging station module 630 may select a charging station other than a charging station closest to a current location of the specific electrically-powered ridesharing vehicle because the predicted availability of the closest station is such that the specific vehicle would have to wait to charge upon arrival while the predicted availability of a farther station is such that the specific vehicle would have a lesser wait time or no wait time at all upon arrival.

Additionally or alternatively, charging station module 630 may access historical data associated with past demand for ridesharing vehicles in the geographic area, determine predicted passenger-demand, and select the charging station for the specific electrically-powered ridesharing vehicle further based on the predicted passenger-demand. For example, charging station module 630 may select a charging station other than a charging station closest to a current location of the specific electrically-powered ridesharing vehicle because the predicted passenger-demand of the closest station is lower than the predicted passenger-demand of a farther station.

In some embodiments, the plurality of electrically-powered ridesharing vehicles traveling within the geographic area may include short-distance type vehicles and long-distance type vehicles with a battery capacity greater than a battery capacity of the short-distance vehicles. Accordingly, in addition to or in lieu of the other soft constraints discussed above, charging station module 630 may select the charging station for the specific electrically-powered ridesharing vehicle further based on a type of the specific electrically-powered ridesharing vehicle. For example, charging station module 630 may select a farther charging station for a long-distance type vehicle as compared to a short-distance type vehicle.

Additionally or alternatively, charging station module 630 may access map data including information about a terrain of the geographic area and select the charging station for the specific electrically-powered ridesharing vehicle further based on the map data. For example, charging station module 630 may select a charging station other than a charging station closest to a current location of the specific electrically-powered ridesharing vehicle because the roads used to reach the closest station are under construction or are otherwise suboptimal compared to the roads used to reach a farther station. As another example, charging station module 630 may select a charging station other than a charging station closest to a current location of the specific electrically-powered ridesharing vehicle because the route used to reach the closest station includes more elevation changes compared to the route used to reach a farther station.

At step 819, charging station module 630 may direct the specific electrically-powered ridesharing vehicle to the selected charging station. Charging station module 630 may also determine a route for directing the specific electrically-powered ridesharing vehicle to the selected charging station. In some embodiments, the determined route may be longer but with less elevation changes compared to an alternative driving route.

Method 810 may include additional steps. For example, charging station module 630 may adjust a charging schedule at the selected charging station based on an estimated time of arrival of the specific electrically-powered ridesharing vehicle. As explained above, charging station module 630 may provide instructions to only partially charge an electrically-powered ridesharing vehicle already at the selected charging station in order to make room at the selected charging station for the specific electrically-powered ridesharing vehicle. Additionally or alternatively, charging station module 630 may provide instructions to only partially charge the specific electrically-powered ridesharing vehicle in order to make room at the selected charging station for another electronically-powered ridesharing vehicle with an immediate need for charging.

Figure 8B:
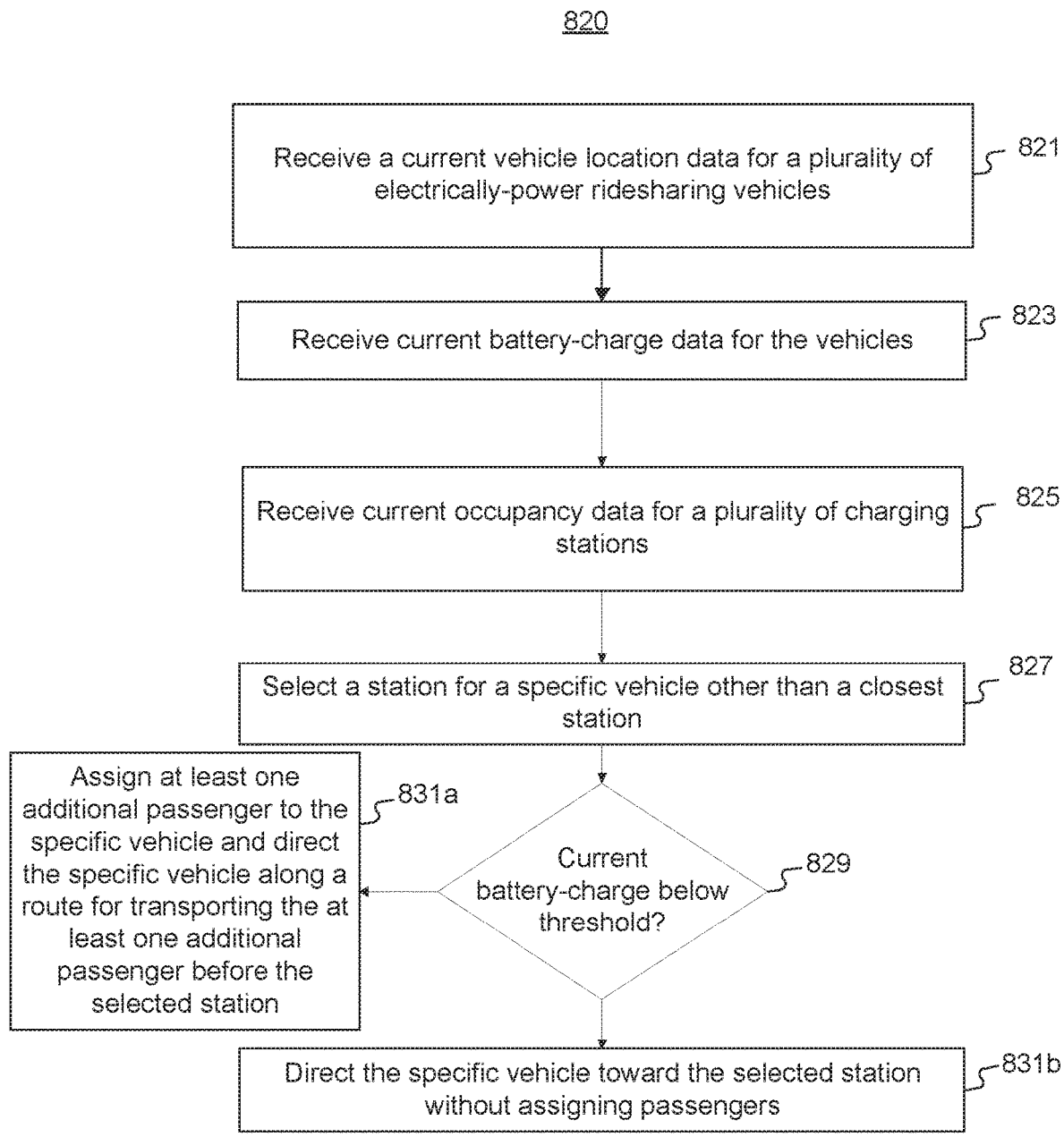
FIG. 8B is a flowchart showing another exemplary process for managing a fleet of ridesharing vehicles including electrically-powered ridesharing vehicles.

FIG. 8B illustrates a flowchart showing exemplary process 820 for managing a fleet of vehicles-for-hire including electrically-powered vehicles-for-hire associated with a vehicle management server, consistent with disclosed embodiments. In one embodiment, the steps of process 820 may be performed by a vehicle management server, such as ridesharing management server 150 described above with reference to FIGS. 1 and 3. Alternatively, at least some of the steps of process 820 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be used to implement example methods disclosed herein.

Steps 821, 823, 825, and 827 may be implemented similarly to steps 811, 813, 815, and 817 of method 810, respectively. At step 829, charging station module 630 may determine whether a current charge of the specific electrically-powered ridesharing vehicle is above a threshold. In lieu of the current charge, charging station module 630 may use an estimated range or driving duration and/or distance.

At step 831*a*, when a current charge of the specific electrically-powered ridesharing vehicle is above a threshold, charging station module 630 may assign at least one additional passenger to the specific electrically-powered ridesharing vehicle, and direct the specific electrically-powered ridesharing vehicle along a first route for transporting the at least one additional passenger before reaching the selected charging station. In some embodiments, charging station module 630 may estimate an updated battery charge, estimated range, and/or driving duration and/or distance based on the first route (e.g., using real-time traffic, map data, historical driver data, or the like) and compare the updated battery charge, estimated range, and/or driving duration and/or distance to the threshold rather than the current charge in order to determine whether to assign the at least one additional passenger to the specific electrically-powered ridesharing vehicle.

At step 831*b*, when a current charge of the specific electrically-powered ridesharing vehicle is below the threshold, charging station module 630 may direct the specific electrically-powered ridesharing vehicle along a second route for guiding the specific electrically-powered ridesharing vehicle towards the selected charging station without assigning passengers for pick up along the second route. As explained above, charging station module 630 may use the updated battery charge, estimated range, and/or driving duration and/or distance to compare to the threshold rather than the current charge.

Method 820 may include additional steps. For example, similar to method 810, method 820 may include adjusting a charging schedule at the selected charging station based on an estimated time of arrival of the specific electrically-powered ridesharing vehicle. As explained above, charging station module 630 may provide instructions to only partially charge an electrically-powered ridesharing vehicle already at the selected charging station in order to make room at the selected charging station for the specific electrically-powered ridesharing vehicle. Additionally or alternatively, charging station module 630 may provide instructions to only partially charge the specific electrically-powered ridesharing vehicle in order to make room at the selected charging station for another electronically-powered ridesharing vehicle with an immediate need for charging.

Although not depicted in FIGS. 8A and 8B, the specific electrically-powered ridesharing vehicle may continue to function as a ridesharing vehicle during selection of the charging station. Accordingly, in any of the embodiments described with reference to FIGS. 8A and 8B, the specific electrically-powered ridesharing vehicle may be assigned to pick-up a plurality of passengers such that at least some of the passengers share their ride with at least one other passenger.

Route Planning Accounting for Current Charge of Battery

In ridesharing fleets in which at least some of the vehicles may be electric charging vehicles, routes may need to account for charging stations. Conventional fleets often do not need to account for gas stations because such stations are ubiquitous compared to electric charging stations. Accordingly, embodiments of the present disclosure may account for battery-charge when routing a ridesharing vehicle such that the ridesharing vehicle is directed to a charging station at appropriate times. Although individual routes may be sub-optimized, the overall optimization of the fleet of vehicles may be increased. Accordingly, the technical solutions set forth in these embodiments optimize the fleet rather than individual vehicles and result in the use of more accurate and flexible optimization schema.

Figure 9:
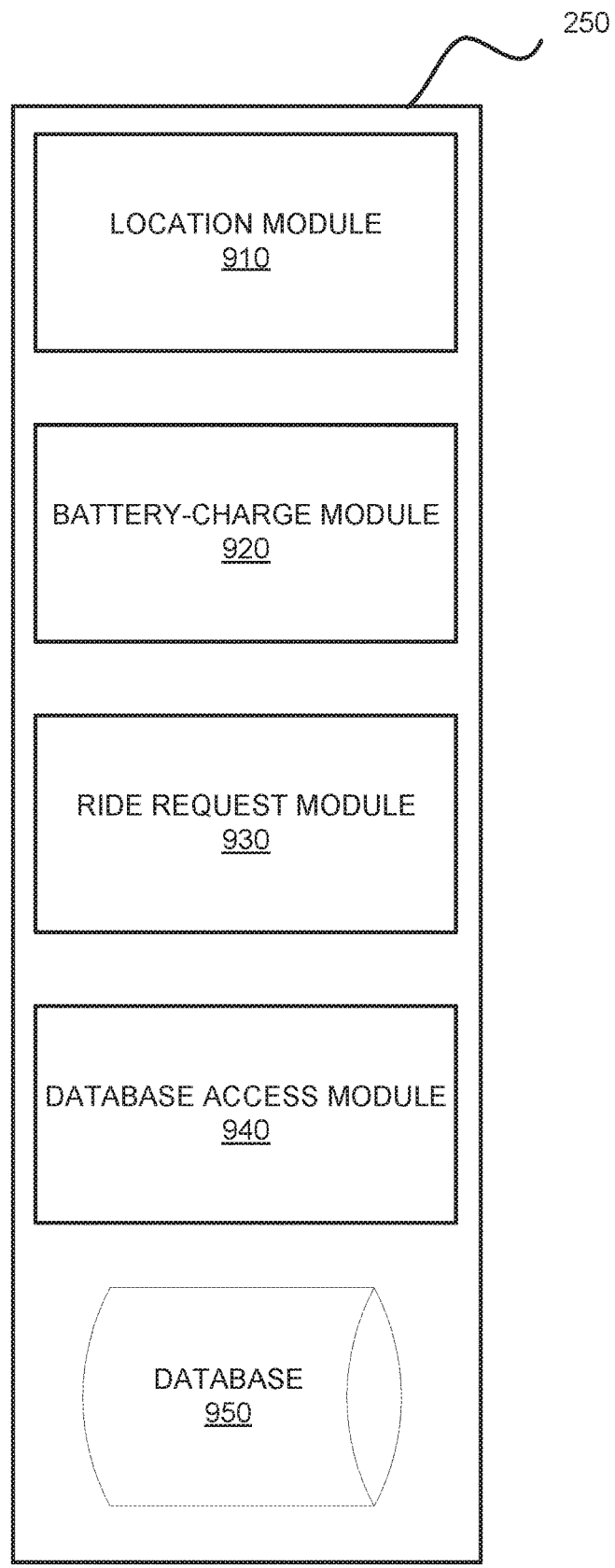
FIG. 9 is an exemplary embodiment of a memory containing software modules consistent with the present disclosure.

FIG. 9 depicts an embodiment of memory module 250 for managing a fleet of ridesharing vehicles including electrically-powered ridesharing vehicles consistent with the present disclosure. Memory 250 may store a plurality of modules, and may be executable by at least one processor to perform various methods and processes disclosed herein. Further, it should be noted that memory 250 may store more or fewer modules than those shown in FIG. 9, depending on implementation-specific considerations.

As illustrated in FIG. 9, memory 250 may store software instructions to execute a location module 910, a battery-charge module 920, a ride request module 930, a database access module 940, and may include a database 950. Location module 910 may include software instruction for receiving locations of ridesharing vehicles from one or more sources. Battery-charge module 920 may include software instruction for receiving battery-charge levels of ridesharing vehicles from one or more sources. Ride request module 930 may include software instruction for receiving ride requests from a plurality of users. Database access module 940 may include software instruction executable to interact with database 950, to store and/or receive information (e.g., geographical maps associated with a geographical area in which a vehicle is operating, current traffic information of a geographical area, historical data for efficient routes, etc.).

Location module 910 may include software instructions for receiving current vehicle location data for an electrically-powered ridesharing vehicle. In some embodiments, the current vehicle location data may include global positioning system (GPS) data generated by at least one GPS component associated with the electrically-powered ridesharing vehicle. Additionally or alternatively, location module 910 may receive other location information, such as cell tower triangulation data, Wi-Fi or other signal strength data, or any other combination of location information. In one example, location module 910 may receive the location data, for example, from a mobile communication device (e.g., a smartphone, tablet, wearable device, etc.) associated (e.g. located in the passenger cabin) with the electrically-powered ridesharing vehicle.

Battery-charge module 920 may include software instructions for receiving current battery-charge data for an electrically-powered ridesharing vehicle. The data may be related to the remaining charge of the battery powering the vehicle and/or an estimated time until depletion of the battery as captured by a power sensor in the vehicle for determining the current charge level of the battery. The power sensor may transmit the data to a remote server over a wireless channel or to vehicle routing module to select a charging station, based on the current battery charge level. The power sensor may be configured to continuously monitor and transmit data related to the current battery charge level. The power sensor may also monitor the current battery charge level and transmit data when the charge level is less than a predetermined threshold level.

In some embodiments, the current battery-charge data may be indicative of a driving duration and/or distance in which each electrically-powered ridesharing vehicle can operate before charging. Similar to battery-charge module 620, battery-charge module 920 may determine the driving duration and/or distance based on the current charge level of the battery and one or more known characteristics of the vehicle. Alternatively, the vehicle may perform the conversion and send the driving duration and/or distance to battery-charge module 920. In some embodiments, the driving duration and/or distance in which the electrically-powered ridesharing vehicle can operate before recharging may correspond to at least one of a driving time and a driving distance.

Additionally or alternatively, similar to battery-charge module 620, battery-charge module 920 (or the vehicle) may estimate the driving duration and/or distance using real-time traffic data along a current route of the vehicle, using terrain data, such as elevation changes, along a current route of the vehicle, using driver-performances data indicative of driver acceleration and deceleration rates, or the like.

Ride request module 930 may include software instruction for receiving ride requests from a plurality of users. Each ride request may include a starting point and a desired destination within the geographic area. Ride request module 930 may manage the ride requests based on proximity to a current location of an electrically-powered ridesharing vehicle in the fleet of vehicles. Data relating to the current location of the electrically-powered ridesharing vehicle may have been received by location module 910, as described above.

In some embodiments, ride request module 930 may determine a pick-up location and a drop-off location, the determined pick-up location being at a location other than but in proximity to the starting point and the determined drop-off location being at a location other than but in proximity to the desired destination. For example, ride request module 930 may determine the pick-up location based on a current route of the electrically-powered ridesharing vehicle. In one embodiment, ride request module 930 may determine the pick-up location to minimize how far off the current route the electrically-powered ridesharing vehicle must travel. Such optimization may be performed against one or more hard constraints, such as a maximum walking distance. The maximum walking distance may be predetermined based on the starting point of the user, a user preference received from the user, information regarding existence and condition of sidewalks near the starting point of the user, or the like.

Additionally or alternatively, ride request module 930 may determine the drop-off location for a user based on a location of the charging station and the desired destination of the ride request. For example, in one embodiment, a ride request may include information that the desired destination is a building at the corner of an intersection of two cross streets. Ride request module 930 may determine that dropping the user off at the intersection would result in the vehicle entering a one-way street, impeding a more efficient route to a charging station. Thus, ride request module 930 may instead, for example, drop the user off at a location proximal to the desired destination, and avoid entering the one-way street.

In such embodiments, ride request module 930 may use a communications interface to transmit data to mobile communications devices of each of the plurality of users, the transmitted data including walking directions to the determined pick-up locations. Additionally or alternatively, the transmitted data may include an update about a change in the drop-off location.

Ride request module 930 may further include software instruction for assigning an electrically-powered ridesharing vehicle to pick-up the plurality of users such that at least some of the users share their ride with at least one other passenger. The assignment of the users to the electrically-powered ridesharing vehicle may additionally or alternatively be based on a proximity of at least one starting point to the current location of the electrically-powered ridesharing vehicle. The assignment of the users to the electrically-powered ridesharing vehicle may additionally or alternatively be based on a proximity of at least one desired destination to at least one charging station.

In embodiments where battery-charge module 920 determines the driving duration and/or distance in which the electrically-powered ridesharing vehicle can operate before recharging based on the current battery-charge data, ride request module 930 may assign the electrically-powered ridesharing vehicle to pick-up the plurality of users based on the determined driving duration and/or distance. For example, ride request module 930 may determine, based on the estimated driving duration, that the electrically-powered ridesharing vehicle has enough battery charge to transport the users and then reach a charging station.

Ride request module 930 may further include software instruction for determining a route for the electrically-powered ridesharing vehicle that ends at a charging station. For example, ride request module 930 may make the determination based on the current vehicle location data, the current battery-charge data, the desired destinations of passengers currently riding the electrically-powered ridesharing vehicle, and stored locations of the charging stations. Accordingly, the current vehicle location, the desired destinations (or determined drop-off locations) and the location of the charging station may serve as anchor points for the route. The route itself may connect the anchors and be optimized such that the route may be traversed using the current battery-charge (or driving duration and/or distance). The locations of the charging station may be stored in database 950 and accessed by ride request module 930.

Ride request module 930 may dynamically determine the route to optimize one or more performance variables, subject to the hard constraint of the current battery-charge (or estimated driving duration and/or distance). For example, in one embodiment, ride request module 930 may direct the electrically-powered ridesharing vehicle along one or more routes based on the current charge level of the battery associated with the ridesharing vehicle and a location of a charging station for maximum efficient consumption of the remaining battery charge.

As illustrated in FIG. 9, database 950 may be configured to store any type of information to modules 910-940, depending on implementation specific considerations. For example, in embodiments in which battery-charge module 920 and/or ride request module 930 is configured to access one or more prior-stored maps of geographical areas for determining a route, database 950 may store the geographical maps. In other embodiments where ride request module 930 is configured to access one or more listings of charging stations, database 950 may store locations, hours of operation, and/or charging capacity for each charging station. Still, in other embodiments, database 950 may include information related to a charging capacity of each of the plurality of charging stations to accept additional vehicles, and for ride requests with pick-up location in a vicinity of the electrically powered vehicle-for-hire in need of the charge, at least one processor may be configured to assign the electrically-powered vehicle-for-hire to pick up a user based on a proximity of a drop-off location to a charging station and a capacity of that charging station to accept the electrically-powered vehicle for-hire. Location module 910, battery-charge module 920, and ride request module 930 may access database for communication by way of data access module 940.

Modules 910-940 may be implemented in software, hardware, firmware, or any combination of software, hardware or firmware. For example, if the modules are implemented in software, they may be stored in memory 250. However, in some embodiments, any one or more of modules 910-940 and data associated with database 950 may, for example, be stored in processor 204 and/or executed on a device associated with ridesharing management system 100. Modules 910-940 may be configured to interact with each other and/or other modules of memory 250 to perform functions consistent with disclosed embodiments.

Figure 10:
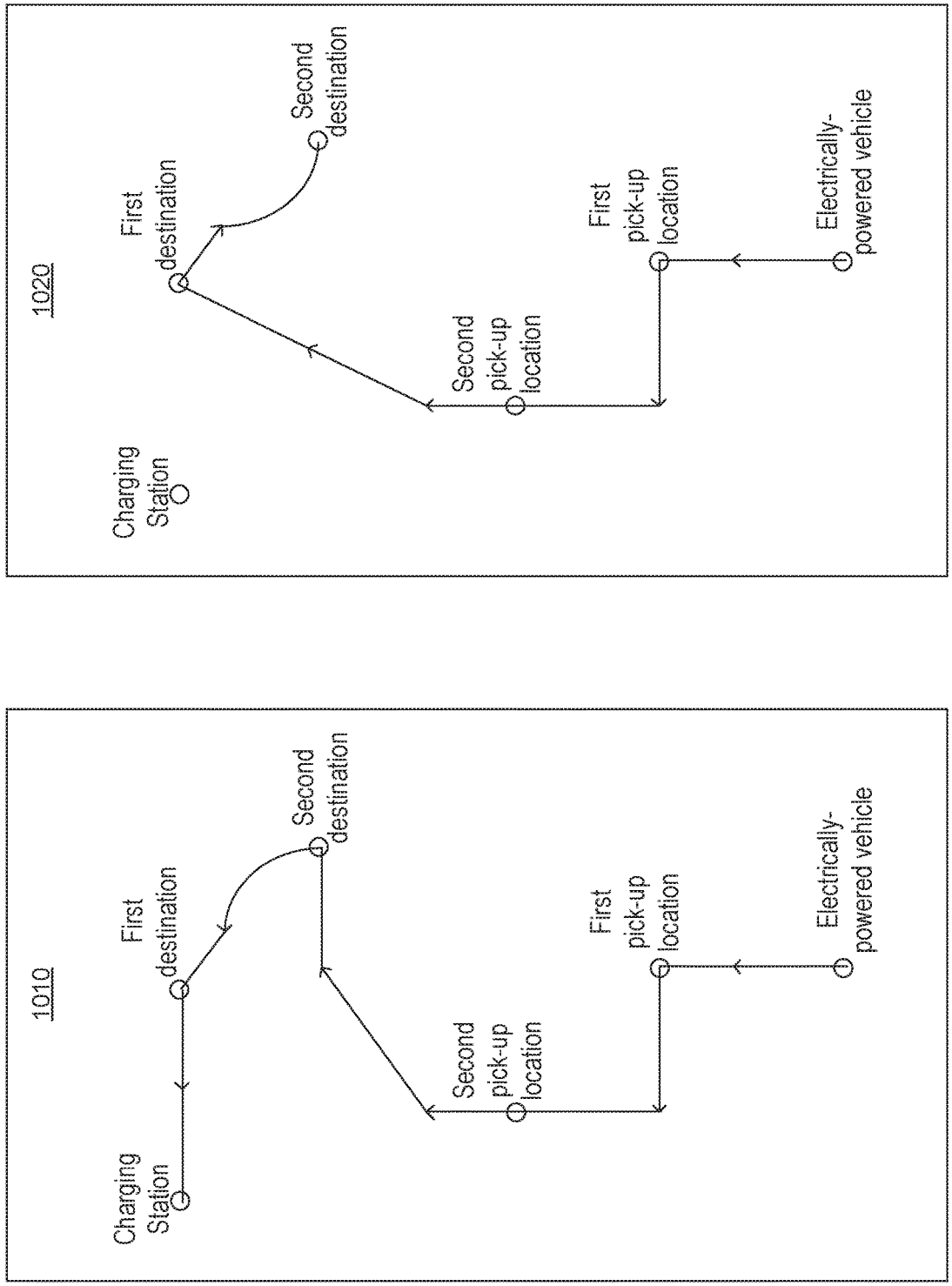
FIG. 10 is a schematic illustration of a first and second route in response to an indicator of the current charge level of a battery, according to a first embodiment and consistent with the present disclosure.

FIG. 10 illustrates an example of selection between a first and second route in response to an indicator of the current charge level of a battery. As depicted in FIG. 10, a first route 1010 may allow for pick-up and drop off of a first passenger and of a second passenger and then terminate at a charging station. On the other hand, a second route 1020 may also allow for pick-up and drop off of a first passenger and of a second passenger without terminating at a charging station. In some examples, route 1020 may be faster and/or of shorter distance than route 1010, e.g., due to higher speed limits on a least a portion of route 1020 compared to route 1010, more direct roads on at least a portion of route 1020 compared to route 1010, improved traffic conditions on at least a portion of route 1020 compared to route 1010, or the like. Nonetheless, embodiments of the present disclosure may select route 1010 over route 1020 based on one or more variables, such as current battery-charge of the vehicle, desired destinations of passengers currently riding the vehicle, and stored locations of charging stations, current occupancy data for the charging stations, and the like. Accordingly, embodiments of the present disclosure may sub-optimize an individual vehicle, e.g., by selecting route 1010 over route 1020, in order to ensure the vehicle is charged and/or to improve efficiency of a fleet in which the vehicle is one member.

Figure 11A:
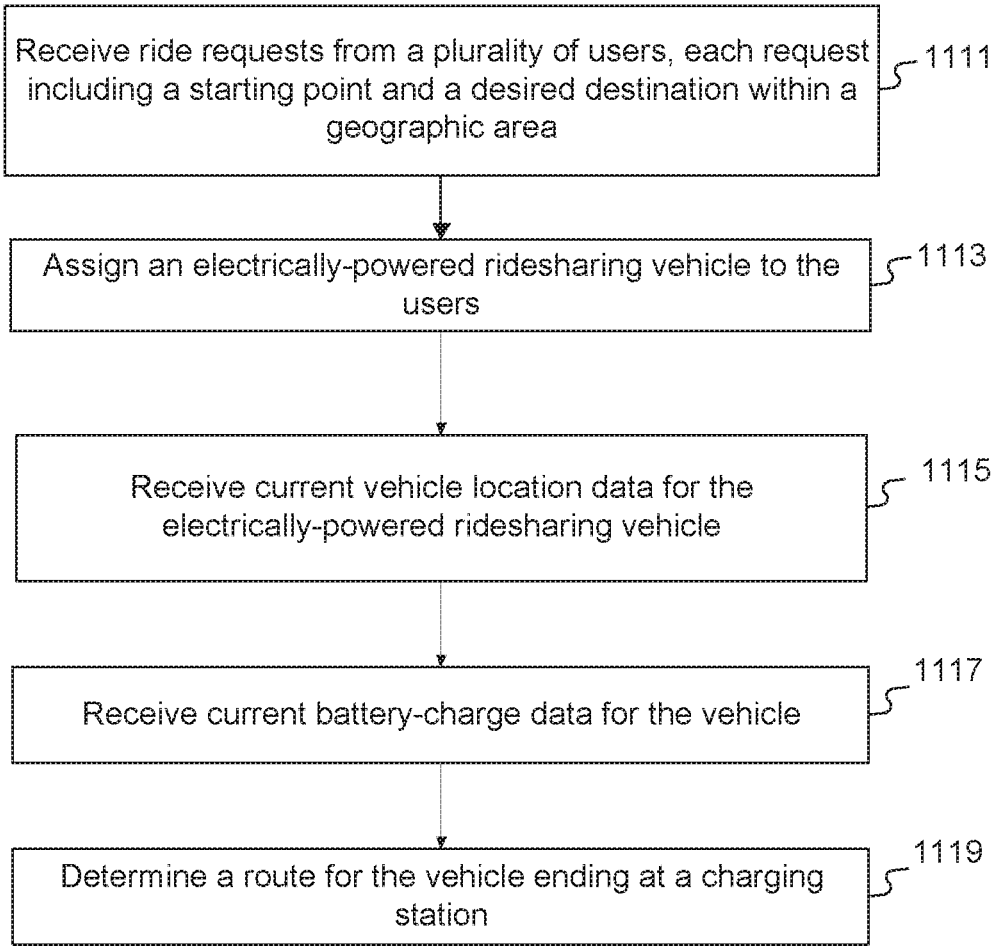
FIG. 11A is a flowchart showing an exemplary process for managing a fleet of ridesharing vehicles including electrically-powered ridesharing vehicles.

FIG. 11A illustrates a flowchart showing exemplary process 1110 for managing a fleet of vehicles-for-hire including electrically-powered vehicles-for-hire associated with a vehicle management server, consistent with disclosed embodiments. In one embodiment, the steps of process 1110 may be performed by a vehicle management server, such as ridesharing management server 150 described above with reference to FIGS. 1 and 3. Alternatively, at least some of the steps of process 1110 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be utilized to implement example methods disclosed herein.

At step 1111, ride request module 930 may receive ride requests from a plurality of users. Each ride request may include a starting point and a desired destination within the geographic area. As explained above, in some embodiments, ride request module 930 may determine a pick-up location and a drop-off location, the determined pick-up location being at a location other than but in proximity to the starting point and the determined drop-off location being at a location other than but in proximity to the desired destination. In such embodiments, ride request module 930 may use a communications interface to transmit data to mobile communications devices of each of the plurality of users, the transmitted data including walking directions to the determined pick-up locations. Additionally or alternatively, the transmitted data may include an update about a change in the drop-off location.

At step 1113, ride request module 930 may assign an electrically-powered ridesharing vehicle to pick-up the plurality of users such that at least some of the users share their ride with at least one other passenger. For example, as explained above, the assignment may be based on a proximity of at least one starting point to a current location of the electrically-powered ridesharing vehicle and/or a proximity of at least one desired destination to a location of at least one charging station.

In some embodiments, the plurality of electrically-powered ridesharing vehicles traveling within the geographic area may include short-distance type vehicles and long-distance type vehicles with a battery capacity greater than a battery capacity of the short-distance vehicles. In such embodiments, ride request module 930 may assign a long-distance type vehicle for picking up a user based on a desired destination of the user. For example, if the desired destination is beyond a threshold distance (whether as the crow flies or a route-based distance) and/or a threshold travel time (whether ideal travel time or a travel time accounting for real-time traffic), ride request module 930 may assign a long-distance type vehicle.

At step 1115, location module 910 may receive current vehicle location data for the electrically-powered ridesharing vehicle. As explained above, the current vehicle location data may include global positioning system (GPS) data generated by at least one GPS component associated with the electrically-powered ridesharing vehicle.

At step 1117, battery-charge module 920 may receive current battery-charge data for the electrically-powered ridesharing vehicle. As explained above, the current battery-charge data may be indicative of a driving duration and/or distance in which the electrically-powered ridesharing vehicle can operate before charging. In some embodiments, battery-charge module 920 may estimate the driving duration and/or distance. For example, battery-charge module 920 may receive real-time traffic data and estimate a driving duration and/or distance in which the electrically-powered ridesharing vehicle can operate before charging based on the current battery-charge data and the real-time traffic data. Additionally or alternatively, battery-charge module 920 may obtain driver-performances data indicative of driver acceleration and deceleration rates and determine a driving duration and/or distance in which the electrically-powered ridesharing vehicle can operate before charging based on the current battery-charge data and the driver-performances data. Additionally or alternatively, battery-charge module 920 may access map data including information about a terrain of the geographic area and determine a driving duration and/or distance in which the electrically-powered ridesharing vehicle can operate before recharging based on the current battery-charge data and elevation changes expected along a scheduled route of the electrically-powered ridesharing vehicle.

In some embodiments, as explained above, battery-charge module 920 may determine the driving duration and/or distance in which the electrically-powered ridesharing vehicle can operate before recharging based on the current battery-charge data. In such embodiments, ride request module 930 may assign the electrically-powered ridesharing vehicle to pick-up the plurality of users based on the determined driving duration and/or distance.

At step 1119, based on the current vehicle location data, the current battery-charge data, the desired destinations of passengers currently riding the electrically-powered ridesharing vehicle, and stored locations of the charging stations, ride request module 930 may determine a route for the electrically-powered ridesharing vehicle that ends at a charging station. As explained above, the current vehicle location, the desired destinations (or determined drop-off locations) and the location of the charging station may serve as anchor points for the route, and the route itself may connect the anchors and be optimized such that the route may be traversed using the current battery-charge (or driving duration and/or distance). In some embodiments, ride request module 930 may dynamically determine the route to optimize one or more performance variables, subject to the hard constraint of the current battery-charge (or estimated driving duration and/or distance). In some embodiments, ride request module 930 may access map data including information about a terrain of the geographic area and use the map data, when determining the route for the electrically-powered ridesharing vehicle, such that the determined route is both longer and has less elevation changes in comparison to an alternative driving route.

Method 1100 may include additional steps. For example, method 1100 may include receiving current occupancy data for the plurality of charging stations and selecting a charging station for routing the electrically-powered ridesharing vehicle based on the current vehicle location data, the current battery-charge data, the stored locations of the plurality of charging stations, and the current occupancy data.

Figure 11B:
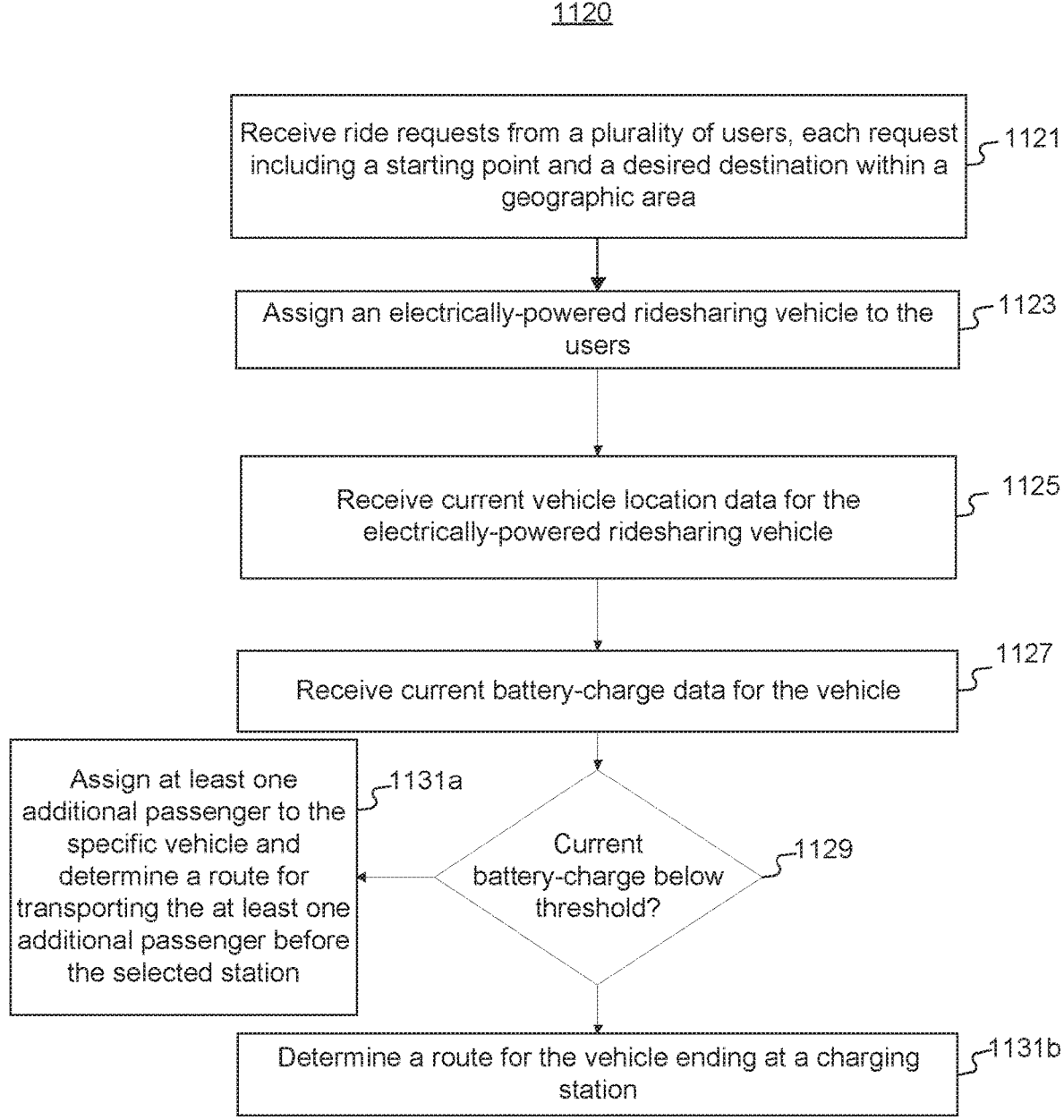
FIG. 11B is a flowchart showing another exemplary process for managing a fleet of ridesharing vehicles including electrically-powered ridesharing vehicles.

FIG. 11B illustrates a flowchart showing exemplary process 1120 for managing a fleet of vehicles-for-hire including electrically-powered vehicles-for-hire associated with a vehicle management server, consistent with disclosed embodiments. In one embodiment, the steps of process 1120 may be performed by a vehicle management server, such as ridesharing management server 150 described above with reference to FIGS. 1 and 3. Alternatively, at least some of the steps of process 1120 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be utilized to implement example methods disclosed herein.

Steps 1121, 1123, 1125, and 1127 may be implemented similarly to steps 1111, 1113, 1115, and 1117 of method 1110, respectively. At step 1129, ride request module 930 may determine whether a current charge of the electrically-powered ridesharing vehicle is above a threshold. In lieu of the current charge, ride request module 930 may use an estimated range or driving duration and/or distance.

At step 1131*a*, when a current charge of the electrically-powered ridesharing vehicle is above a threshold, ride request module 930 may assign at least one additional passenger to the electrically-powered ridesharing vehicle, and direct the electrically-powered ridesharing vehicle along a first route for transporting the at least one additional passenger before reaching the charging station. In some embodiments, ride request module 930 may estimate an updated battery charge, estimated range, and/or driving duration and/or distance based on the first route (e.g., using real-time traffic, map data, historical driver data, or the like) and compare the updated battery charge, estimated range, and/or driving duration and/or distance to the threshold rather than the current charge in order to determine whether to assign the at least one additional passenger to the electrically-powered ridesharing vehicle.

At step 1131*b*, when a current charge of the electrically-powered ridesharing vehicle is below the threshold, ride request module 930 may direct the electrically-powered ridesharing vehicle along a second route for guiding the electrically-powered ridesharing vehicle towards the selected charging station without any additional assigning passengers along the second route. As explained above, ride request module 930 may use the updated battery charge, estimated range, and/or driving duration and/or distance to compare to the threshold rather than the current charge.

Method 1120 may include additional steps. For example, similar to method 1110, method 1120 may include receiving current occupancy data for the plurality of charging stations and selecting a charging station for routing the electrically-powered ridesharing vehicle based on the current vehicle location data, the current battery-charge data, the stored locations of the plurality of charging stations, and the current occupancy data.

Ridesharing Algorithm for Accounting for Battery Charging Stops

Embodiments of the present disclosure may provide a ridesharing algorithm to account for battery charging stops. For example, as electric vehicles make their way into ridesharing fleets, ridesharing systems may select and customize routes based on a determined battery charge level and schedule pick-ups and drop-offs based on a determined location of charging stations.

In some embodiments, ridesharing management system 100 may analyze data received from a power sensor to determine a current charge level of a battery of the ridesharing vehicle. The ridesharing vehicle may include a manually-drivable vehicle or an autonomous vehicle. In some embodiments, the ridesharing vehicle may include a ridesharing management system 100 for determining, based on the charge level of the battery, that the battery requires recharging while traveling on a first driving route. A second driving route may be generated to avoid picking up additional ridesharing passengers until the vehicle is empty of passengers and thereafter directs the vehicle to a charging station where the ridesharing vehicle is taken out of service for battery recharging. The second driving route may be generated based on, among other factors, the battery charge level, a location of a charging station closest to a current location of the ridesharing vehicle, a location of the charging station closest to a last drop-off location of the first driving route, a location of a charging station in the vicinity of an area with expected passenger demand, and road conditions, such as elevation changes, to maximize the time to depletion of the battery. These and other features of presently disclosed embodiments are discussed in more detail below.

Figure 12:
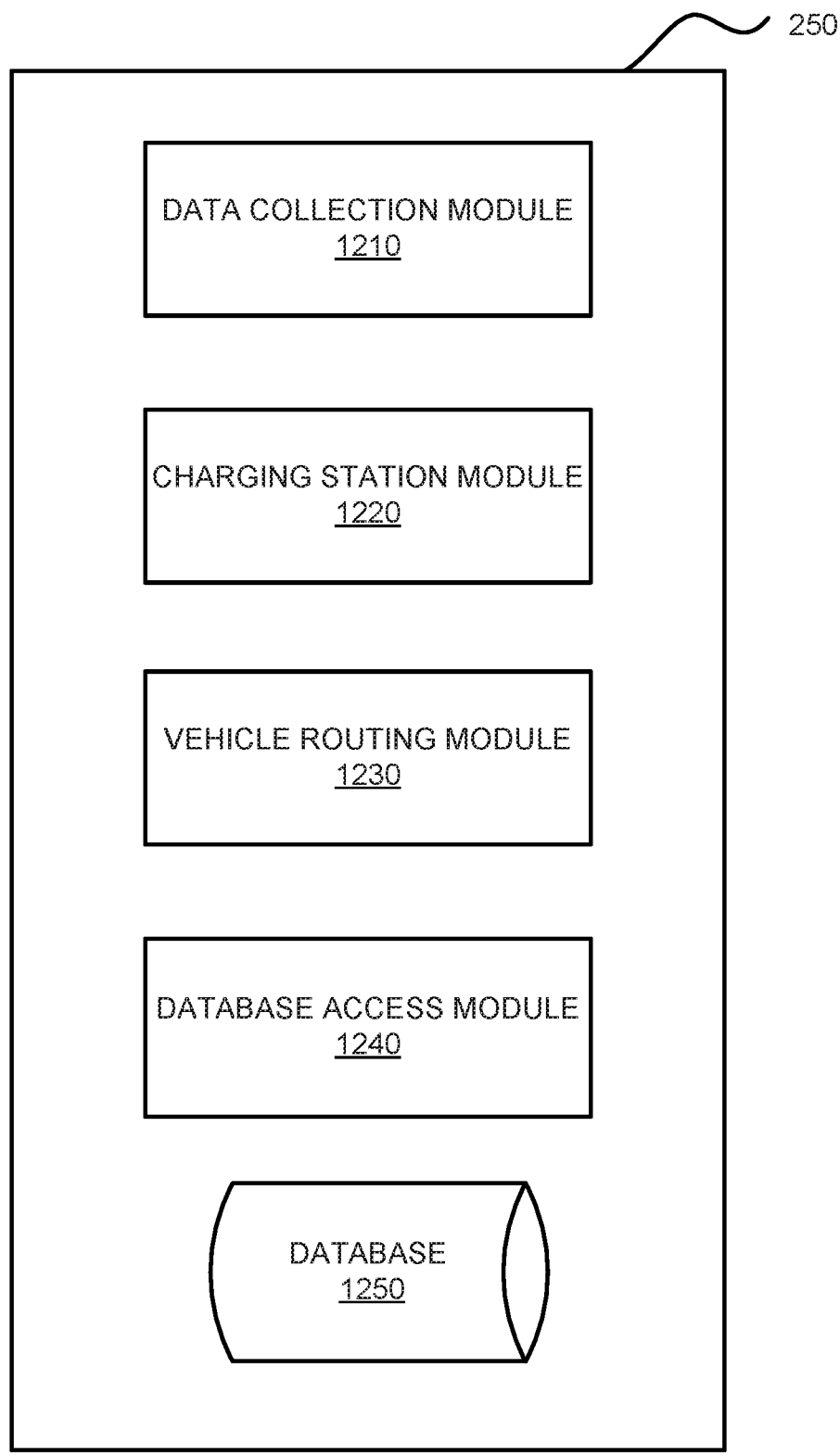
FIG. 12 is an exemplary embodiment of a memory containing software modules consistent with the present disclosure.

FIG. 12 is a diagram illustration an example of memory 250 storing a plurality of modules, consistent with the disclosed embodiments. The modules may be executable by at least one processor to perform various methods and processes disclosed herein. Further, it should be noted that memory 250 may store more or fewer modules than those shown in FIG. 12, depending on implementation-specific considerations.

As illustrated in FIG. 12, memory 250 may store software instructions to execute a data collection module 1210, a charging station module 1220, a vehicle routing module 1230, a database access module 1240, and may include a database 1250. Input data collection module 1210 may include software instruction for receiving input data (e.g., passenger ride request current location of ridesharing vehicle, battery charge level, etc.) from one or more sources. Charging station module 1220 may include software instruction to determine locations of charging stations in relation to a determined route or a drop-off location. Vehicle routing module 1230 may include software instruction for sending one or more ridesharing vehicles to pick up user(s), directing vehicles along a determined route, and determining an alternative route based on information received from charging station module 1220. Database access module 1240 may include software instruction executable to interact with database 1250, to store and/or receive information (e.g. geographical maps associated with a geographical area in which a ridesharing vehicle is operating, current traffic information of a geographical area, historical data for efficient routes, etc.).

Data collection module 1210 may include software instructions for receiving data related to a current charge level of a battery associated with the ridesharing vehicle. The data may be related to the remaining charge of the battery powering the vehicle and/or an estimated time until depletion of the battery and captured by a power sensor in the vehicle for determining the current charge level of the battery. The power sensor may transmit the data to a remote server over a wireless channel or to vehicle routing module to determine whether a current route needs to be reconfigured, based on the current charge level. The power sensor may be configured to continuously monitor and transmit data related to the current charge level or the battery. The power sensor may also monitor the current charge level of the battery and transmit data when the charge level is less than a predetermined threshold battery charge level.

Data collection module 1210 may also include software instruction related to ridesharing vehicle routing. The data may be relevant to directing one or more ridesharing vehicles along a route. For example, the data may include ride requests from a plurality of users headed to a plurality of destinations. The ride requests may include information such as a pick-up location, a drop-off location, and identity of the user, a rating of the user, etc. The ride requests may also be filtered based on a currently location of one or more ridesharing vehicles. Data relating to the current location of a ridesharing vehicle may be received, for example, from a mobile communication device (e.g. a smartphone, tablet, wearable device, etc.) associated (e.g. located in the passenger cabin) with the ridesharing vehicle.

Charging station module 1220 may include software instruction for determining battery charging stations within a predetermined radius of a ridesharing vehicle. For example, charging station module 1220 may receive data from a plurality of sources to determine a location of the charging station closest to a current location of the ridesharing vehicle, a location of the charging station closest to a drop-off location of a last remaining passenger, or a location of a charging station in the vicinity of an area with expected passenger demand. Charging station module 1220 may also be configured to determine the availability of supply equipment based on the number of other electric vehicles at the charging station and/or estimate a wait time for completing charging. Charging station module 1220 may also be configured to predict, based on historical data, an expected demand at each charging station for a time of day or day of the week.

Vehicle routing module 1230 may include software instruction for routing a ridesharing vehicle to pick up and/or transport one or more passengers. For example, in response to ride requests received by data collection module 1210 from the plurality of users headed to a plurality of destinations, vehicle routing module 1230 may send the ridesharing vehicle to pick up the plurality of users. That is, vehicle routing module 1230 may direct the ridesharing vehicle along one or more routes through the surrounding environment based on the current state of one or more variables. Further, the route to which the ridesharing vehicle is assigned may be dynamically adjusted during transportation of the plurality of users to direct the ridesharing vehicle to optimize one or more performance variable. For example, in one embodiment, vehicle routing module 1230 may direct and/or redirect the ridesharing vehicle along one or more routes based on the current charge level of the battery associated with the ridesharing vehicle and a location of a charging station.

As illustrated in FIG. 12, database 1250 may be configured to store any type of information associated with, for example, modules 1210-1240, depending on implementation specific considerations. For example, in embodiments in which vehicle routing module 1230 is configured to access one or more prior-stored maps of geographical areas, database 1250 may store the geographical maps. In other embodiments where charging station module 1220 is configured to access one or more listings of charging stations, database 1250 may store hours of operation for each charging station and provide to charging station module 1220 and vehicle routing module 1230, a list of charging stations based on charging station available for operation at the estimated time of arrival of ridesharing vehicle at the charging station.

Modules 1210-1240 may be implemented in software, hardware, firmware, or any combination of software, hardware or firmware. For example, if the modules are implemented in software, they may be stored in memory 250. However, in some embodiments, any one or more of modules 1210-1240 and data associated with database 1250 may, for example, be stored in processor 204 and/or executed on a device associated with ridesharing management system 100. Modules 1210-1240 may be configured to interact with each other and/or other modules of memory 250 to perform functions consistent with disclosed embodiments.

FIG. 13A illustrates an embodiment of travel route 1310 for a ridesharing vehicle on a first route 1312 and a second route 1315. While traveling on first route 1312, ridesharing vehicle may receive ride requests from a first and second user and may pick up first and second passenger. Ridesharing management server 150 may receive from the power sensor, the current charge level of the battery. Ridesharing vehicle may then receive, based on the current charge level, at least one second driving route 1315 that avoids pick up of additional ridesharing passengers. Second driving route 1315 may include dropping off remaining passengers until the ridesharing vehicle is empty of passengers. Ridesharing vehicle may also disengage with ridesharing management server 150 to cease accepting additional ride requests. The second driving route may also include instructions to pick up an additional passenger and drop off the additional passenger en route to the charging station, when the pick-up location and the drop-off location of the additional passenger is along the second driving route. The instructions may be configured such that the pick-up location and the drop-off location of the additional passenger does not change the second driving route. Ridesharing vehicle may then be directed to a charging station where the ridesharing vehicle is to be taken out of service for battery recharging.

FIG. 13B illustrates an embodiment of travel route 1320 for a ridesharing vehicle on a first route 1322 and a second route 1325. While traveling on first route 1322, ridesharing vehicle may receive ride requests from a first and second user and may pick up first and second passenger. Ridesharing management server 150 may receive from the power sensor, the current charge level of the battery. Ridesharing vehicle may then receive, based on the current charge level, at least one second driving route 1325 that avoids pick up of additional ridesharing passengers. Second driving route 1315 may include dropping off remaining passengers until the ridesharing vehicle is empty of passengers. Ridesharing vehicle, while en route to the charging station, may receive a ride request to pick up and drop off a third passenger. The pick-up location and the drop off location of the third passenger may be along the second driving route and the request does not cause ridesharing vehicle to detour from the second route 1325 to the charging station. Ridesharing vehicle may then be directed to a charging station where the ridesharing vehicle is to be taken out of service for battery recharging.

Figure 13C:
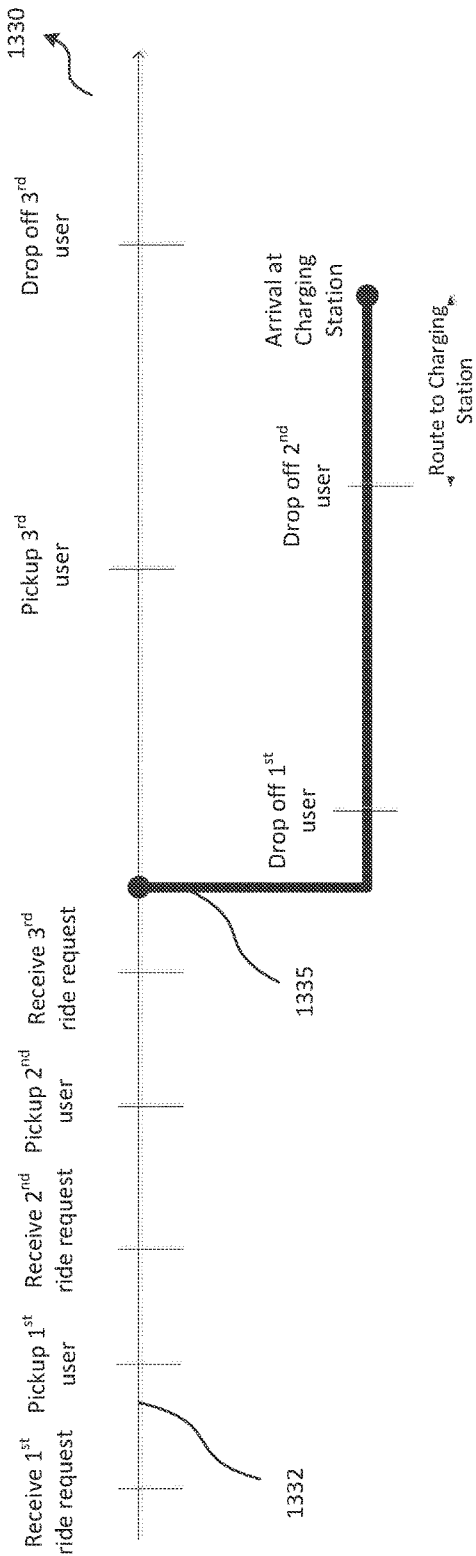
FIG. 13C is a schematic illustration of a first and second route in response to an indicator of the current charge level of a battery, according to a third embodiment and consistent with the present disclosure.

FIG. 13C illustrates an embodiment of travel route 1330 for a ridesharing vehicle on a first route 1332 and a second route 1335. While traveling on first route 1332, ridesharing vehicle may receive ride requests from a first and second user and may pick up first and second passenger. Ridesharing vehicle may also receive a request from a third user. However, prior to picking up third passenger, ridesharing management server 150 may receive from the power sensor, the current charge level of the battery. Ridesharing vehicle may then receive, based on the current charge level, at least one second driving route 1335 that avoids pick up of additional ridesharing passengers, including third user. Thus, second route 1335 effectively excludes picking up a rider that would have otherwise been included on first route 1332. Second driving route 1335 may include dropping off remaining passengers until the ridesharing vehicle is empty of passengers. Ridesharing vehicle may also disengage with ridesharing management server 150 to cease accepting additional ride requests. Ridesharing vehicle may then be directed to a charging station where the ridesharing vehicle is to be taken out of service for battery recharging.

Figure 13D:
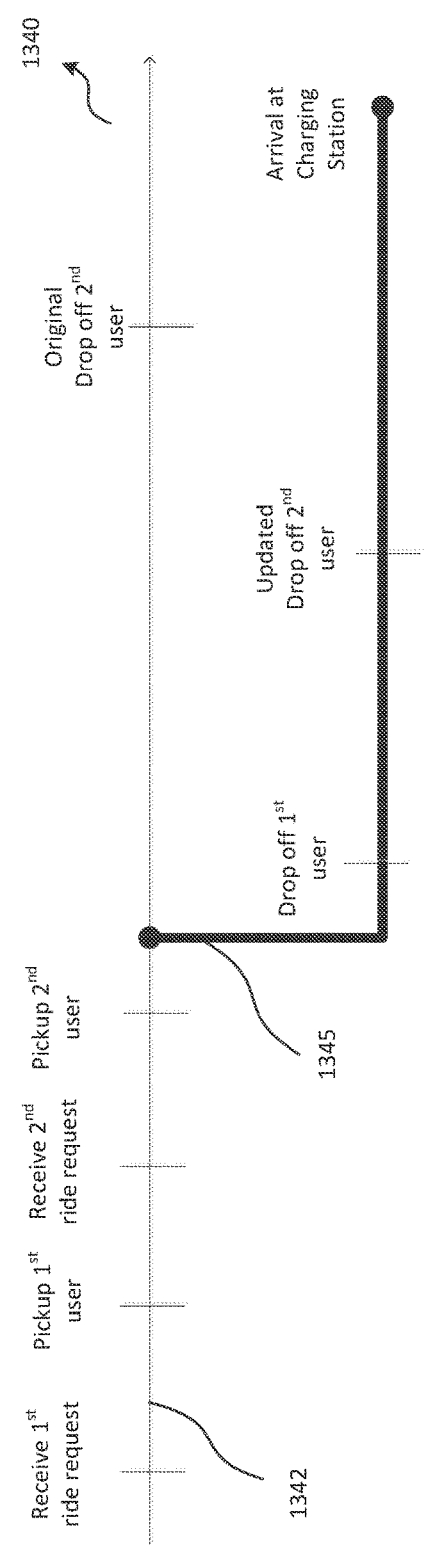
FIG. 13D is a schematic illustration of a first and second route in response to an indicator of the current charge level of a battery, according to a fourth embodiment and consistent with the present disclosure.

FIG. 13D illustrates an embodiment of travel route 1340 for a ridesharing vehicle on a first route 1342 and a second route 1345. While traveling on first route 1342, ridesharing vehicle may receive ride requests from a first and second user and may pick up first and second passenger. Ridesharing management server 150 may receive from the power sensor, the current charge level of the battery. Ridesharing vehicle may then receive, based on the current charge level, at least one second driving route 1345 that avoids pick up of additional ridesharing passengers. A drop off location for a passenger may be updated on second driving route 1345. The updated drop of location may be different from a drop off location indicated in the ride request. For example, in some embodiments, the first driving route may include a plurality of drop-off locations associated with the plurality of passengers, and the drop-off location of at least one of the plurality of passengers may be updated in the second driving route to be a different drop-off location. Second driving route 1345 may comprise dropping off the remaining passengers, including a passenger at an updated drop off location until the ridesharing vehicle is empty of passengers. In other embodiments, the second driving route may include less elevation changes than the first route. Ridesharing vehicle may then be directed to a charging station where the ridesharing vehicle is to be taken out of service for battery recharging.

Figure 14A:
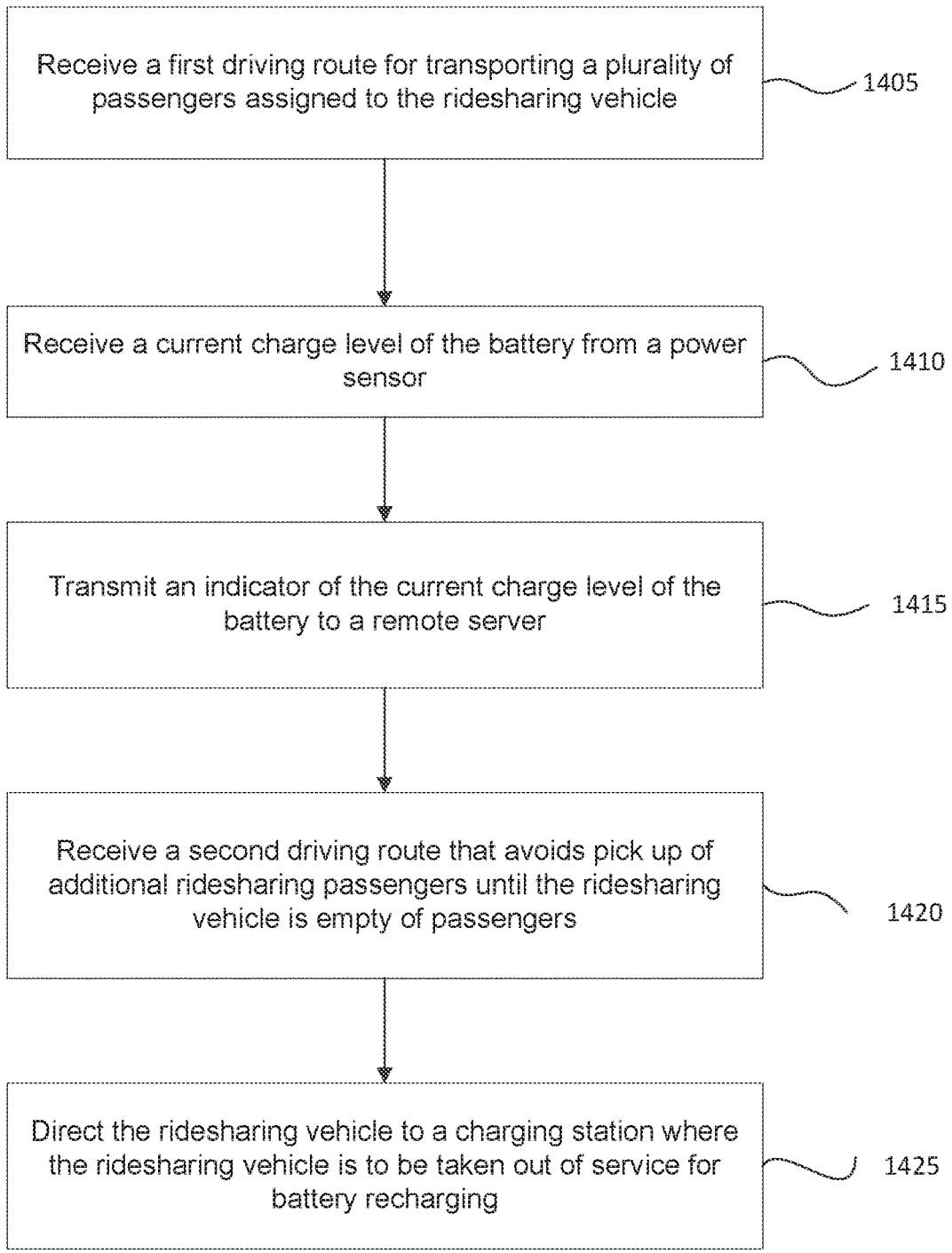
FIG. 14A is a flowchart showing an exemplary process for using electrically-powered vehicles for accounting for a battery charging stop.

FIG. 14A illustrates a flowchart showing exemplary ridesharing algorithm 1400 for accounting for a battery charging stop for a ridesharing vehicle associated with vehicle management server 150, consistent with disclosed embodiments. In one embodiment, the steps of process 1400 may be performed by a ridesharing management server, such as ridesharing management server 150 described above with reference to FIGS. 1 and 3. Alternatively, at least some of the steps of process 1400 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and hat other components may be utilized to implement example methods disclosed herein.

At step 1405, ridesharing management server 150 may receive interface a first driving route for transporting a plurality of passengers assigned to the ridesharing vehicle. The first driving route may be determined such that at least some of the assigned plurality of passengers share their ride with at least one other passenger. The first driving route may be received from communications interface 360. Ridesharing management server 150 may determine a pick up location for the plurality of passengers based on location information received from the plurality of passengers. The first driving route may be optimized based on models for shortest distance, shortest distance time, a combination of distance and travel time optimization, and/or a fuel efficiency optimization. The first driving route may include one of more pick up locations for the plurality of passengers. The one or more pick up locations may correspond to one or more drop off location. The first driving route may be optimized to accommodate the pick up and drop off location based on a selected optimization model. Ridesharing management server 150 may also continually modify the first driving route based on additional passengers that may be assigned to the ridesharing vehicle to accommodate the additional passengers' drop of locations, consistent with the selected optimization model. In other embodiments, there may be no optimization model selected. Accordingly, first driving route may drop of passengers in the sequential order that they were picked up.

At step 1410, ridesharing management server 150 may receive from a power sensor in the ridesharing vehicle, the current charge level of the battery. The battery may be located within a vehicle body of the ridesharing vehicle and may be configured to provide a driving voltage to operate the ridesharing vehicle. Ridesharing management server 150 may be configured to continuously receive the current charge levels at a predetermined interval rate. For example, ridesharing management server 150 may be configured to receive from power sensor, a current charge level of the battery at a predetermined rate of every 5 mins, 10 mins, or 30 mins. In other embodiments, ridesharing management server 150 may be configured to continuously receive the current charge levels.

At step 1415, ridesharing management server 150 may transmit an indication of the current charge level of the battery to remote server via communications interface 360. Ridesharing management server 150 may be configured to transmit the current charge levels periodically upon receipt of charge levels of the battery from power sensor. Alternatively, ridesharing management server 150 may be configured to transmit current charge levels of the battery when the current charge level is less that a predetermined threshold. In some embodiments, the indicator may be a percentage. For example, rideshare management server 150, may be configured to transmit an indicator of the charge level of the battery, when the charge level is less than twenty percent (20%). In another embodiment, the indicator may be a "low battery" warning, and if the currently battery level is less than a threshold of 30% battery life, ridesharing management server 150 transmits a "low battery" indication to the remote server.

In other embodiments, the indicator transmitted to the remote server may be a time to depletion, and the time to depletion may indicate an estimation of how much longer the ridesharing vehicle may operate before the battery may requires recharging. In other embodiments, the indicator transmitted to the remote server may be a mileage to depletion, and the mileage to depletion may indicate an estimation of how much longer distance the ridesharing vehicle may operate before the battery requires recharging.

At step 1420, ridesharing management server 150 may, in response to transmission of the indicator at step 1430, receive via the communications interface 360 at least one second driving route that avoids pick up of additional ridesharing passengers until the ridesharing vehicle is empty of passengers. Ridesharing management server 150 may determine, based on the indicator, that the ridesharing vehicle requires battery recharging and thus cannot accommodate the assignment of any additional passengers to the ridesharing vehicle. For example, ridesharing vehicle may engage with a first passenger for drop off at a location that is 20 miles away from the current location of the ridesharing vehicle and a second at a drop off locations 5 miles from the drop off location of the first passenger. While traveling to the drop off location of the first passenger, ridesharing management server 150 may receive a currently charge level from the power sensor and transmit an indicator, based on the received current charge level, to the remote server. The indicator may comprise a "low battery" warning. Based on this information, ridesharing management server 150 may receive a second driving route that avoids pick up of additional ridesharing passenger until first and second passengers already engages with the ridesharing vehicle are dropped off at their respective destinations. Thus, ridesharing management server 150 effectively avoids assignment of additional passengers be providing for a second driving route upon transmission of the currently charge level of the battery to the remote server.

At step 1425, ridesharing management server 150 may direct the ridesharing vehicle to a charging station where the ridesharing vehicle is to be taken out of service for battery recharging.

Figure 14B:
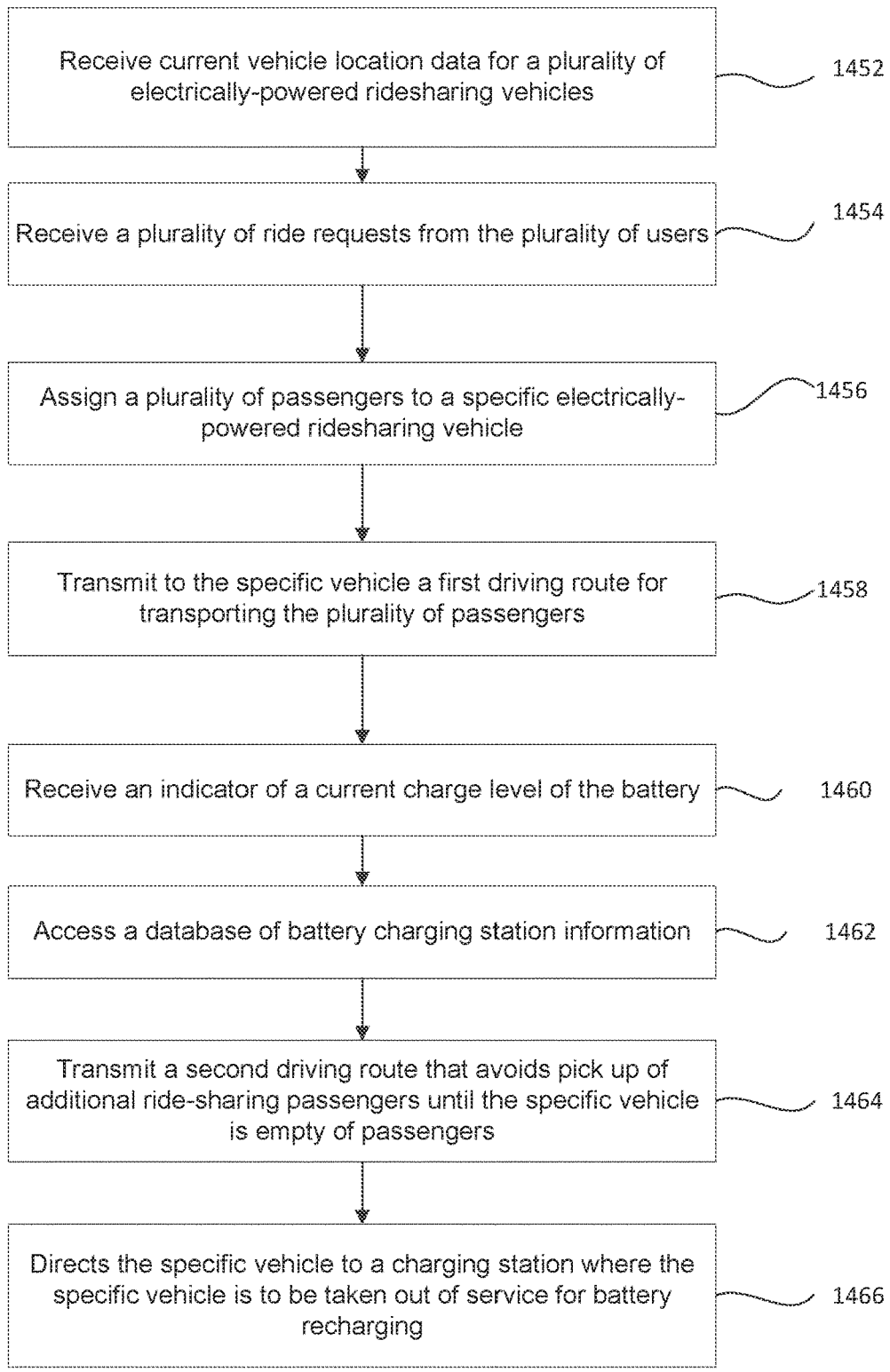
FIG. 14B is a flowchart showing an exemplary process for managing a fleet of ridesharing vehicles.

FIG. 14B illustrates a flowchart showing exemplary ridesharing algorithm 1450 for managing a fleet of ridesharing vehicles including electrically-powered ridesharing vehicles associated with vehicle management server 150, consistent with disclosed embodiments. In one embodiment, the steps of process 1450 may be performed by a ridesharing management server, such as ridesharing management server 150 described above with reference to FIGS. 1 and 3. Alternatively, at least some of the steps of process 1450 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and hat other components may be utilized to implement example methods disclosed herein.

At step 1452, ridesharing management server 150 may receive current vehicle location data for a plurality of electrically-powered ridesharing vehicles, and the current vehicle location data may include global positioning system (GPS) data generated by at least one GPS component associated with each electrically-powered ridesharing vehicle. Ridesharing management server 150 may receive the current vehicle location data from a communication interface 360 configured to receive ride requests from a plurality of users and to communicate with a plurality of electrically-powered vehicle. The GPS component may be integrated with each electrically powered vehicle during the manufacturing of the vehicle, or may be associated through a passenger or driver device of the vehicle. The device may be a wearable device or mobile device configured to transmit to ridesharing management system 250 current location data.

At step 1454, ridesharing management server 150 may receive a plurality of ride requests from the plurality of users, and each ride request may include pick-up and drop-off location information. The pick-up and drop-off location information may be transmitted as a street address, an intersection of two cross-streets, or a name of business or merchant associated with a specific location, or location coordinates. The location information may also be transmitted as a drop pin on a map displayed on a user device. The user device may be configured to process the drop pin location to a coordinate location, or other location information for readable by ridesharing management server 150.

At step 1456, ridesharing management server 150 may assign a plurality of passengers to a specific electrically-powered ridesharing vehicle. Ridesharing management server 150 may assign the plurality of passengers to specific electrically-powered vehicles based on a proximity of the specific vehicle, current number of passenger assigned to the specific vehicle, or a current route of the specific vehicle.

At step 1458, ridesharing management server 150 may transmit to the specific electrically-powered ridesharing vehicle a first driving route for transporting the plurality of passengers, and the driving route may be determined such that at least some of the assigned plurality of passengers share their ride with at least one other passenger. The shared portion of the ride may terminate when the passengers are dropped off at a common location, or when at least one of the other passengers is dropped off. The first driving route be configured to prioritize the drop offs in the order the passengers were picked up or determine the most efficient route based on drop off locations for each of the passengers.

At step 1460, ridesharing management server 150 may receive from the specific electrically-powered ridesharing vehicle an indicator of a current charge level of the battery. Ridesharing management server 150 may be configured to continuously receive the current charge levels at a predetermined interval rate. For example, ridesharing management server 150 may be configured to receive from power sensor, a current charge level of the battery at a predetermined periodic rate of every 5 mins, 10 mins, or 30 mins. In other embodiments, ridesharing management server 150 may be configured to continuously receive the current charge levels. Still in other embodiments, ridesharing management server 150 may be configured to continuously receive an indicator of a current charge level when the current charge level is less that a predetermined threshold.

At step 1462, ridesharing management server 150 may access a database of battery charging station information, including a plurality of battery charging station locations. The database of battery charging stations may receive data from a plurality of sources to determine a location of a charging station closest to a current location of the ridesharing vehicle, a location of the charging station closest to a last drop-off location of the first driving route, or a location of a charging station in the vicinity of an area with expected passenger demand. For example, in one embodiment, the second driving route may include directions to a farther charging station other than a charging station closest to a current location of the ridesharing vehicle, in order to account for expected passenger demand in the vicinity of the farther charging station.

At step 1464, ridesharing management server 150 may transmit over a wireless network to the specific electrically powered vehicle, at least one second driving route that avoids pick up of additional ride-sharing passengers until the vehicle is empty of passengers. Ridesharing management server 150 may determine, based on the indicator, that the ridesharing vehicle requires battery recharging and thus cannot accommodate the assignment of any additional passengers to the ridesharing vehicle. For example, ridesharing vehicle may engage with a first passenger for drop off at a location that is 20 miles away from the current location of the ridesharing vehicle and a second at a drop off locations 5 miles from the drop off location of the first passenger. While traveling to the drop off location of the first passenger, ridesharing management server 150 may receive a currently charge level from the power sensor and transmit an indicator, based on the received current charge level, to the remote server. The indicator may comprise a "low battery" warning. Based on this information, ridesharing management server 150 may receive a second driving route that avoids pick up of additional ridesharing passenger until first and second passengers already engages with the ridesharing vehicle are dropped off at their respective destinations. Thus, ridesharing management server 150 effectively avoids assignment of additional passengers be providing for a second driving route upon transmission of the currently charge level of the battery to the remote server.

At step 1466, ridesharing management server 150 may direct the ridesharing vehicle to a charging station where the ridesharing vehicle is to be taken out of service for battery recharging.

Passenger-Vehicle Assignment Based on Proximity to Charging Station

Embodiments of the present disclosure may allow for a vehicle management system to manage a fleet of vehicles for hire. The vehicle management system may receive a plurality of ride requests from a plurality of users and assign a specific user to a specific vehicle in the fleet of vehicles based the proximity of a user's drop-off location to a charging station. For example, the vehicle management system may determine that the specific vehicle should be recharged based on battery charge data of the vehicle. Based on this data, the system may assign a user to the specific vehicle after determining that the user has indicated a drop-off location in close proximity to a charging station. The vehicles comprising the fleet of vehicles for hire may include vehicles available for ridesharing and electrically-powered vehicles. The electrically-powered vehicles may be manually-driven and may include a handheld device associated with the driver of the vehicle and configured to receive routing instructions from the vehicle management system. The electrically-powered vehicle may also include an autonomous vehicle and may include a vehicle controller configured to receive routing instructions from the vehicle management system.

In some embodiments, the vehicle management system may receive a plurality of ride requests from a plurality of users, and each request may include information about a user's desired pick-up location and desired destination. The system may then assign a specific vehicle with a low current battery charge level to a specific user based on the proximity of the user's desired destination to the charging station. The vehicle management system may also operate as a ridesharing management system and coordinate requests from a plurality of users based on the battery charge level of the specific vehicle and determine a route for the specific vehicle. Once the vehicle is empty of passengers, the system may route the vehicle to a charging station for charging the battery. In some embodiments, memory 250 may comprise a non-transitory computer readable medium that configured to perform a method of managing a fleet of vehicles for hire.

Figure 15:
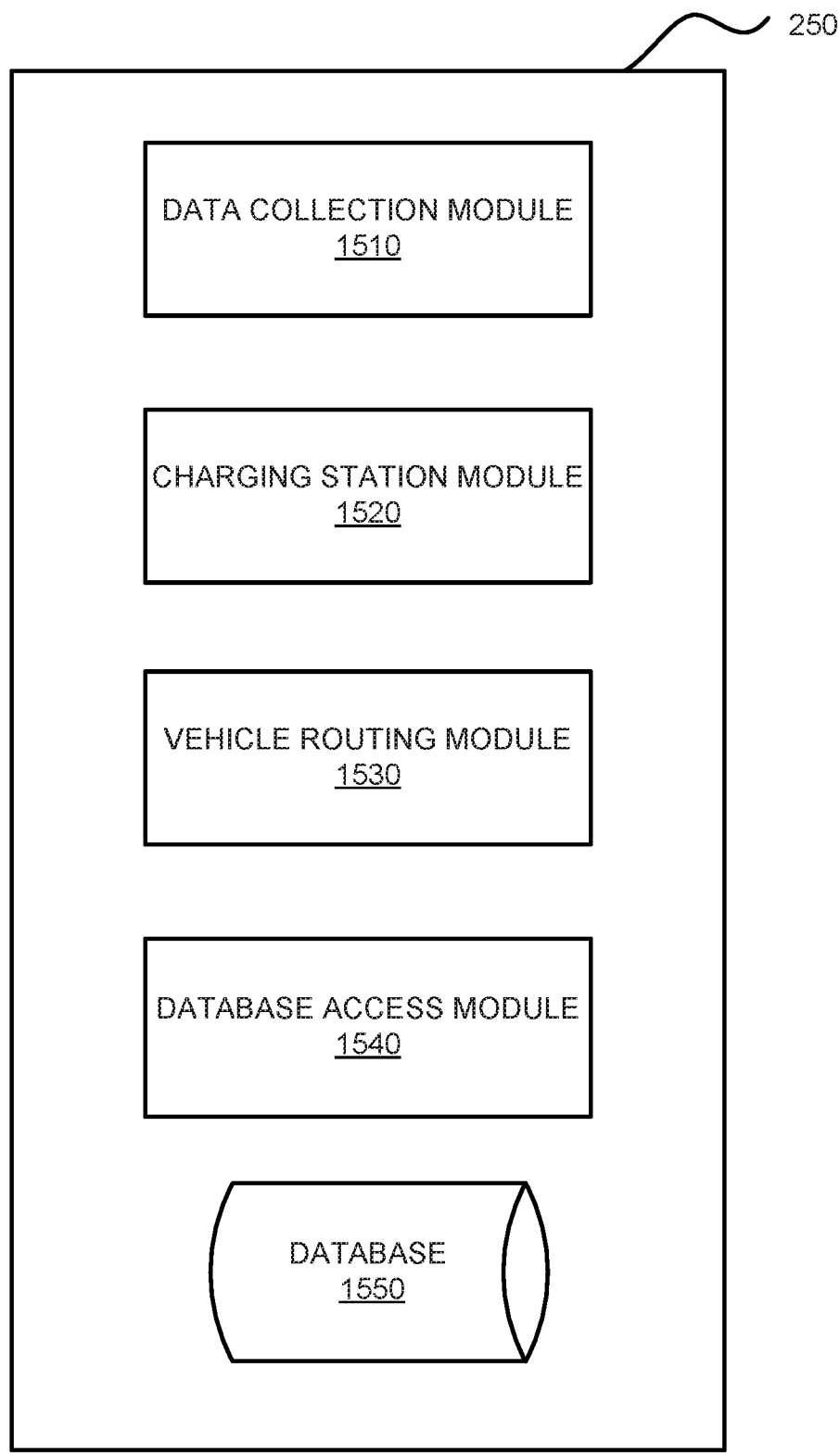
FIG. 15 is an exemplary embodiment of a memory containing software modules consistent with the present disclosure.

FIG. 15 depicts an embodiment of memory module 250 for managing a fleet of vehicles for hire consistent with the present disclosure. Memory 250 may store a plurality of modules, and may be executable by at least one processor to perform various methods and processes disclosed herein. Further, it should be noted that memory 250 may store more or fewer modules than those shown in FIG. 15, depending on implementation-specific considerations.

As illustrated in FIG. 15, memory 250 may store software instructions to execute a data collection module 1510, a charging station module 1520, a vehicle routing module 1530, a database access module 1540, and may include a database 1550. Data collection module 1510 may include software instruction for receiving input data (passenger ride request current location of ridesharing vehicle, battery charge level, etc.) from one or more sources. Charging station module 1520 may include software instruction to determine locations of charging stations in relation to a determined route or a drop-off location. Vehicle routing module 1530 may include software instruction for sending one or more vehicles to pick up user(s), directing vehicles along a determined route, and determining an alternative route based on information received from charging station module 1520. Database access module 1540 may include software instruction executable to interact with database 1550, to store and/or receive information (e.g., geographical maps associated with a geographical area in which a vehicle is operating, current traffic information of a geographical area, historical data for efficient routes, etc.).

Data collection module 1510 may include software instructions for receiving data related to a current charge level of a battery associated with a specific vehicle in the fleet of vehicle. The data may be related to the remaining charge of the battery powering the vehicle and/or an estimated time until depletion of the battery as captured by a power sensor in the vehicle for determining the current charge level of the battery. The power sensor may transmit the data to a remote server over a wireless channel or to vehicle routing module to determine whether a current route needs to be reconfigured, based on the current battery charge level. The power sensor may be configured to continuously monitor and transmit data related to the current battery charge level. The power sensor may also monitor the current battery charge level and transmit data when the charge level is less than a predetermined threshold level.

Data collection module 1510 may also include software instructions for receiving data related to factors affecting a vehicle battery life. The data may include information related to user operation of the specific vehicle, such as a driving style of the operator (i.e., sudden acceleration), ambient temperature, a history of overcharging, age of the battery, etc. After identifying that the specific electrically-powered vehicle-for-hire is in need of charge, at least one processor may be configured to estimate a driving duration and/or distance in which the specific electrically-powered vehicle-for-hire can operate before recharging, based on information received by data collection module 1510. For example, data collection module 1510 may estimate a driving duration and/or distance based on the current battery charge data and driving performances of a driver of the specific vehicle. The estimated driving duration may reflect a duration of time, a distance that the vehicle is able to operate before require recharging, or the battery becoming depleted. In one embodiment, at least one processor may be configured to determine, based on the estimated driving durations and/or distances, that the specific electrically-powered vehicle-for-hire has enough battery to reach the specific charging station after passing the drop-off location associated with the specific ride request. In other embodiments, after identifying that the specific electrically-powered vehicle-for-hire is in need of charge, the at least one processor may be configured to route the specific electrically-powered vehicle-for-hire via a longer driving route that is longer and includes less elevation changes than an alternative route.

Data collection module 1510 may also include software instruction related to managing a fleet of vehicles for hire. The data may be related to receiving ride requests from a plurality of users. For example, the data may include ride requests from a plurality of users requiring transport to a plurality of destinations. The ride requests may include information including a pick-up location, a desired destination, an identity of the user, a rating of the user, payment information associated with the user, a number or passengers traveling with the user, etc. Data collection module 1510 may manage the ride requests based on proximity to a current location of a specific vehicle in the fleet of vehicles. Data relating to the current location of the specific vehicle may be received, for example, from a mobile communication device (e.g., a smartphone, tablet, wearable device, etc.) associated (e.g. located in the passenger cabin) with the specific vehicle.

Charging station module 1520 may include software instruction for determining battery charging stations within a proximity of the specific vehicle. Charging station module 1520 may receive data from a plurality of sources to determine, based on the current location of the specific vehicle, locations of charging stations within a predetermined proximity to the location of the specific vehicle, or locations of the charging station closest to the desired destinations of each of the plurality of ride requests. Charging station module 1520 may also receive information related to a charging capacity of each of the plurality of charging stations to accept additional vehicles. Based on this information and information received from data collection module 1510, charging station module 1520 may assign a user associated with a ride request to a specific vehicle available for hire. Charging station module 1520 may also assign a user associated with a ride request to a specific vehicle for hire based on a proximity of a desired destination to a charging station and/or a capacity of that charging station to accept the specific vehicle for hire. Charging station module 1520 may also filter the charging stations available to the specific user based on an estimated driving duration and/or distance. Thus, charging station module 1520 may selectively exclude ride requests in a vicinity of a charging station beyond the estimated driving duration and/or distance of the specific vehicle. For example, charging station module 1520 may receive from data collection module 1510 that the estimated driving duration and/or distance of the specific vehicle limits the vehicle to a 10 mile radius of the current location of the specific vehicle. Based on this information, charging station module may limit the plurality of received ride requests to ride requests requiring a total driving distance of less than 10 miles.

Based on the information received from data collection module 1510 and locations of charging stations, charging station module 1520 may identify and assign a specific user associated with a ride request to the specific vehicle. The assignment of the specific user to the specific vehicle may be based on a proximity of a drop-off location to a charging station and a capacity of that charging station to accept the specific-for-hire. Charging station module 1520 may also be configured to determine, based on the estimated driving duration and/or distance, that the specific vehicle has enough battery charge to reach the specific charging station after passing the drop-off location associated with the specific ride request. Charging station module 1520 may also be configured to receive an indication when the specific vehicle has completed a charge, and to update the charging information to reflect available charging capacity of the charging station. Charging station module 1520 may also predict a charging capacity of each of the plurality of charging stations, and to assign the specific vehicle to a charging station without sufficient charging capacity, if, the charging capacity of the charging station is predicted to be sufficient when the specific vehicle is estimated to arrive. Alternatively, charging station module 1520 may also be configured to receive an indication that the specific charging station assigned to the specific vehicle has become unavailable, identify a substitute charging station that the specific vehicle can reach for recharging, and to reroute the specific vehicle to the substitute charging station.

Vehicle routing module 1530 may include software instruction for routing a specific vehicle assigned to a specific user to pick up and/or transport the user. For example, in response to a plurality of ride requests received by data collection module 1510 from the plurality of users, and based on the current charge level of the battery of a specific vehicle and locations of charging stations, charging station module 1520 may assign a specific user to a specific vehicle. Vehicle routing module 1530 may determine a route for the specific vehicle to pick up the specific user, route the user to the drop-off location, and route the specific vehicle to the charging station after the drop-off of the specific user has occurred. Further, the determined route may be dynamically adjusted during transportation of the specific users to optimize one or more performance variable. For example, in one embodiment, vehicle routing module 1530 may direct the specific vehicle along one or more routes based on the current charge level of the battery associated with the ridesharing vehicle and a location of a charging station for maximum efficient consumption of the remaining battery charge.

Vehicle routing module 1530 may also be configured to cause the specific electrically-powered vehicle-for-hire to continuously pick-up and drop-off passengers while there are other passengers in the specific electrically-powered vehicle-for-hire, determine when, based on a scheduled route associated with users assigned to the specific electrically-powered vehicle-for-hire, will the electrically-powered vehicle-for-hire require charging, and cease assignment of new users to the specific electrically-powered vehicle-for-hire in anticipation of an upcoming charge. Once vehicle routing module 1530 ceases assignment of new users, the specific vehicle may be routed to a charging station, as described above with respect to charging station module 1520. Vehicle routing module 1530 may also instruct the specific vehicle to pick up at least one additional passenger and to drop off the at least one additional passenger en route to the drop-off location associated with the specific ride request of a first user. Vehicle routing module 1530 may also determine a drop-off location for a user based on a location of the specific charging station and the desired destination of the specific ride request, and the determined drop-off location may be at a location other than but in proximity to the desired destination. In one embodiment, at least one processor may be configured to determine a drop-off location based on a location of the specific charging station and the desired destination of the specific ride request, wherein the determined drop-off location is at a location other than but in proximity to the desired destination. For example, in one embodiment, a ride request may include information that the desired destination is a building at the corner of an intersection of two cross streets. Vehicle routing module may determine that dropping the user off at the intersection would result in the vehicle entering a one-way street, impeding a more efficient route to a charging station. Thus, vehicle routing module 1530 may instead, for example, drop the user off at a location proximal to the desired destination, and avoid entering the one-way street.

Vehicle routing module 1530 may also be configured to identify identifying that the specific vehicle is requires charging and route the specific vehicle via a driving route that includes less elevation changes than an alternative driving route. Thus, vehicle routing module may determine the route based on one or more optimization factors, including elevation changes. Factors considered in other embodiments may include avoiding traffic stops, decreased traffic congestion, and fewer traffic lights. These factors may be determined based on the goal of maximizing the driving duration and/or distance of the specific vehicle.

As illustrated in FIG. 15, database 1550 may be configured to store any type of information to modules 1510-1540, depending on implementation specific considerations. For example, in embodiments in which vehicle routing module 1530 is configured to access one or more prior-stored maps of geographical areas for determining a route, database 1550 may store the geographical maps. In other embodiments where charging station module 1520 is configured to access one or more listings of charging stations, database 1550 may store hours of operation and charging capacity for each charging station and provide to charging station module 1520 and vehicle routing module 1530, a list of charging stations based on charging station available for operation at the estimated time of arrival of specific vehicle at the charging station. Still, in other embodiments, database 1550 may include information related to a charging capacity of each of the plurality of charging stations to accept additional vehicles, and for ride requests with pick-up location in a vicinity of the specific electrically powered vehicle-for-hire in need of the charge, at least one processor may be configured to assign the specific electrically-powered vehicle-for-hire to pick up a user based on a proximity of a drop-off location to a charging station and a capacity of that charging station to accept the specific electrically-powered vehicle for-hire. Data collection module 1510, charging station module 1520, and vehicle routing module 1530 may access database for communication by way of data access module 1540.

Modules 1510-1540 may be implemented in software, hardware, firmware, or any combination of software, hardware or firmware. For example, if the modules are implemented in software, they may be stored in memory 250. However, in some embodiments, any one or more of modules 1510-1540 and data associated with database 1550 may, for example, be stored in processor 204 and/or executed on a device associated with ridesharing management system 100. Modules 1510-1540 may be configured to interact with each other and/or other modules of memory 250 to perform functions consistent with disclosed embodiments.

Figure 16A:
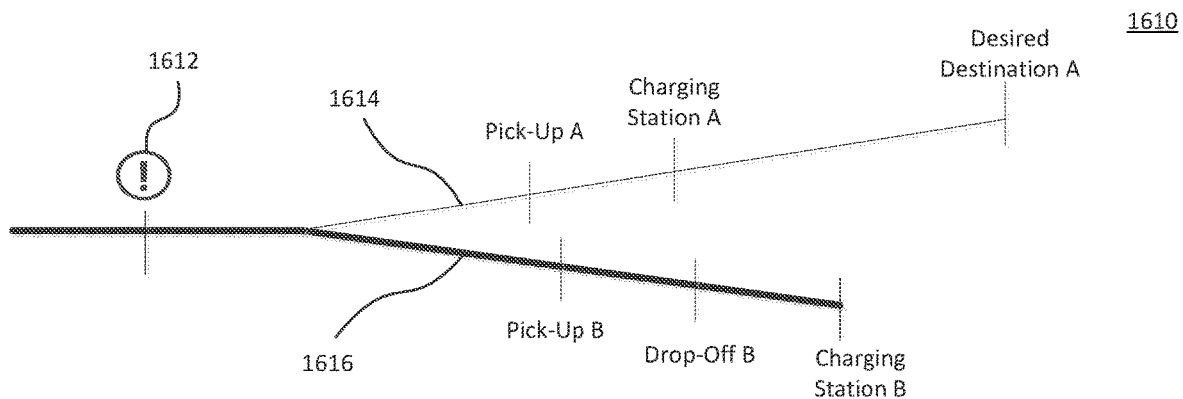
FIG. 16A is a schematic illustration of a first and second route in response to a location of a charging station, according to a first embodiment and consistent with the present disclosure.

FIG. 16A illustrates an embodiment of available travel route 1610 for a specific vehicle in a fleet of vehicles. The system for managing the fleet of vehicles may receive battery charge data indicative of a need for battery recharging 1612 from the specific vehicle. The system may also receive a plurality of ride requests from a plurality of user including a first route 1614 and a second route 1616. A first ride request may comprise first route 1614, and a desired destination A may be a determined distance from charging station A. A second ride request may comprise second route 1616, and a desired destination B may be a determined distance from charging station B. The system may determine that the total distance of the specific vehicle to charging station A on a first route 1614 (including a driving distance required to pick-up A, drop-off A and route to charging station A) is greater than a total distance to charging station B on a second route 1616 (including a driving distance required to pick-up B, drop-off B and route to charging station B). Based on this comparison, the system may assign the ride request from B comprising second route 1616 to the specific vehicle. The specific vehicle may receive a dispatch to the pick-up location of B, route the specific vehicle to the drop-off B location, and route the specific vehicle to charging station B.

Figure 16B:
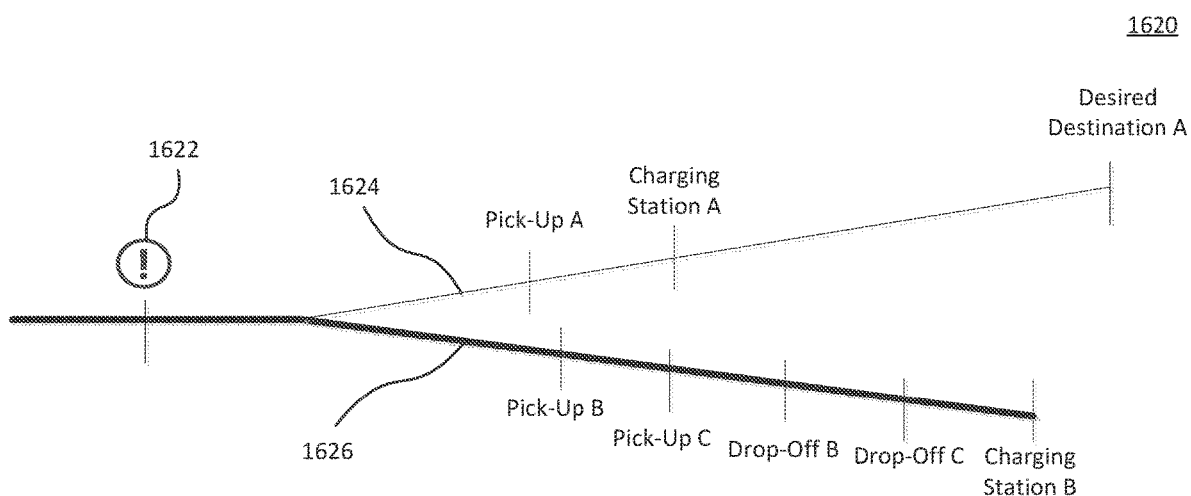
FIG. 16B is a schematic illustration of a first and second route in response to a plurality of ride requests and a location of a charging station, according to a second embodiment and consistent with the present disclosure.

FIG. 16B illustrates an embodiment of available travel route 1620 for a specific vehicle in a fleet of vehicles. The specific vehicle may be assigned to route 1626 associated with user B instead of route 1624 associated with user A. The assignment by the system for managing the fleet of vehicle may be based on a determination in accordance with the described embodiments. After being assigned to route 1626, the specific vehicle may receive a dispatch to the pick-up location of B, and route the specific vehicle to the drop-off B location. While en route to the drop-off location B, the system may receive a ride request from user C including a pick-up location and drop-off location. The system may assign the ride request of user C to the specific vehicle. The assignment may be based on factors including the pick-up location and drop-off location of user C being en route to the charging station. After the specific vehicle has dropped of the assigned users at their respective drop-off location, the system may route the specific vehicle to charging station B. The system may also be configured to cease further assignments of new user to the specific vehicle until the specific vehicle has been recharged.

Figure 16C:
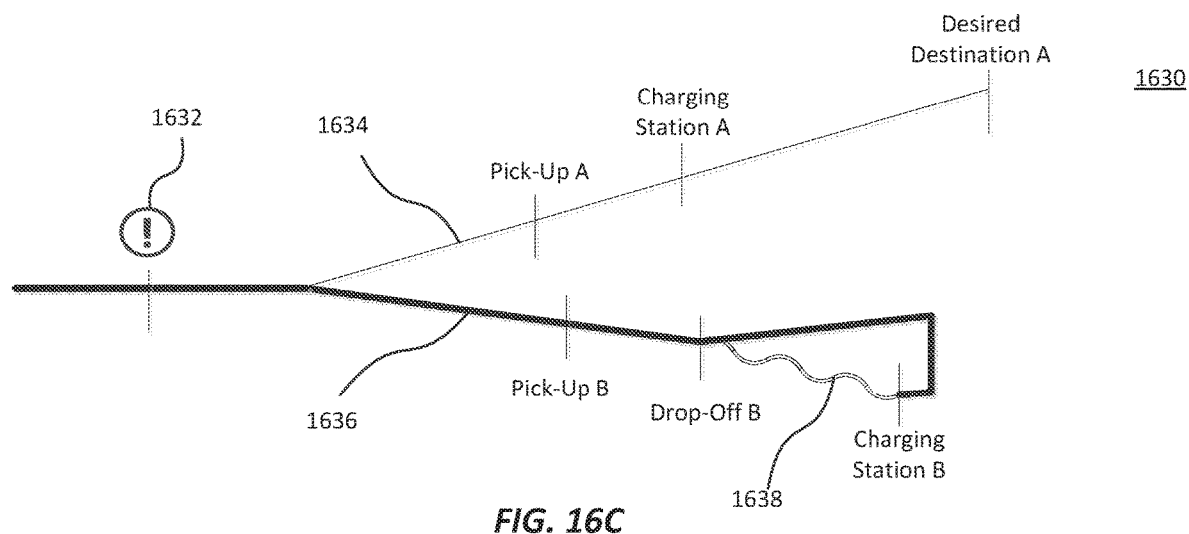
FIG. 16C is a schematic illustration of a first and second route in response to a plurality of ride requests and a location of a charging station, according to a third embodiment and consistent with the present disclosure.

FIG. 16C illustrates an embodiment of available travel route 1630 for a specific vehicle in a fleet of vehicles. The specific vehicle may be assigned to route 1636 associated with user B instead of route 1634 associated with user A. The assignment may be based on a determination by the system for managing the fleet of vehicle in accordance with the described embodiments. Route 1636 to charging station B may include a driving route that is longer than an alternative driving route. The system the route for specific vehicle according to a determination of a characteristic of the alternative route. For example, route 1636 may include fewer elevation changes than alternative route 1638.

Figure 16D:
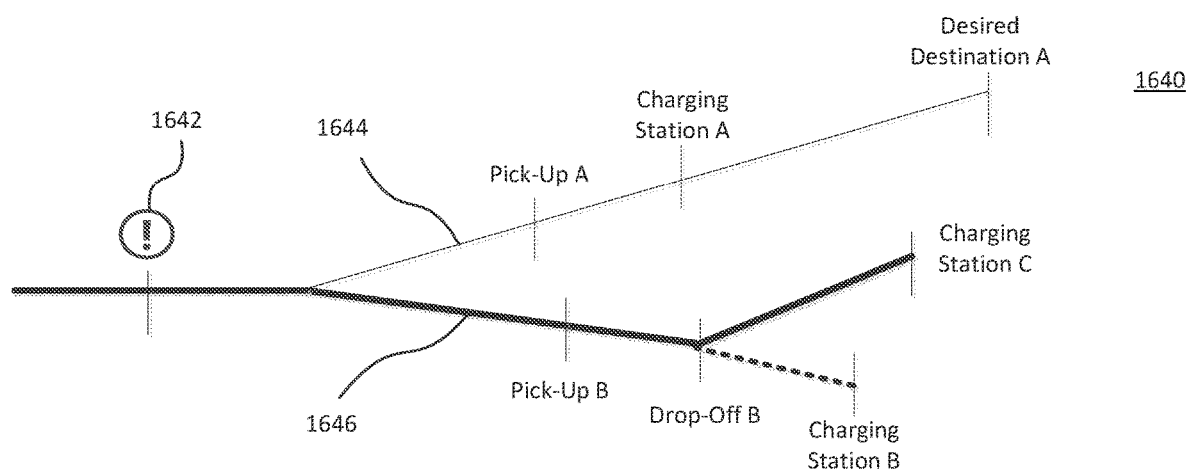
FIG. 16D is a schematic illustration of a first and second route in response to a plurality of ride requests and a location of a charging station, according to a fourth embodiment and consistent with the present disclosure.

FIG. 16D illustrates an embodiment of available travel route 1640 for a specific vehicle in a fleet of vehicles. The specific vehicle may be assigned to route 1646 associated with user B instead of route 1644 associated with user A. The assignment by the system for managing the fleet of vehicle may be based on a determination in accordance with the described embodiments. After being assigned to route 1646, the specific vehicle may receive a dispatch to the pick-up location of B, and route the specific vehicle to the drop-off B location. While en route to the drop-off location B, the system may receive an indication that charging station B has become unavailable. The system may then identify substitute charging station C that is available. The system may then provide instructions to the specific vehicle for routing to charging station C.

Figure 17:
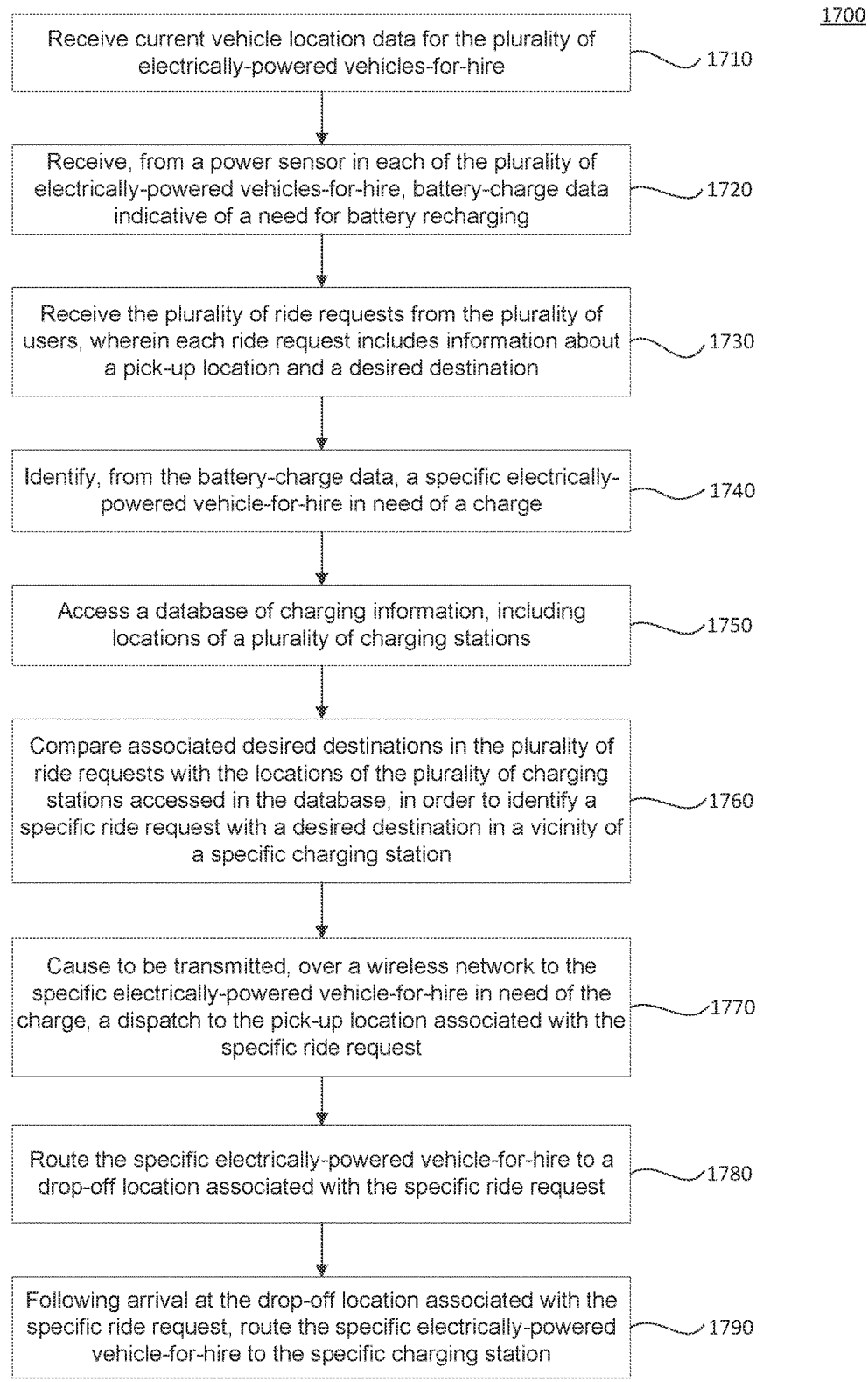
FIG. 17 is a flowchart showing an exemplary process for managing a fleet of vehicles for hire.

FIG. 17 illustrates a flowchart showing exemplary process 1700 for managing a fleet of vehicles-for-hire including electrically-powered vehicles-for-hire associated with a vehicle management server, consistent with disclosed embodiments. In one embodiment, the steps of process 1700 may be performed by a vehicle management server, such as ridesharing management server 150 described above with reference to FIGS. 1 and 3. Alternatively, at least some of the steps of process 1700 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be utilized to implement example methods disclosed herein.

At step 1710, data collection module 1510 may receive current vehicle location data for the plurality of electrically-powered vehicles-for-hire. For example, ridesharing management server 150 may receive and input regarding the current location of each of the plurality of electrically-powered vehicles-for-hire. Current vehicle location data may be transmitted from each of the electrically-powered vehicle-for-hire periodically (i.e. every 30 minutes, every 10 minutes, every 5 minutes), or may transmit the data based on a distance traveled (i.e. every 5 feet of departure from a previously transmitted location). The current vehicle location data may include includes global positioning system (GPS) data generated by at least one GPS component associated with each electrically-powered vehicle-for-hire. The current location of a ridesharing vehicle may also be received, for example, from a mobile communications device (e.g., a smartphone, tablet, etc.) associated with (e.g., located in the passenger cabin) the ridesharing vehicle.

At step 1720, data collection module 1510 may receive, from a power sensor in each of the plurality of electrically-powered vehicles-for-hire, battery-charge data indicative of a need for battery recharging. The battery charge data may be received when the current charge level is less that a predetermined threshold. In some embodiments, the indicator may be a percentage. For example, rideshare management server 150, may be configured to transmit an indicator of the charge level of the battery, when the charge level is less than twenty percent (20%). In another embodiment, the indicator may be a "low battery" warning, and if the currently battery level is less than a threshold of 30% battery life, ridesharing management server 150 transmits a "low battery" indication to the remote server. The indicator may represent the state of charge of a fuel gauge of the battery and may quantify a reduction from a full charge capacity of the battery.

At step 1730, data collection module 1510 may receive a plurality of ride requests from a plurality of users, and each ride request may include information about a pick-up location and a desired destination. The plurality of ride requests may be received by a communications interface configured to receive a plurality of ride requests from a plurality of users and to communicate with the plurality of electrically-powered vehicles-for-hire. The ride requests may also include information such as an identity of the user, a rating of the user, etc. Data collection module 1510 may also receive information related to the number of passengers in the ridesharing vehicle, wherein a first driving route includes a plurality of pick-up locations associated with the plurality of passengers, and at least one processor may be configured to transmit to the remote server and indication of a number of people that entered the ridesharing vehicle at each pick-up location.

At step 1740, charging station module 1520 may identify, from the battery-charge data received at step 1720, a specific electrically-powered vehicle-for-hire in need of a charge. Charging station module 1520 may identify that the specific electrically-powered vehicle-for-hire requires recharging based on an indication that the charge level is below a predetermined threshold.

At step 1750, charging station module 1520 may be configured to access database 1550 for charging information, including locations of a plurality of charging stations. Database access module 1540 may identify a subset of the plurality of charging stations within a predetermined distance of the current vehicle location of the specific electrically-powered vehicle-for-hire.

At step 1760, vehicle routing module 1530 may be configured to compare associated desired destinations in the plurality of ride requests in the vicinity of the specific electrically-powered vehicle-for-hire in need of the charge with the locations of the plurality of charging stations accessed in the database, in order to identify a specific ride request with a desired destination in a vicinity of a specific charging station. For example, in one embodiment, vehicle routing module 1530 may receive a ride request with a pick-up location in close proximity to the specific electrically-powered vehicle-for-hire. The ride request may also include information indicating that the desired destination associated with the ride request is in close proximity to a specific charging station near electrically-powered vehicle-for-hire.

At step 1770, vehicle routing module 1530 may cause to be transmitted, over a wireless network to the specific electrically-powered vehicle-for-hire in need of the charge, a dispatch to the pick-up location associated with the specific ride request. The dispatch may include information including routing information to direct the specific electrically-powered vehicle-for-hire to the pick-up location.

At step 1780, vehicle routing module 1530 may route the specific electrically-powered vehicle-for-hire to a drop-off location associated with the specific ride request. The route may be consistent with one or more parameters determined by vehicle routing module 1530. As described above, the route may be generated to include fewer elevation changes than an alternative route, or other road conditions that may affect the battery charge level.

At step 1790, vehicle routing module 1530 may, following arrival at the drop-off location associated with the specific ride request, route the specific electrically-powered vehicle-for-hire to the specific charging station. Vehicle routing module 1530 may also provide an indication to ridesharing management server 1250 to cease assignment of new users to the specific electrically-powered vehicle-for-hire until recharging is completed at the specific charging station.

Providing Different Levels of Service for Ridesharing

Embodiments of the present disclosure may allow a vehicle management system to enable varied ridesharing services. The vehicle management system may provide granularity to permit users to tailor details of the ridesharing experience. For example, in one embodiment, a computer program embodied in a non-transitory computer-readable medium and executable by at least one processor may include instructions for causing the processor to execute a method. The method may include receiving a shared-ride request from a user, the request including an indication of a starting point and a desired location. The computer program may also be configured execute a method to visually display to the user at least one option for customizing the shared ride request with at least one restriction. The method may also include receiving from the user, at least one restriction on the shared-ride request and provide to the user based on the received shared-ride request, at least one offer that accounts for the at least one restriction.

In some embodiments, a system for enabling varied ridesharing services may include a communication interface for receiving shared-ride requests from prospective passengers and for transmitting information to the prospective passengers. The system may also include at least one processor configured to receive a shared-ride request from a user, the shared-ride request including an indication of a starting point and a desired destination. The processor may also receive at least one restriction associated with the user and current vehicle location data generate by at least one GPS component associated with each ridesharing vehicle. The system may also identify at least one candidate ridesharing vehicle to pick up the user and provide to the user, multiple offers associated with the at least one candidate ridesharing vehicle. The system may receive a selection of an offer and direct a ridesharing vehicle associated with the selected offer to pick up the user.

Figure 18:
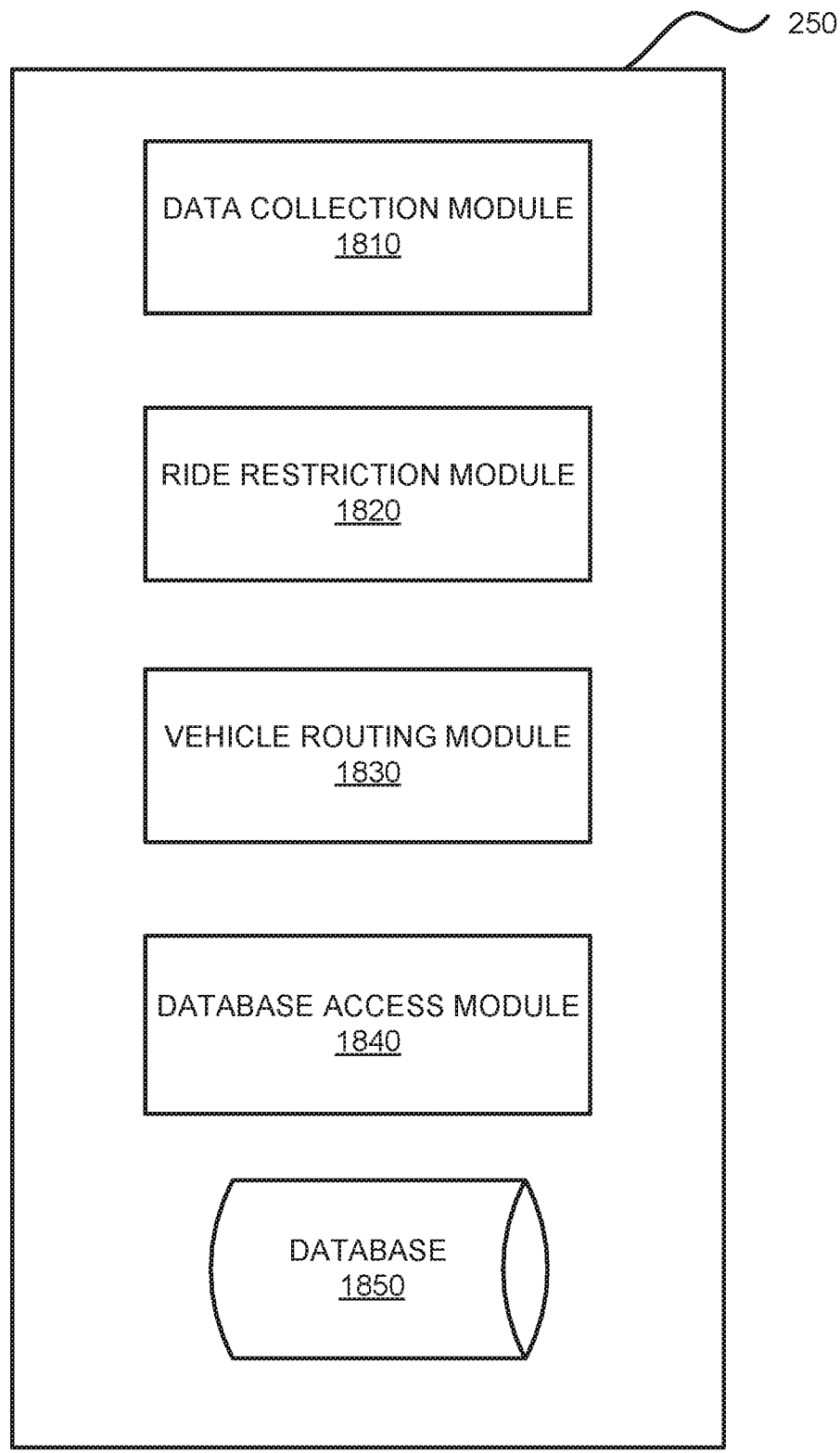
FIG. 18 is a diagram illustrating the components of an example ridesharing management server for providing different levels of, in accordance with some embodiments of the present disclosure.

FIG. 18 depicts an embodiment of memory module 250 for enabling varied ridesharing services consistent with the present disclosure. Memory 250 may store a plurality of modules, and may be executable by at least one processor to perform various methods and processes disclosed herein. Further, it should be noted that memory 250 may store more or fewer modules than those shown in FIG. 18, depending on implementation-specific considerations.

As illustrated in FIG. 18, memory 250 may store software instructions to execute a data collection module 1810, a ride restriction module 1820, a vehicle routing module 1830, a database access module 1840, and may include a database 1850. Data collection module 1810 may include software instruction for receiving input data (e.g., passenger ride requests, current location of ridesharing vehicle, etc.) from one or more sources. Ride restriction module 1820 may include software instructions to receive a ride restriction associated with the user and provide an offer that accounts for the ride restriction. Vehicle routing module 1830 may include software instructions for sending one or more vehicles to pick up the user and directing vehicles along a determined route, in accordance with the ride restriction received from ride restriction module 1820. Database access module 1840 may include software instruction executable to interact with database 1850, to store and/or receive information (e.g. geographical maps associated with a geographical area in which a vehicle is operating, current traffic information of a geographical area, historical data for efficient routes, etc.).

Data collection module 1810 may include software instructions for receiving data related to a shared-ride request from a user. The data may include an indication of a starting point and a desired destination received from the user requesting the shared ride. The starting point information may include an indication of a starting point generated by at least one global positioning system (GPS) component included in a mobile device associated with the user. For example, the GPS may be included in a mobile device or wearable device associated with the user. Starting point information may also be inputted by the user to designate a starting location different from the present location data generated by the GPS. Data collection module 1810 may also communicate with database 1850 via database access module 1840 to determine frequently used starting point and desired destination data associated with the user. For example, in one embodiment, data collection module 1810 may access database 1850 to determine a "home" location which the user has frequently used as a starting point and suggest this starting point to the user. In other embodiment, data collection module may use information generated by the GPS with stored location data to suggest a starting point. For example, data collection module 1810 may determine that the received GPS data is not within a predetermined distance to the "home" location. Data collection module 1810 may determine other starting point locations used by the user and stored in database 1850 within a predetermined distance of the present location of the user to suggest a starting point location. The desired destination may also be suggested in a similar manner as the starting point locations.

Data collection module 1810 may also receive information related to a fleet of ridesharing vehicles. The received information may include current vehicle location data generated by a GPS component associated with each vehicle in the fleet of ridesharing vehicles. The information may also include data regarding a current ride status for each vehicle of the fleet of ridesharing vehicles. For example, in one embodiment, data collection module 1810 may receive data relating to how many passengers are currently assigned to a particular vehicle or a vehicle route assigned to the vehicle based on the desired destination of each passenger assigned to the particular vehicle.

Ride restriction module 1820 may include software instructions for receiving at least one ride restriction. The at least one restriction may be received from the user with the ride request. The ride restriction may include one or more of limiting a walking distance to a pick-up location, limiting a walking distance from a drop-off location to the desired destination, limiting a number of riders in a ridesharing vehicle with the user, limiting an estimated delay to a ride of the user, limiting a number of pick-ups while the user is in the ridesharing vehicle, limiting a number of drop-offs while the user is in the ridesharing vehicle, and toll road avoidance. The ride restriction may be based on a user selection of a category of restriction and/or a qualifying parameter by which to restrict the ride. For example, in one embodiment, the received at least one restriction may include limiting, to a distance between 50 to 500 meters, the walking distance to the pick-up location. The user may select this category of restriction and further limit the restriction by limiting the walking distance to 50 meters. In other embodiments, the walking distance may be limited by 100 meters or other distances (e.g., 200 meters, 250 meters, 500 meters, etc.) based on input by a user indicating a maximum walking distance from a present location of the user to the pick-up location.

In other embodiments, the restriction may include limiting a walking distance from the drop off location to the desired destination. In one embodiment, the user may limit the walking distance from the drop off location to the desired destination to a distance of 25 meters or other distances (e.g., 40 meters, 50 meters, 70 meters, 100 meters, etc.). The walking distance limit may indicate the maximum distance a user's drop off location may deviate from the desired destination. The user may select this category of restriction alone or in conjunction with one or more other ride restrictions. For example, in one embodiment, the received at least one restriction may include limiting, to a distance between 25 to 70 meters, the walking distance from the drop-off location to the desired destination. In one embodiment, the received restriction may limit the walking distance to the pick-up location to 100 meters and limit the walking distance from the drop off location to the desired destination to 50 meters.

In other embodiments, the ride restriction may include limiting the estimated time of arrival to the user's pick-up location. This may be based information related to the current location of each vehicle in the fleet of vehicles and the distance to the user's pick-up location and/or traffic conditions. The received at least one restriction may include limiting the estimated delay to the user's ride. Ride restriction module 1820 may be configured to estimate the delay to the user's ride based on one or more characteristics of a vehicle in the fleet of ridesharing vehicle. For example, in one embodiment, a received at least one restriction may include limiting the estimated delay to the user's ride to less than 10 minutes or other time periods (e.g., 15 minutes, 20 minutes, etc.). Ride restriction module 1820 may determine an estimated delay of a specific vehicle in the fleet of ridesharing vehicles based on the number of other riders entering or departing the specific vehicle and/or detour to pick-up and drop-off said other riders. Based on this information, ride restriction module 1820 may determine whether the estimated time of delay is within the restriction selected by the user.

Ride restriction module 1820 may also receive a ride restriction limiting the number of riders in the ridesharing vehicle. The user may indicate a restriction less than the predetermined maximum capacity of the ridesharing vehicle. For example, in one embodiment, the received at least one restriction may include limiting the number of riders in the ridesharing vehicle to less than five ridesharing riders. In other embodiments, at least one restriction may restrict the maximum number of riders to less than one other ride or to less than other numbers of riders (e.g., less than two, three, four, five, etc.). In other embodiment, the user may restrict the number of pick-ups and/or drop-off while the user is in the ridesharing vehicle. For example, in one embodiment, at least one restriction may include limiting the number of pick-ups while the user is in the ridesharing vehicle to less than three pick-ups. In other embodiments, at least one restriction may include limiting the number of drop-offs while the user is in the ridesharing vehicle to less than three drop-offs. In other embodiments, at least one restriction may include limiting the ridesharing vehicle to a maximum of two pick-ups and one drop-off while the user is in the ridesharing vehicle. In other embodiments, ride restriction module 1820 may receive a combination of one or more categories of ride restrictions. For example, ride restriction module 1820 may receive ride restrictions from the user limiting the ridesharing vehicle to the maximum riders and further limit the number of drop-offs while the user is in the ridesharing vehicle to one drop-off. Ride restriction module 1820 may also be configured be configured to determine how many riders enter or depart from the vehicle at each pick-up and/or drop-off based on data received from each ride request associated with each ride.

In other embodiments, ride restriction module 1820 may be configured to receive a restriction related to an avoidance of toll roads. In some embodiments, ride restriction module 1820 may receive a restriction from the user to avoid all routes including a toll road. In other embodiments, ride restriction module 1820 may receive instructions including toll road avoidance based on an estimated time saved. The user may further limit the restriction to include a minimum time saved. For example, ride restriction module 1820 may receive at least one restriction that includes toll road avoidance when the estimated time saved by using toll roads is less than 5 minutes or other time periods (e.g., less than 10 minutes, less than 15 minutes, etc.).

Ride restriction module 1820 may also include software instructions for customizing a ride offer based on the shared-ride request to include the at least one restriction. For example, in one embodiment, ride restriction module 1820 may provide to the user based on the received shared-ride request, at least one offer that accounts for the at least one restriction. Characteristics of the offer may be displayed to the use. The characteristics may include the pick-up location, the drop-off location, the ride restriction, and an estimated for engaging with the shared-ride. In other embodiments, multiple offers may be provided to the user, and the multiple offers may differ by at least one of a cost, pick-up location, a pick-up time, and a type of service. For example, a first offer presented to the user may include a pick-up location within ten meters of a present location of the user, an estimated pick up time of three minutes from the time that the request was sent by the user for an estimated cost of thirty dollars. A second offer presented to the user may include a proposed pick up location that deviates from the requested pick up location by twenty-five meters, an estimated pick up time of ten minutes from the time that the request was sent by the user for an estimated cost of fifteen dollars. Thus, a user may be able to compare the multiple offers provided based on type of service offered. In some embodiments, the multiple offers may be visually displayed on a map based on multiple proposed pick up locations associated with the multiple offers. For example, in one embodiment the at least one offer may include multiple offers that differ by cost and pick-up location, and multiple proposed pick-up locations associated with the multiple offers may be visually displayed on a map. Ride restriction module 1620 may also visually display a map of the multiple proposed drop-off locations associated with the multiple offers. For example, in one embodiment, drop-off location other than the desired destination may be visually displayed on a map. One or more of the proposed drop off locations may vary from the desired destination indicated by the user in the ride request. The proposed pick-up and proposed drop-off locations may be within a predetermined walking distance selected by the user according to the ride restriction. Ride restriction module 1820 may be further configured to provide walking directions from the present location to the pick-up and/or from the drop-off location to the desired destination.

Ride restriction module 1820 may also be configured to store, in an account associated with the user, a series of preselected restrictions, and a subsequent offer displayed to the user may include the series of preselected restrictions. In other embodiments, a user may indicate in the account to apply the series of preselected restrictions for each subsequent ride request sent. Ride restriction module 1820 may also be configured to store more than one series of preselected conditions. Thus, a user may have varied restrictions based on at least a plurality of factors including: time-efficiency, cost efficiency, a time a day that the request is made, or a day of the week the request is made. In other embodiments, a series of preselected conditions may be associated with a stored pick-up location or a stored desired destination. Still, in other embodiments, the subsequent offer may include the preselected restriction presented with an alternative offer that omits at least one preselected restriction.

As illustrated in FIG. 18, database 1850 may be configured to store any type of information to modules 1810-1840, depending on implementation specific considerations. For example, in embodiments in which vehicle routing module 1830 is configured to access one or more prior-stored maps of geographical areas for determining a route, database 1850 may be accessed to retrieve stored geographical maps. In other embodiments where ride restriction module 1820 may be configured to access one or more restrictions associated with a user and stored in database 1850. Data collection module 1810, ride restriction module 1820, and vehicle routing module 1830 may access database for communication by way of data access module 1840.

Modules 1810-1840 may be implemented in software, hardware, firmware, or any combination of software, hardware or firmware. For example, if the modules are implemented in software, they may be stored in memory 250. However, in some embodiments, any one or more of modules 1810-1840 associated with database 1850 may, for example, be stored in processor 204 and/or executed on a device associated with ridesharing management system 100. Modules 1810-1840 may be configured to interact with each other and/or other modules of memory 250 to perform functions consistent with disclosed embodiments.

Ride restriction module 1820 may also be configured to receive information from a plurality of sources for customizing a ride offer to provide to the user. In one embodiment, ride restriction module 1820 may receive data from a weather application on a mobile device associated with the user that there is a high likelihood of precipitation. Based on this information, ride restriction module 1820 may provide a ride offer that includes a restriction minimizing the deviation of the present location of the user from a pick-up location. In other embodiments, ride restriction module may receive data related to road closures for a special event. Thus, ride restriction module 1820 may provide an offer involving a toll road to the user, despite a user ride restriction to avoid toll roads.

Vehicle routing module 1830 may also include software instructions for routing a specific vehicle in the fleet of vehicles according to the ride request containing at least one ride restriction received from the user. In one embodiment, at least one processor may be configured to access the memory to identify at least one candidate ridesharing vehicle to pick up the user. In other embodiments, the at least one processor may be further configured to identify a single candidate ridesharing vehicle based on the current vehicle location data, the shared ride request, and the at least one restriction. For example, ridesharing module 1830 may determine that an array of vehicles within a predetermined distance of a pick-up location of the user is potential candidates for picking up the user. In other embodiments, the array of potential candidates may be based on other factors, including: an ability to comply with the ride restriction received from the user, current vehicle location data, real-time traffic data, a number of passengers in each vehicle, a current route, future passenger assignments, and vehicle battery charge data. For example, in one embodiment, a user may indicate a ride restriction limiting the number of passengers in the vehicle to a maximum of three other passengers. Vehicle routing module 1830 may determine that one or more vehicles in the fleet of ridesharing vehicles fails to comply with the restriction indicated by the user because the number of passengers exceeds three passengers. Thus, vehicle routing module 1830 may determine that these vehicles are not candidates for picking up the user and avoid providing an offer to the user based on these vehicles. In other embodiments, vehicle routing module 1830 may identify a plurality of offers available to the user wherein a first offer satisfies all of the ride restriction indicated by the user and a second offer satisfies some, but not all, of the ride restriction indicated by the user.

Figure 19A:
FIG. 19A is a schematic illustration of a user interface for receiving a shared-ride request including at least one ride restriction, according to one embodiment and consistent with the present disclosure.

FIG. 19A illustrates one embodiment of a user interface 1900 of a computer program product for receiving a shared ride request from a user. The request may include at least one ride restriction. In one embodiment, the user interface includes a plurality of fields for receiving a starting point location 1910, a desired destination 1920 and receiving a user selection of a category of ride restrictions and a limitation associated with the selected category 1920. A user may select to restrict the shared-ride request by one or more restrictions including the number of riders and avoiding tolls.

Figure 19B:
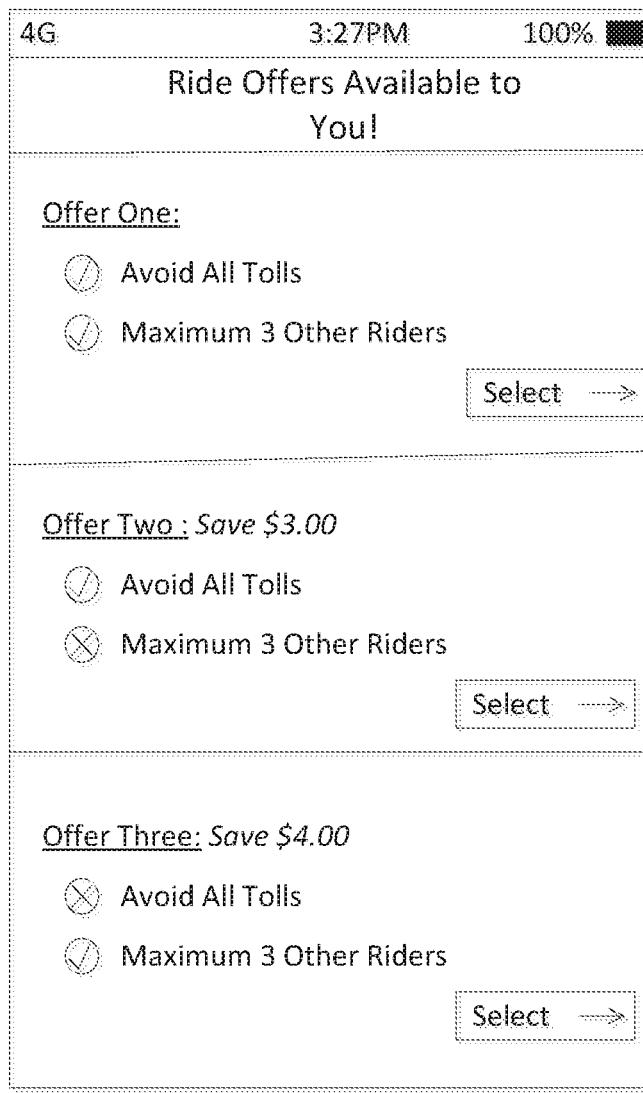
FIG. 19B is a schematic illustration of a display for providing offers of different levels of service according to one embodiment and consistent with the present disclosure.

FIG. 19B illustrates and example user interface 1950 for providing multiple ride offers to the user. The ride offers may include at least one of the ride restrictions received from the user. Offer one 1960 may include all of the restrictions received from the user and may include an option for the user to accept the offer. Offer two 1970 and offer three 1980 may differ from offer one 1960 by providing a different level of service. For example, offer two 1970 may include a first restriction (avoid all tolls) received from the user by not a second restriction (maximum limit of three other riders). Offer three 1980 may differ from offer two 1970 and offer one 1960 by including a second restriction (maximum limit of three other rider) received from the user but not a first restriction (avoid all tolls). Offer two 1960 and offer three 1980 may also include options for the user to accept the offers based on a level of service. In one embodiment, the offers may correspond to multiple candidate rideshare vehicles in the fleet of ridesharing vehicles. In other embodiment, the offers may correspond to varied level of service for a single candidate rideshare vehicle.

Returning to FIG. 18, vehicle routing module 1830 may thereafter determine a route for one or more of the candidate vehicles and provide multiple offers to the user, wherein the multiple offers differ by a type of service. In one embodiment, the multiple offers may be associated with a single candidate ridesharing vehicle and wherein the multiple offers differ by a type of service. For example, a first offer may include a first category of service. The first category of service may be associated with a regular level of service. A second offer may include a second category of service. The second category of service may be associated with an express service, wherein the estimated arrival time is shorter that the estimated arrival time of the regular service level. In another embodiment, the multiple offers may be associated with a plurality of candidate ridesharing vehicle. For example, at least one processor may be configured to identify a plurality of candidate ridesharing vehicle based on current vehicle location data, the shared-ride request, and the at least one restriction. The multiple offers may be associated with the plurality of candidate ridesharing vehicles and may differ by at least one of a cost, pick up location, pick up time, and a type of service. Vehicle routing module 1830 may receive a selection of an offer and direct the ridesharing vehicle associated with the selected offer to pick up the user.

FIG. 20A illustrates an exemplary process 2000 for enabling varied ridesharing services, consistent with disclosed embodiments. In one embodiment, the steps of process 2000 may be performed by a vehicle management server, such as ridesharing management server 150 described above with references to FIGS. 1 and 3. In the following description, reference is made to certain components of FIG. 1-3 for purposes of illustration. It will be appreciated however, that other implementations are possible and other components may be utilized to implement example methods disclosed herein.

At step 2010, data collection module 1810 may receive a shared-ride request from a user. The shared-ride request may include an indication of a starting point and a desired destination. The shared ride request may be received from a mobile communications device associated with a user.

At step 2020, ride restriction module may visually display to the user, at least one option for customizing the shared-ride request with at least one restriction. As described above, the at least one ride restriction may relate to limiting a walking distance to a pick-up location, limiting a walking distance from a drop-off location to the desired destination, limiting a number of riders in a ridesharing vehicle with the user, limiting an estimated delay to a ride of the user, limiting a number of pick-ups while the user is in the ridesharing vehicle, limiting a number of drop-offs while the user is in the ridesharing vehicle, and toll road avoidance.

At step 2030, ride restriction module 1820 may receive from the user at least one restriction on the shared ride request. The user may select one or more categories of restrictions and may further limit the restriction. For example, as described above, a user may select a ride restriction to limit the walking distance to a pick-up location and indicate that the walking distance is limited to ten meters.

At step 2040, vehicle routing module 1830 may provide to the user, based on the received shared-ride request, at least one offer that accounts for the at least one restriction. The at least one offer may include details regarding a vehicle route based on a candidate ridesharing vehicle for picking up the user. The offer may be based on at least one of a ride restriction indicated by the user, current vehicle location data, real-time traffic data, a number of passengers in each vehicle, a current route, future passenger assignments, vehicle battery charge data, and a type of service. Vehicle routing module 1830 may also provide multiple offers to the user for a plurality of candidate ridesharing vehicles. The multiple offers may differ based on at least one of a ride restriction indicated by the user, current vehicle location data, the shared-ride request, real-time traffic data, a number of passengers in each vehicle, a current route, future passenger assignments, vehicle battery charge data, and a type of service.

Figure 20B:
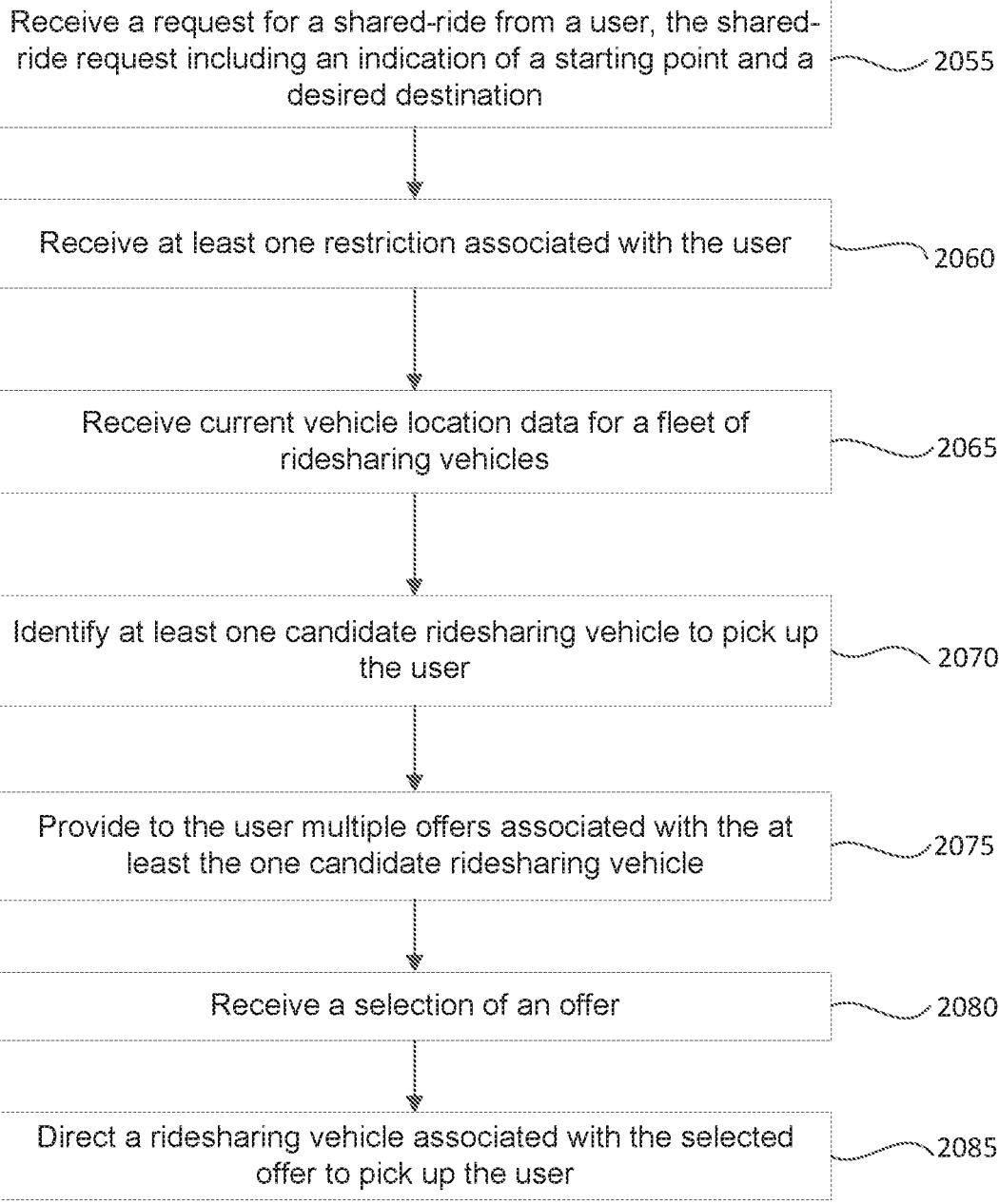
FIG. 20B is a flowchart showing an exemplary process for providing different levels of service for ridesharing, according to a second embodiment and consistent with the present disclosure.

FIG. 20B illustrates an exemplary process 2050 for enabling varied ridesharing services, consistent with disclosed embodiments. In one embodiment, the steps of process 2050 may be performed by a vehicle management server, such as ridesharing management server 150 described above with references to FIGS. 1 and 3. In the following description, reference is made to certain components of FIG. 1-3 for purposes of illustration. It will be appreciated however, that other implementations are possible and other components may be utilized to implement example methods disclosed herein.

At step 2055, data collection module 1810 may receive a request for a shared ride. The shared ride request may include an indication of a starting point and a desired destination.

At step 2060, data collection module 1810 may receive at least one restriction associated with the user. For example, in one embodiment, the user may select one or more categories of restrictions and may further limit the restriction. For example, as described above, a user may select a restriction to avoid toll roads and further indicate that restriction will be waived if the time saved by using the toll roads saves at least ten minutes.

At step 2065, vehicle routing module 1830 may receive current vehicle location data for a fleet of ridesharing vehicles.

At step 2070, vehicle routing module 1830 may use the current vehicle location data to identify at least one candidate ridesharing vehicle to pick up the user. The at least one candidate ridesharing vehicle may be identified based on an ability to comply with the ride restriction received from the user.

At step 2075, vehicle routing module 1830 may provide to the user, multiple offers associated with the at least one candidate ridesharing vehicle. The multiple offers may be provided to, for example, a handheld device of the user.

At step 2080, vehicle routing module 1830 may receive a selection of an offer. For example, the user may select an offer from a user interface (e.g., user interface 1950) of a handheld device.

At step 2085, vehicle routing module 1830 may direct a ridesharing vehicle associated with the selected offer to pick up the user.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, e.g., hard disks or CD ROM, or other forms of RAM or ROM, USB media, DVD, Blu-ray, Ultra HD Blu-ray, or other optical drive media.

Computer programs based on the written description and disclosed methods are within the skills of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The examples are to be construed as non-exclusive. Furthermore, the steps of the disclosed methods may be modified in any manner, including by reordering steps and/or inserting or deleting steps. It is intended, therefore, that the specification and examples be considered as illustrative only.

What is claimed is:

1. A computerized-method:
receiving, via a communications interface at a ridesharing management server, a shared-ride request from a user, the shared-ride request including an indication of a starting point and a desired destination;
accessing, via a database, at least one preselected restriction associated with the user, the at least one restriction including limiting a walking distance from the starting point to a pick-up location and limiting a walking distance from a drop-off location to the desired destination, wherein the at least one restriction includes not crossing the street to access a pick-up location or a drop-off location;
receive, from a global positioning system component within each ridesharing vehicle in communication with a global positioning system (GPS), current vehicle location data for a fleet of ridesharing vehicles;
identifying at least one candidate ridesharing vehicle to pick up the user based on current vehicle location information and an ability of the at least one candidate ridesharing vehicle to comply with the at least one preselected restriction associated with the user;
providing to the user, via the ridesharing management server to the communications interface multiple offers associated with the at least one candidate ridesharing vehicle, wherein each offer includes a walking distance from the drop off location to the desired destination that is different than the at least one restriction of the walking distance from a drop-off location to the desired destination specified by the user, and wherein the walking distance from the drop-off location to the desired destination allows additional subsequent pick-ups;
receiving, by the ridesharing management server via the communication interface a selection of an offer; and
redirecting, by the ridesharing management server, a ridesharing vehicle associated with the selected offer to pick up the user at a location of the selected offer.

2. The computerized-method of claim 1, wherein the at least one preselected restriction includes limiting the walking distance to the pick-up location to a distance between 25 to 70 meters.

3. The computerized-method of claim 1, wherein the at least one preselected restriction further includes limiting a number of riders in a ridesharing vehicle with the user, limiting an estimated delay to a ride of the user, limiting a number of pick-ups while the user is in the ridesharing vehicle, limiting a number of drop-offs while the user is in the ridesharing vehicle, and toll road avoidance.

4. The computerized-method of claim 3, wherein the at least one preselected restriction includes limiting the number of riders in the ridesharing vehicle to less than five ridesharing riders.

5. The computerized-method of claim 3, wherein the at least one preselected restriction including limiting the estimated delay to the user's ride to less than 10 minutes.

6. The computerized-method of claim 3, wherein the at least one preselected restriction includes limiting the number of pick-ups while the user is in the ridesharing vehicle to less than three pick-ups.

7. The computerized-method of claim 3, wherein the at least one preselected restriction includes limiting the number of drop-offs while the user is in the ridesharing vehicle to less than three drop-offs.

8. The computerized-method of claim 3, wherein the at least one preselected restriction includes toll road avoidance when the estimated time saved using toll roads is less than 5 minutes.

9. The computerized-method of claim 1, wherein the multiple offers differ by at least one of cost, pick-up location, pick-up time, and type of service.

10. The computerized-method of claim 1, wherein the multiple offers differ by pick-up location, and wherein the method further comprises visually displaying on a map multiple proposed pick-up locations associated with the multiple offers.

11. The computerized-method of claim 1, wherein the method further comprises visually displaying on a map a drop-off location other than the desired destination.

12. The computerized-method of claim 1, wherein the method further comprises visually displaying to the user at least one option for customizing shared-ride requests with at least one restriction.

13. The computerized-method of claim 1, wherein the account of the user includes a series of preselected conditions associated with a stored pick-up location or a stored desired destination.

14. The computerized-method of claim 1, wherein the indication of the starting point is generated by at least one global positioning system (GPS) component included in a mobile device associated with the user.

15. A system for enabling varied ridesharing services, the system comprising:
 a communications interface for receiving shared-ride requests from prospective passengers and for transmitting information to the prospective passengers;
 a memory for storing accounts of the users including at least one preselected restriction associated with a user, the at least one restriction including limiting a walking distance from a starting point to a pick-up location and limiting a walking distance from a drop-off location to a desired destination; and
 at least one ridesharing management server configured to:
  receive, via the communications interface, a request for a shared-ride from the user, the shared-ride request including an indication of a starting point and a desired destination;
  access, via the memory, the at least one preselected restriction associated with the user, the at least one restriction including limiting a walking distance from the starting point to a pick-up location and limiting a walking distance from a drop-off location to the desired destination, wherein the at least one restriction includes not crossing the street to access a pick-up location or a drop-off location;
  receive, from a global positioning system component within each ridesharing vehicle in communication with a global positioning system (GPS), current vehicle location data for a fleet of ridesharing vehicles;
  identify at least one candidate ridesharing vehicle to pick up the user based on the current vehicle location information and an ability of the at least one candidate ridesharing vehicle to comply with the at least one preselected restriction associated with user;
  provide to the user, via the communications interface, multiple offers associated with the at least one candidate ridesharing vehicle, wherein each offer includes a walking distance from the drop off location to the desired destination that is different than the at least one restriction of the walking distance from a drop-off location to the desired destination specified by the user, and wherein the walking distance from the drop-off location to the desired destination allows additional subsequent pick-ups;
  receive, via the communications interface, a selection of an offer;
  receiving, by the ridesharing management server via the communication interface a selection of an offer; and
  redirect, via the communications interface, a ridesharing vehicle associated with the selected offer to pick up the user at a location of the selected offer.

16. The system of claim 15, wherein the at least one processor is further configured to identify a plurality of candidate ridesharing vehicles based on the current vehicle location data, the shared-ride request, and the at least one restriction.

17. The system of claim 16, wherein the multiple offers are associated with the plurality of candidate ridesharing vehicles and wherein the multiple offers differ by a type of service and the walking distance from the starting point to the pick-up location.

18. The system of claim 16, wherein the multiple offers are associated with the plurality of candidate ridesharing vehicles and wherein the multiple offers differ by a type of service and the walking distance from the drop-off location to the desired destination.

19. The system of claim 15, wherein the at least one preselected restriction includes a plurality of restrictions and wherein the multiple offers include a first offer that satisfies all of the plurality of restrictions and a second offer satisfies some, but not all, of the plurality of restrictions.

20. The system of claim 19, wherein the second offer costs less than the first offer.

21. The computerized-method of claim 1 wherein the at least one restriction further includes a maximum delay of arrival of the user by a subsequent pick-up of a second user, and wherein the computer program product includes further instructions for causing the at least one processor to execute the method further comprising:

calculating an estimated delay of arrival for the user if a second shared-ride request is received from a second user; and assigning a subsequent pick-up of the second user to the ridesharing vehicle if the estimated delay is less than the maximum delay of arrival of the user.

22. The computerized-method of claim 1 wherein the computer program product includes further instructions for causing the at least one processor to execute the method further comprising:

determining a ride fare calculation based on a distance between the requested pick-up location and an actual pick-up location, a distance between the requested drop-off location and an actual drop-off location, or both, wherein as the distance between the requested pick-up location and actual pick-up location increases or the distance between the requested drop-off location and the actual drop-off location increases, or both, the ride fare calculation causes the ride fare cost to go down.

23. The computerized-method of claim 1 wherein the walking distance is further based on walking time from one location to another location, based on average walking speed.

24. The computerized-method of claim 1 wherein identifying at least one candidate ridesharing vehicle is further based on real-time traffic data received from a real-time traffic monitoring system.

* * * * *